US008137583B2

(12) United States Patent
Kubo et al.

(10) Patent No.: US 8,137,583 B2
(45) Date of Patent: Mar. 20, 2012

(54) LIQUID CRYSTAL FOUR-RING COMPOUND HAVING FLUORINE, LIQUID CRYSTAL COMPOSITION, AND LIQUID CRYSTAL DISPLAY DEVICE

(75) Inventors: Takahiro Kubo, Chiba (JP); Teru Shimada, Kumamoto (JP)

(73) Assignees: JNC Corporation, Tokyo (JP); Chisso Petrochemical Corporation, Tokyo (JP)

(*) Notice: Subject to any disclaimer, the term of this patent is extended or adjusted under 35 U.S.C. 154(b) by 0 days.

(21) Appl. No.: 12/995,124

(22) PCT Filed: May 21, 2009

(86) PCT No.: PCT/JP2009/059319

§ 371 (c)(1), (2), (4) Date: Nov. 29, 2010

(87) PCT Pub. No.: WO2009/145101

PCT Pub. Date: Dec. 3, 2009

(65) Prior Publication Data

US 2011/0079753 A1 Apr. 7, 2011

(30) Foreign Application Priority Data

May 29, 2008 (JP) ................................ 2008-140469

(51) Int. Cl.
*C09K 19/00* (2006.01)
*C09K 19/06* (2006.01)
*C09K 19/32* (2006.01)
*C09K 19/52* (2006.01)

(52) U.S. Cl. .......... 252/299.01; 252/299.6; 252/299.61; 252/299.62; 252/299.63; 252/299.64; 430/20; 428/1.1; 568/647; 568/661; 349/1; 349/56

(58) Field of Classification Search ............ 252/299.01, 252/299.6–299.64; 430/20; 428/1.1; 568/647, 568/661; 349/1, 56
See application file for complete search history.

(56) References Cited

U.S. PATENT DOCUMENTS 5,310,501 A 5/1994 Huynh-Ba et al.

FOREIGN PATENT DOCUMENTS

JP 2002193853 7/2002
WO 9102779 3/1991

*Primary Examiner* — Geraldina Vlsconti
(74) *Attorney, Agent, or Firm* — J.C. Patents

(57) ABSTRACT

The invention provides a liquid crystal compound having stability to heat, light and so forth, a wide temperature range of the nematic phase, a small viscosity, a suitable optical anisotropy, a suitable dielectric anisotropy and an excellent compatibility with other liquid crystal compounds. The invention also provides a liquid crystal composition containing this liquid crystal compound and a liquid crystal display device containing this liquid crystal composition.
The compound is represented by formula (a).

(a)

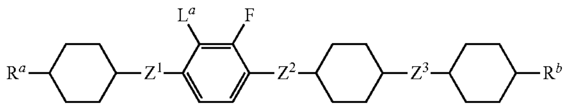

$R^a$ is, for example, alkyl having 1 to 10 carbons, and $R^b$ is, for example, alkenyl having 2 to 10 carbons; $L^a$ is, for example, hydrogen; and $Z^1$, $Z^2$ and $Z^3$ are, for example, a single bond. The liquid crystal composition comprises this compound. The liquid crystal display device comprises this liquid crystal composition.

17 Claims, No Drawings

LIQUID CRYSTAL FOUR-RING COMPOUND HAVING FLUORINE, LIQUID CRYSTAL COMPOSITION, AND LIQUID CRYSTAL DISPLAY DEVICE

FIELD OF THE INVENTION

The invention relates to a liquid crystal compound, a liquid crystal composition and a liquid crystal display device. More specifically, the invention relates to a liquid crystal compound having a backbone of cyclohexane-, benzene-, cyclohexane- and cyclohexane-rings and so forth, and a liquid crystal composition having the nematic phase and comprising this compound, and a liquid crystal display device comprising this composition.

BACKGROUND OF THE INVENTION

A display device using a liquid crystal compound (in this application a liquid crystal compound is used as a generic term for a compound having the nematic phase, and a compound having no liquid crystal phase but useful as a component of a liquid crystal composition) is widely used for displays of watches, calculators, word processors and so forth. This display device utilizes the refractive index anisotropy and the dielectric anisotropy of the liquid crystal compound.

A liquid crystal display device typified by a liquid crystal display panel, a liquid crystal display module and so forth, utilizes optical anisotropy, dielectric anisotropy and so forth, which are possessed by a liquid crystal compound. As operating modes of this liquid crystal display device, a variety of modes are known, such as PC (phase change), TN (twisted nematic), STN (super twisted nematic), BTN (bistable twisted nematic), ECB (electrically controlled birefringence), OCB (optically compensated bend), IPS (in-plane switching), VA (vertical alignment) and PSA (Polymer sustained alignment) modes.

The liquid crystal display device comprises a liquid crystal composition having suitable physical properties. To improve the characteristics of the liquid crystal display device, it is desirable that the liquid crystal composition has suitable physical properties. It is required for liquid crystal compounds, which are components of the liquid crystal composition, to have characteristics shown in items (1) to (7) below. That is to say:

(1) being chemically stable and physically stable, (2) having a high clearing point (transition temperature on a liquid crystal phase—an isotropic phase), (3) having a low minimum temperature of a liquid crystal phase (a nematic phase, a smectic phase and so forth), especially of the nematic phase, (4) having a small viscosity, (5) having a suitable optical anisotropy, (6) having a suitable dielectric anisotropy, and (7) having an excellent compatibility with other liquid crystal compounds.

A voltage holding ratio can be increased by using a composition containing a chemically and physically stable liquid crystal compound as described in item (1), for a display device. The temperature range of a nematic phase is wide in a composition that contains a liquid crystal compound having a high clearing point or a low minimum temperature of a liquid crystal phase as described in items (2) and (3), and thus the device is usable in a wide temperature range.

Furthermore, when a composition containing a compound having a small viscosity as described in item (4) and a compound having a large elastic constant $K_{33}$ as described in item (7) is used for a display device, the response speed can be improved. In the case of a display device using a composition that contains a compound having a suitable optical anisotropy as described in item (5), an improvement of the contrast in a display device can be expected. From a small to a large optical anisotropy is required according to the design of a device. Recently, a method for improving the response speed by means of a smaller cell thickness has been investigated, whereby a liquid crystal composition having a large optical anisotropy has also been required.

Moreover, when a liquid crystal compound has a large negative dielectric anisotropy, the threshold voltage of the liquid crystal composition containing this compound can be decreased. Hence, the driving voltage of a display device can be decreased and the electric power consumption can also be decreased in the case of a display device using a composition containing a compound that has a suitable dielectric anisotropy as described in item (6).

The liquid crystal compound is generally used as a composition prepared by mixing it with many other liquid crystal compounds in order to exhibit characteristics that cannot be attained with a single compound. Accordingly, it is desirable that a liquid crystal compound used for a display device has an excellent compatibility with other liquid crystal compounds and so forth, as described in item (7). Because the display device may also be used in a wide temperature range including a lower temperature than the freezing point, the compound that exhibits an excellent compatibility even in a low temperature range may be desirable.

Compounds having a cyclohexane ring and a benzene ring as described below are known as a liquid crystal compound used for this purpose. For example, the compounds (A) and (B) are disclosed in patent document No. 1, the compound (C) is disclosed in patent document No. 2, and the compound (D) is disclosed in patent document No. 3. No compounds disclosed in any of the documents have a sufficiently high clearing point. Thus, the temperature range of the nematic phase of the compositions that contain these compounds is not sufficiently wide. Further, the compositions that contain these compounds have a disadvantage that they are not suitable for a device with a large cell thickness for the high-speed response, because the optical anisotropy is not sufficiently large.

(A)

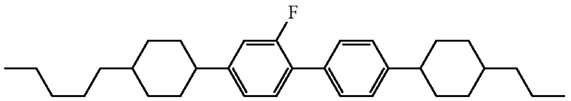

(B)

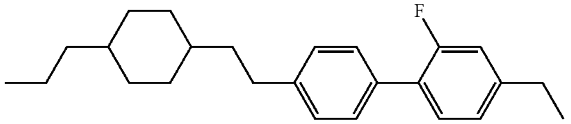

(C)

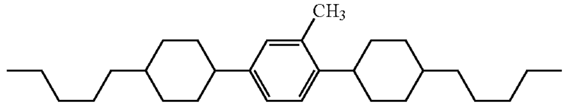

-continued (D)

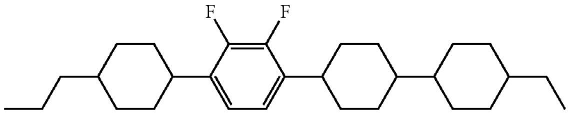

PRIOR ART

The patent documents cited herein are No. 1: JP 4-501581 A (1992); No. 2: U.S. Pat. No. 5,310,501; and No. 3: JP 2002-193853 A.

DISCLOSURE OF THE INVENTION

Subjects to be Solved by the Invention

The first aim of the invention is to provide a liquid crystal compound having stability to heat, light and so forth, a wide temperature range of the nematic phase, a small viscosity and a suitable optical anisotropy, and further having a suitable dielectric anisotropy and an excellent compatibility with other liquid crystal compounds, especially a small viscosity and an excellent compatibility with other liquid crystal compounds.

The second aim of the invention is to provide a liquid crystal composition that comprises the compound, satisfying at least one of characteristics such as stability to heat, light and so forth, a small viscosity, a suitable optical anisotropy, a suitable dielectric anisotropy, and a low threshold voltage, and then a high maximum temperature of the nematic phase (phase-transition temperature on the nematic phase-a isotropic phase) and a low minimum temperature of the nematic phase. It is also the aim to provide a liquid crystal composition that is suitably balanced regarding at least two of the characteristics.

The third aim of the invention is to provide a liquid crystal display device that comprises the composition, having a short response time, a low power consumption, a low driving voltage, a large contrast and a wide temperature range in which the device can be used.

Means to Solve the Subject

The invention provides a liquid crystal compound, a liquid crystal composition, a liquid crystal display device comprising the liquid crystal (a)

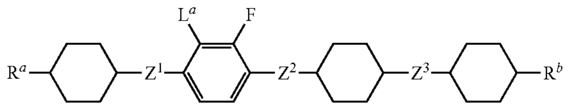

composition and so forth, which will be described below. Desirable examples of the terminal group, the ring, the bonding group and so forth of a compound represented by formula (a) will be also described below.

Item 1. A compound represented by formula (a):

wherein $R^a$ and $R^b$ are each independently alkyl having 1 to 10 carbons, alkenyl having 2 to 10 carbons or alkoxy having 1 to 10 carbons, and at least one of $R^a$ and $R^b$ is alkenyl or alkoxy;

$L^a$ is hydrogen or fluorine;

$Z^1$, $Z^2$ and $Z^3$ are each independently a single bond, $—(CH_2)_2—$, $—CH_2O—$ or $—OCH_2—$; and $R^b$ is alkenyl having 2 to 10 carbons or alkoxy having 1 to 10 carbons, and $Z^1$ and $Z^2$ are each independently a single bond or $—(CH_2)_2—$, when $L^a$ is fluorine.

Item 2. The compound according to item 1, wherein, in formula (a), $R^a$ and $R^b$ are each independently alkenyl having 2 to 10 carbons and $L^a$ is fluorine.

Item 3. The compound according to item 1, wherein, in formula (a), $R^a$ is alkoxy having 1 to 10 carbons, $R^b$ is alkenyl having 2 to 10 carbons, and $L^a$ is fluorine.

Item 4. The compound according to item 1, wherein, in formula (a), $R^a$ is alkenyl having 2 to 10 carbons, $R^b$ is alkyl having 1 to 10 carbons, and $L^a$ is hydrogen.

Item 5. The compound according to item 1, wherein, in formula (a), $R^a$ is alkyl having 1 to 10 carbons, $R^b$ is alkenyl having 2 to 10 carbons, and $L^a$ is hydrogen.

Item 6. The compound according to item 1, wherein, in formula (a), $R^a$ and $R^b$ are each independently alkenyl having 2 to 10 carbons and $L^a$ is hydrogen.

Item 7. The compound according to item 1, wherein, in formula (a), $R^a$ is alkoxy having 1 to 10 carbons, $R^b$ is alkenyl having 2 to 10 carbons, and $L^a$ is hydrogen.

Item 8. The compound according to item 1, wherein, in formula (a), $R^a$ is alkenyl having 2 to 10 carbons, $R^b$ is alkoxy having 1 to 10 carbons, and $L^a$ is hydrogen.

Item 9. The compound according to item 1, which is represented by any one of formulas (a-1) to (a-4):

(a-1)

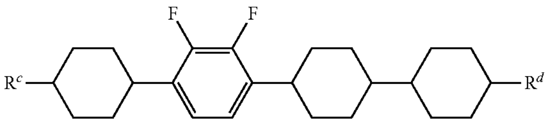

(a-2)

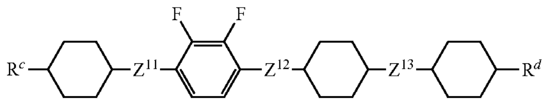

(a-3)

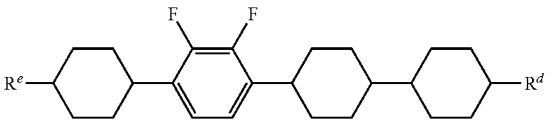

(a-4)

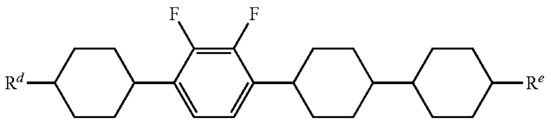

wherein $R^c$ is alkyl having 1 to 10 carbons, $R^d$ is alkenyl having 2 to 10 carbons, and $R^e$ is alkoxy having 1 to 10 carbons; and $Z^{11}$, $Z^{12}$, and $Z^{13}$ are each independently a single bond or $—(CH_2)_2—$, and at least any one of $Z^{11}$, $Z^{12}$ and $Z^{13}$ is $—(CH_2)_2—$.

Item 10. The compound according to item 1, which is represented by any one of formulas (a-5) to (a-12):

(a-5)

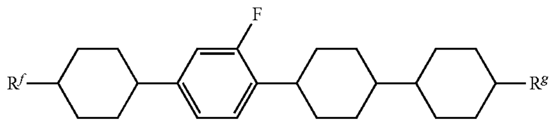

(a-6)

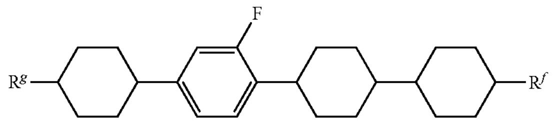

(a-7)

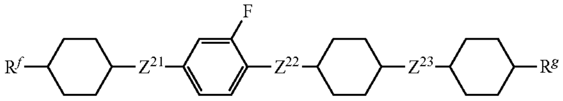

(a-8)

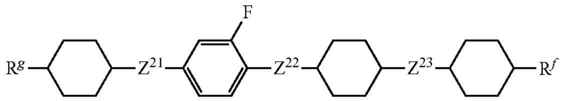

(a-9)

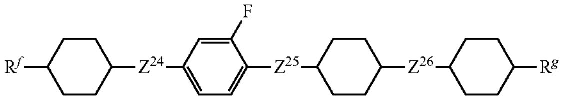

(a-10)

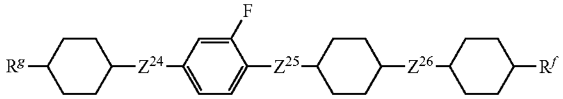

(a-11)

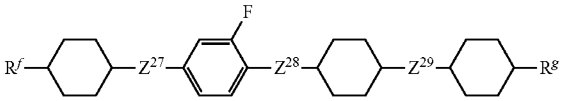

(a-12)

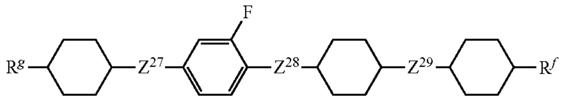

wherein $R^f$ is alkyl having 1 to 10 carbons and $R^g$ is alkenyl having 2 to 10 carbons;

$Z^{21}$, $Z^{22}$, and $Z^{23}$ are each independently a single bond or $-(CH_2)_2-$, and in these groups, at least any one of $Z^{21}$, $Z^{22}$ and $Z^{23}$ is $-(CH_2)_2-$;

$Z^{24}$, $Z^{25}$ and $Z^{26}$ are each independently a single bond or $-CH_2O-$, and, in these groups, at least any one of $Z^{24}$, $Z^{25}$ and $Z^{26}$ is $-CH_2O-$; and $Z^{27}$, $Z^{28}$ and $Z^{29}$ are each independently a single bond or $-OCH_2-$, and in these groups, at least any one of $Z^{27}$, $Z^{28}$ and $Z^{29}$ is $-OCH_2-$.

Item 11. The compound according to item 1, which is represented by any one of formulas (a-13) to (a-20):

(a-13)

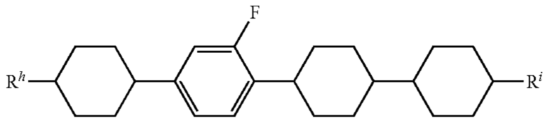

(a-14)

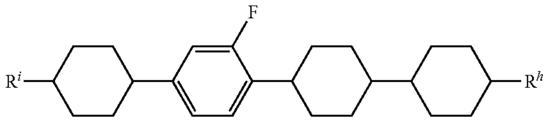

(a-15)

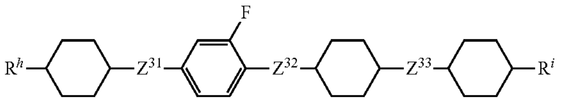

(a-16)

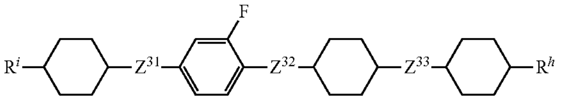

(a-17)

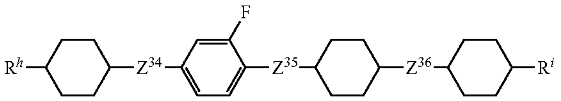

(a-18)

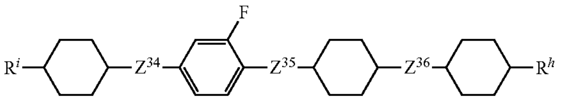

(a-19)

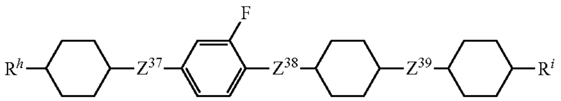

(a-20)

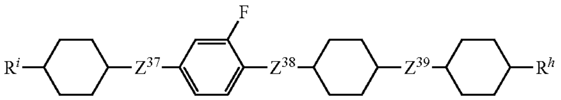

wherein $R^h$ is alkenyl having 2 to 10 carbons and $R^i$ is alkoxy having 1 to 10 carbons;

$Z^{31}$, $Z^{32}$ and $Z^{33}$ are each independently a single bond or $-(CH_2)_2-$, and in these groups, at least any one of $Z^{31}$, $Z^{32}$ and $Z^{33}$ is $-(CH_2)_2-$;

$Z^{34}$, $Z^{35}$ and $Z^{36}$ are each independently a single bond or $-CH_2O-$, and in these groups, at least any one of $Z^{34}$, $Z^{35}$ and $Z^{36}$ is $-CH_2O-$; and $Z^{37}$, $Z^{38}$ and $Z^{39}$ are each independently a single bond or $-OCH_2-$, and in these groups, at least any one of $Z^{37}$, $Z^{38}$ and $Z^{39}$ is $-OCH_2-$.

Item 12. The compound according to item 1, which is represented by any one of formulas (a-21) to (a-24):

(a-21)

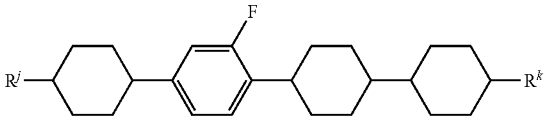

(a-22)

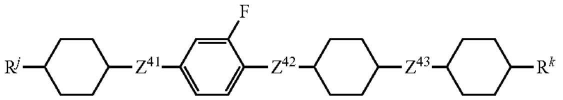

(a-23)

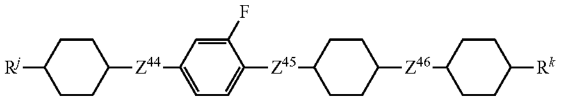

(a-24)

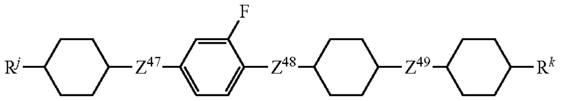

wherein $R^j$ is alkenyl having 2 to 10 carbons and $R^k$ is alkenyl having 2 to 10 carbons;

$Z^{41}$, $Z^{42}$ and $Z^{43}$ are each independently a single bond or $—(CH_2)_2—$, and in these groups, at least any one of $Z^{41}$, $Z^{42}$ and $Z^{43}$ is $—(CH_2)_2—$;

Z∴, $Z^{45}$ and $Z^{46}$ are each independently a single bond or $—CH_2O—$, and in these groups, at least any one of $Z^{44}$, $Z^{45}$ and $Z^{46}$ is $—CH_2O—$; and $Z^{47}$, $Z^{48}$ and $Z^{49}$ are each a single bond or $—OCH_2—$, and in these groups, at least any one of $Z^{47}$, $Z^{48}$ and $Z^{49}$ is $—OCH_2—$.

Item 13. A liquid crystal composition consisting of two or more components and comprising at least one compound according to any one of items 1 to 12 as one component.

Item 14. The liquid crystal composition according to item 13, comprising at least one compound selected from the group of compounds represented by each of formulas (2), (3) and (4) as one component:

(2)

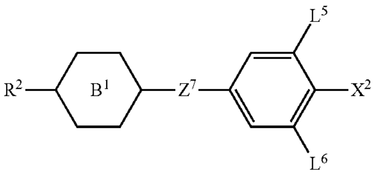

(3)

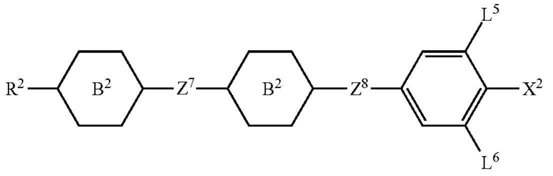

-continued (4)

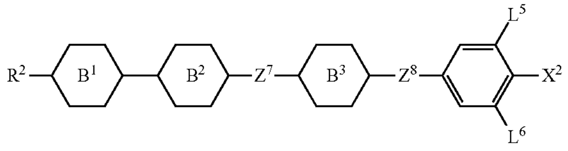

wherein $R^2$ is alkyl having 1 to 10 carbons or alkenyl having 2 to 10 carbons, and in the alkyl and alkenyl, arbitrary hydrogen may be replaced by fluorine and arbitrary $—CH_2—$ may be replaced by —O—;

$X^2$ is fluorine, chlorine, $—OCF_3$, $—OCHF_2$, $—CF_3$, $—CHF_2$, $—CH_2F$, $—OCF_2CHF_2$ or $—OCF_2CHFCF_3$;

ring $B^1$, ring $B^2$ and ring $B^3$ are each independently 1,4-cyclohexylene, 1,3-dioxane-2,5-diyl, pyrimidine-2,5-diyl, tetrahydropyran-2,5-diyl, 1,4-phenylene, or 1,4-phenylene in which arbitrary hydrogen is replaced by fluorine;

$Z^7$ and $Z^8$ are each independently $—(CH_2)_2—$, $—(CH_2)_4—$, —COO—, $—CF_2O—$, $—OCF_2—$, —CH═CH—, —C≡C—, $—CH_2O—$ or a single bond; and $L^5$ and $L^6$ are each independently hydrogen or fluorine.

Item 15. The liquid crystal composition according to item 13 comprising at least one compound selected from the group of compounds represented by formula (5) as one component:

(5)

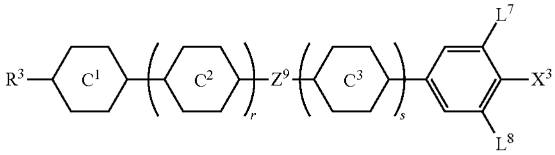

wherein $R^3$ is alkyl having 1 to 10 carbons or alkenyl having 2 to 10 carbons, and in the alkyl and alkenyl, arbitrary hydrogen may be replaced by fluorine and arbitrary $—CH_2—$ may be replaced by —O—;

$X^3$ is —C≡N or —C≡C—C≡N;

ring $C^1$, ring $C^2$ and ring $C^3$ are each independently 1,4-cyclohexylene, 1,4-phenylene, 1,4-phenylene in which arbitrary hydrogen is replaced by fluorine, 1,3-dioxane-2,5-diyl, tetrahydropyran-2,5-diyl or pyrimidine-2,5-diyl;

$Z^9$ is $—(CH_2)_2—$, —COO—, $—CF_2O—$, $—OCF_2—$, —C≡C—, $—CH_2O—$ or a single bond;

$L^7$ and $L^8$ are each independently hydrogen or fluorine; and r is 0 or 1, s is 0 or 1, and r+s is 0, 1 or 2.

Item 16. The liquid crystal composition according to item 13 comprising at least one compound selected from the group of compounds represented by each of formulas (6), (7), (8), (9) and (10) as one component:

(6)

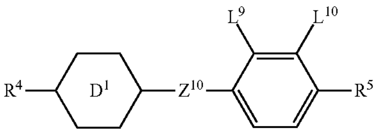

(7)

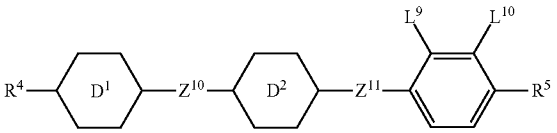

(8)

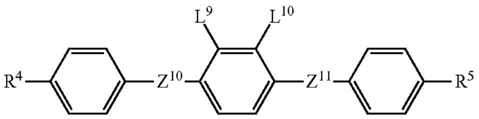

(9)

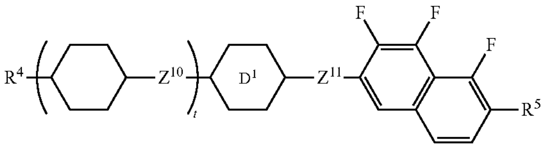

(10)

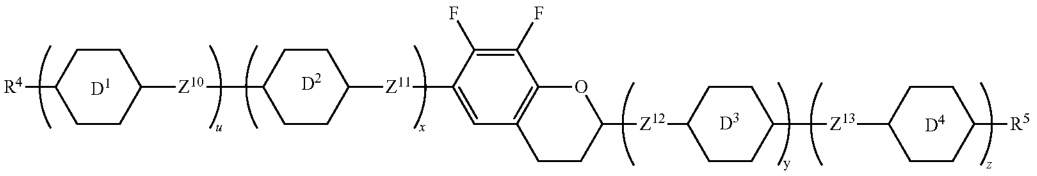

wherein $R^4$ and $R^5$ are each independently alkyl having 1 to 10 carbons or alkenyl having 2 to 10 carbons, and in the alkyl and alkenyl, arbitrary hydrogen may be replaced by fluorine and arbitrary $—CH_2—$ may be replaced by —O—;

ring $D^1$, ring $D^2$, ring $D^3$ and ring $D^4$ are each independently 1,4-cyclohexylene, 1,4-cyclohexenylene, 1,4-phenylene, 1,4-phenylene in which arbitrary hydrogen is replaced by fluorine, tetrahydropyran-2,5-diyl or decahydronaphthalene-2,6-diyl;

$Z^{10}$, $Z^{11}$, $Z^{12}$ and $Z^{13}$ are each independently $—(CH_2)_2—$, —COO—, $—CH_2O—$, $—OCF_2—$, $—OCF_2(CH_2)_2—$ or a single bond;

$L^9$ and $L^{10}$ are each independently fluorine or chlorine; and t, u, x, y and z are each independently 0 or 1, and u+x+y+Z is 1 or 2.

Item 17. The liquid crystal composition according to item 13 comprising at least one compound selected from the group of compounds represented by each of formulas (11), (12) and (13) as one component:

(11)

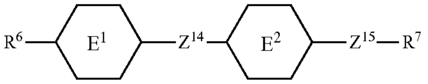

(12)

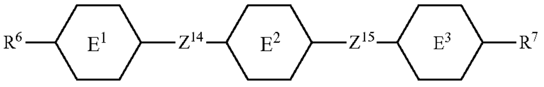

(13)

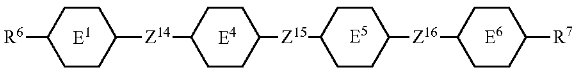

wherein $R^6$ and $R^7$ are each independently alkyl having 1 to 10 carbons or alkenyl having 2 to 10 carbons, and in the alkyl and alkenyl, arbitrary hydrogen may be replaced by fluorine and arbitrary $—CH_2—$ may be replaced by —O—;

ring $E^1$, ring $E^2$, ring $E^3$ and ring $E^6$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

ring $E^4$ and ring $E^5$ are each independently 1,4-cyclohexylene, pyrimidine-2,5-diyl or 1,4-phenylene; and $Z^{14}$, $Z^{15}$ and $Z^{16}$ are each independently —C≡C—, —COO—, $—(CH_2)_2—$, —CH═CH— or a single bond.

Item 18. The liquid crystal composition according to item 14, further comprising at least one compound selected from the group of compounds represented by the general formula (5) according to item 15.

Item 19. The liquid crystal composition according to item 14, further comprising at least one compound selected from the group of compounds represented by each of the general formulas (11), (12) and (13).

Item 20. The liquid crystal composition according to item 15, further comprising at least one compound selected from the group of compounds represented by each of the general formulas (11), (12) and (13)

Item 21. The liquid crystal composition according to item 16, further comprising at least one compound selected from the group of compounds represented by each of the general formulas (11), (12) and (13)

Item 22. The liquid crystal composition according to anyone of items 13 to 21, further comprising at least one optically active compound.

Item 23. The liquid crystal composition according to anyone of items 13 to 22, further including at least one antioxidant and/or ultraviolet absorber.

Item 24. A liquid crystal display device comprising the liquid crystal composition according to any one of items 13 to 23.

Effect of the Invention

The compound of the invention has general physical properties required for the compound, stability to heat, light and so forth, a wide temperature range of the liquid crystal phase, a small viscosity, an excellent compatibility with other compounds, a suitable dielectric anisotropy and a suitable refractive index anisotropy. The liquid crystal composition of the invention comprises at least one of these compounds, and has a high maximum temperature of the nematic phase, a low minimum temperature of the nematic phase, a small viscosity and an excellent compatibility even in a low temperature range. The liquid crystal display device of the invention comprises this composition, and has a wide temperature range in which the device can be used, a short response time, a low electric power consumption, a large contrast ratio and a low driving voltage.

EMBODIMENT TO CARRY OUT THE INVENTION

The invention is explained in greater detail below.

In the following description, the amount of a compound that is expressed in a percentage means the weight percentage (% by weight) based on the total weight of the composition unless otherwise noted.

[Compound (a)]

The liquid crystal compound of the invention has a structure represented by formula (a) (hereinafter the compound is also referred to as "the compound (a)").

(a)

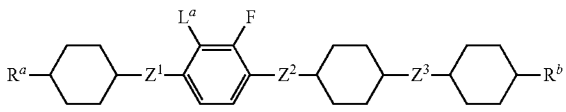

In formula (a), $R^a$ and $R^b$ are each independently alkyl having 1 to 10 carbons, alkenyl having 2 to 10 carbons or alkoxy having 1 to 10 carbons, and in these groups, at least one of $R^a$ and $R^b$ is alkenyl or alkoxy;

$L^a$ is hydrogen or fluorine;

$Z^1$, $Z^2$ and $Z^3$ are each independently a single bond, $—(CH_2)_2—$, $—CH_2O—$ or $—OCH_2—$; and $R^b$ is alkenyl having 2 to 10 carbons or alkoxy having 1 to 10 carbons and $Z^1$ and $Z^2$ are each independently a single bond or $—(CH_2)_2—$, when $L^a$ is fluorine.

If $R^a$ and $R^b$ are alkenyl or alkoxy, the temperature range of the liquid crystal phase in the liquid crystal compounds can be increased.

A straight-chain is preferable to a branched-chain in the $R^a$ and $R^b$. $R^a$ that is optically active is desirable, even if it is a branched group. A desirable configuration of —CH═CH— in the alkenyl depends on the position of the double bond. A trans-configuration is desirable in the alkenyl having the double bond in an odd-numbered position, such as $—CH{=}CHCH_3$, $—CH{=}CHC_2H_5$, $—CH{=}CHC_3H_7$, $—CH{=}CHC_4H_9$, $—C_2H_4CH{=}CHCH_3$ and $—C_2H_4CH{=}CHC_2H_5$. A cis-configuration is desirable in the alkenyl having the double bond at an even-numbered position, such as $—CH_2CH{=}CHCH_3$, $—CH_2CH{=}CHC_2H_5$ and $—CH_2CH{=}CHC_3H_7$. An alkenyl compound bearing the desirable configuration has a high maximum temperature or a wide temperature range of the liquid crystal phase. The details are described in Mol. Cryst. Liq. Cryst., 1985, 131, 109 and Mol. Cryst. Liq. Cryst., 1985, 131, 327.

Alkyl may be a straight- or a branched chain. Specific examples of the alkyl include $—CH_3$, $—C_2H_5$, $—C_3H_7$, $—C_4H_9$, $—C_5H_{11}$, $—C_6H_{13}$, $—C_7H_{15}$, $—C_8H_{17}$, $—C_9H_{19}$ and $—C_{10}H_{21}$.

Alkoxy may be a straight- or a branched chain. Specific examples of the alkoxy include $—OCH_3$, $—OC_2H_5$, $—OC_3H_7$, $—OC_4H_9$, $—OC_5H_{11}$, $—OC_6H_{13}$ and $—OC_7H_{15}$, $—OC_8H_{17}$, $—OC_9H_{19}$ and $—OC_{10}H$.

Alkoxyalkyl may be a straight- or a branched chain. Specific examples of the alkoxyalkyl include $—CH_2OCH_3$, $—CH_2OC_2H_5$, $—CH_2OC_3H_7$, $—(CH_2)_2—OCH_3$, $—(CH_2)_2—OC_2H_5$, $—(CH_2)_2—OC_3H_7$, $—(CH_2)_3—OCH_3$, $—(CH_2)_4—OCH_3$ and $—(CH_2)_5OCH_3$.

Alkenyl may be a straight- or a branched chain. Specific examples of the alkenyl include $—CH{=}CH_2$, $—CH{=}CHCH_3$, $—CH_2CH{=}CH_2$, $—CH{=}CHC_2H_5$, $—CH_2CH{=}CHCH_3$, $—(CH_2)_2—CH{=}CH_2$, $—CH{=}CHC_3H_7$, $—CH_2CH{=}CHC_2H_5$, $—(CH_2)_2—CH{=}CHCH_3$ and $—(CH_2)_3—CH{=}CH_2$.

Then, among the specific examples, desirable $R^a$ and $R^b$ are $—CH_3$, $—C_2H_5$, $—C_3H_7$, $—C_4H_9$, $—C_5H_{11}$, $—OCH_3$, $—OC_2H_5$, $—OC_3H_7$, $—OC_4H_9$, $—OC_5H_{11}$, $—CH_2OCH_3$, $—(CH_2)_2OCH_3$, $—(CH_2)_3OCH_3$, $—CH_2CH{=}CH_2$, $—CH_2CH{=}CHCH_3$, $—(CH_2)_2CH{=}CH_2$, $—CH_2CH{=}CHC_2H_5$, $—(CH_2)_2CH{=}CHCH_3$, $—(CH_2)_3CH{=}CH_2$, $—(CH_2)_3CH{=}CHCH_3$, $—(CH_2)_3CH{=}CHC_2H_5$, $—(CH_2)_3CH{=}CHC_3H_7$, $—OCH_2CH{=}CH_2$, $—OCH_2{=}CHCH_3$ and $—OCH_2CH{=}CHC_2H_5$. More desirable $R^a$ and $R^b$ are $—CH_3$, $—C_2H_5$, $—C_3H_7$, $—OCH_3$, $—OC_2H_5$, $—OC_3H_7$, $—OC_4H_9$, $—(CH_2)_2CH{=}CH_2$, $—(CH_2)_2CH{=}CHCH_3$ and $—(CH_2)_2CH{=}CHC_3H_7$.

$L^a$ is hydrogen or fluorine. $L^a$ is preferably hydrogen in view of a decrease of the melting point of the compound, and $L^a$ is preferably fluorine in view of an increase of the negative dielectric anisotropy of the compound.

$Z^1$, $Z^2$ and $Z^3$ are each independently a single bond, $—(CH_2)_2—$, $—CH_2O—$ or $—OCH_2—$; $R^b$ is alkenyl having 2 to 10 carbons or alkoxy having 1 to 10 carbons: and $Z^1$ and $Z^2$ are each independently a single bond or $—(CH_2)_2—$ when $L^a$ is fluorine.

$Z^1$, $Z^2$ and $Z^3$ are preferably a single bond or $—(CH_2)_2—$ in view of a decrease of the viscosity of the compound, and also in view of the stability of the compound.

Incidentally, the compound (a) may also contain isotopes such as $^2H$ (deuterium) and $^{13}C$ in a larger amount than the amount of the natural abundance, because such isotopes do not make a large difference in physical properties of the compound.

In the liquid crystal compound (a), it is possible to adjust physical properties such as dielectric anisotropy, to desired physical properties by suitably selecting $R^a$, $R^b$, $L^a$, $Z^1$, $Z^2$ and $Z^3$.

Examples of desirable compound (a) include the compounds (a-1) to (a-4).

(a-1)

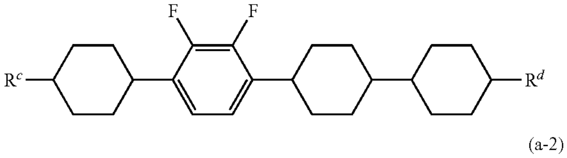

(a-2)

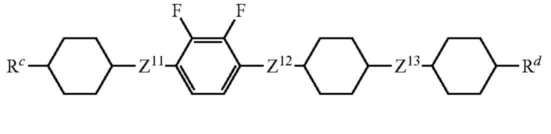

-continued (a-3)

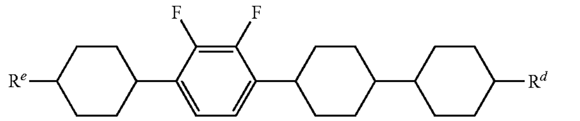

(a-4)

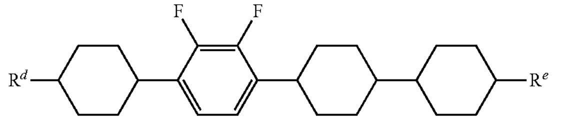

In formulas (a-1) to (a-4), $R^c$ is alkyl having 1 to 10 carbons, $R^d$ is alkenyl having 2 to 10 carbons, and $R^e$ is alkoxy having 1 to 10 carbons; and Z, $Z^{12}$ and $Z^{13}$ are each independently a single bond or $—(CH_2)_2—$, and in these groups, at least any one of $Z^{11}$, $Z^{12}$ and $Z^{13}$ is $—(CH_2)_2—$.

Because the compounds (a-1) to (a-4) have two fluorines, they are desirable in view of a large negative dielectric anisotropy. Further, because these compounds have alkenyl, they are more desirable especially in view of an especially high maximum temperature or a wide temperature range of the liquid crystal phase, and an excellent compatibility with other compounds and a smaller viscosity.

Desirable examples of the compound (a) include the compounds (a-5) to (a-12).

(a-5)

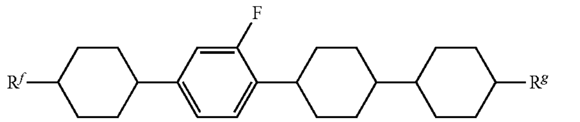

(a-6)

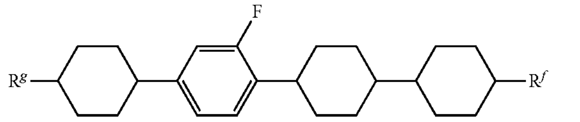

(a-7)

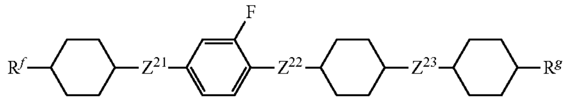

(a-8)

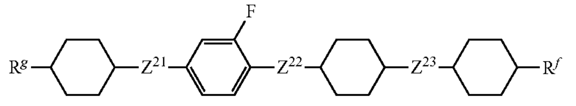

(a-9)

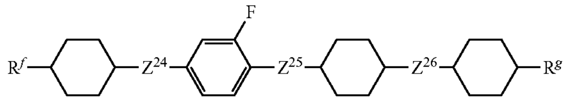

(a-10)

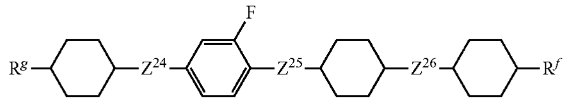

-continued (a-11)

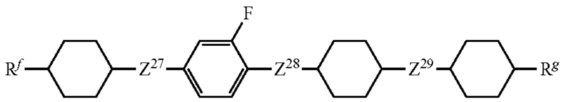

(a-12)

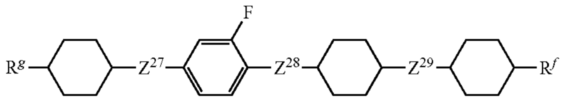

In formulas (a-5) to (a-12), $R^f$ is alkyl having 1 to 10 carbons, $R^g$ is alkenyl having 2 to 10 carbons;

$Z^{21}$, $Z^{22}$ and $Z^{23}$ are each independently a single bond or $—(CH_2)_2—$, and in these groups, at least any one of $Z^{21}$, $Z^{22}$ and $Z^{23}$ is $—(CH_2)_2—$;

$Z^{24}$, $Z^{25}$ and $Z^{26}$ are each independently a single bond or $—CH_2O—$, and in these groups, at least any one of $Z^{24}$, $Z^{25}$ and $Z^{26}$ is $—CH_2O—$; and $Z^{27}$, $Z^{28}$ and $Z^{29}$ are each independently a single bond or $—OCH_2—$, and in these groups, at least any one of $Z^{27}$, $Z^{28}$ and $Z^{29}$ is $—OCH_2—$.

Because the compounds (a-5) to (a-12) have alkenyl, they are desirable in view of an especially high maximum temperature or a wide temperature range of the liquid crystal phase, and an excellent compatibility with other compounds and a small viscosity.

Examples of desirable compound (a) include the compounds (a-13) to (a-20).

(a-13)

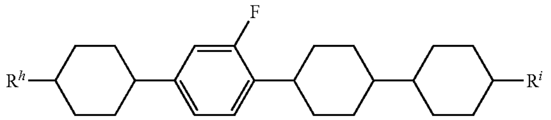

(a-14)

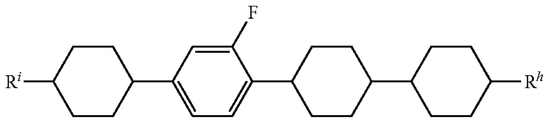

(a-15)

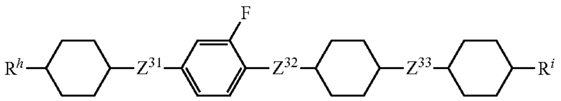

(a-16)

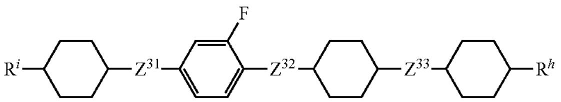

(a-17)

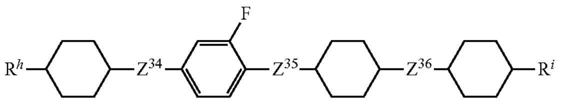

(a-18)

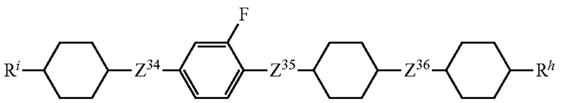

-continued (a-19)

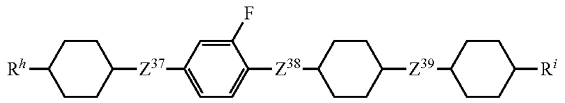

(a-20)

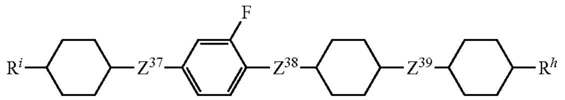

In formulas (a-13) to (a-20), $R^h$ is alkenyl having 2 to 10 carbons and $R^i$ is alkoxy having 1 to 10 carbons;

$Z^{31}$, $Z^{32}$ and $Z^{33}$ are each independently a single bond or $-(CH_2)_2-$, and in these groups, at least any one of $Z^{31}$, $Z^{32}$ and $Z^{33}$ is $-(CH_2)_2-$;

$Z^{34}$, $Z^{35}$ and $Z^{36}$ are each independently a single bond or $-CH_2O-$, and in these groups, at least any one of $Z^{34}$, $Z^{35}$ and $Z^{36}$ is $-CH_2O-$; and $Z^{37}$, $Z^{38}$ and $Z^{39}$ are each independently a single bond or $-OCH_2-$, and in these groups, at least one of $Z^{37}$, $Z^{38}$ and $Z^{39}$ is $-OCH_2-$.

Because the compounds (a-13) to (a-20) have alkenyl or alkoxy, they are more desirable in view of a high maximum temperature or a wide temperature range of the liquid crystal phase, and an excellent compatibility with other compounds and a low viscosity.

Examples of desirable compound (a) include the compounds (a-21) to (a-24).

(a-21)

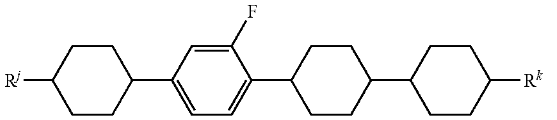

(a-22)

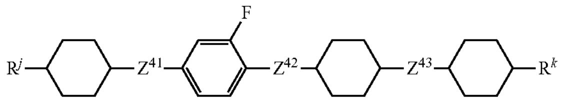

(a-23)

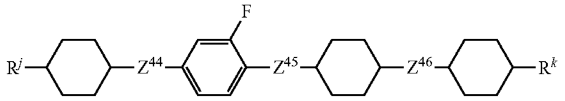

(a-24)

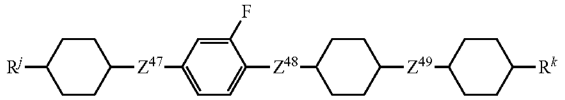

In formulas (a-21) to (a-24), $R^j$ is alkenyl having 2 to 10 carbons and $R^k$ is alkenyl having 2 to 10 carbons;

$Z^{41}$, $Z^{42}$ and $Z^{43}$ are each independently a single bond or $-(CH_2)_2-$, and in these groups, at least one of $Z^{41}$, $Z^{42}$ and $Z^{43}$ is $-(CH_2)_2-$;

$Z^{44}$, $Z^{45}$ and $Z^{46}$ are each independently a single bond or $-CH_2O-$, and in these groups, at least one of $Z^{44}$, $Z^{45}$ and $Z^{46}$ is $-CH_2O-$; and $Z^{47}$, $Z^{48}$ and $Z^{49}$ are each independently a single bond or $-OCH_2-$, and in these groups, at least one of $Z^{47}$, $Z^{48}$ and $Z^{49}$ is $-OCH_2-$.

Because the compounds (a-13) to (a-20) have alkenyl at each end, they are more desirable in view of an especially high maximum temperature or a wide temperature range of the liquid crystal phase, and an excellent compatibility with other compounds and a small viscosity.

When liquid crystal compounds have a structure represented by these compounds (a-1) to (a-24), they have a suitable dielectric anisotropy and an excellent compatibility with other liquid crystal compounds. They have also stability to heat, light and so forth, a wide temperature range of the nematic phases, a small viscosity and a suitable optical anisotropy. A liquid crystal composition comprising this compound (a) is stable under conditions in which a liquid crystal display device is usually used, and this compound does not deposit as crystals (or its smectic phase) even when the composition is kept at a low temperature.

Hence, the compound (a) is suitably applied to a liquid crystal composition used for liquid crystal display devices with display modes such as PC, TN, STN, ECB, OCB, IPS, VA and PSA, and is quite suitably applied to a liquid crystal composition used for liquid crystal display devices with display modes such as IPS and VA.

[Synthesis of Compound (a)]

The compound (a) can be synthesized by suitably combining techniques in synthetic organic chemistry. Methods of introducing objective terminal groups, rings and bonding groups into the starting materials are described, for example, in ORGANIC SYNTHESES (John Wiley & Sons, Inc), ORGANIC REACTIONS (John Wiley & Sons, Inc), COMPREHENSIVE ORGANIC SYNTHESIS (Pergamon Press), NEW EXPERIMENTAL CHEMISTRY COURSE (Shin Jikken Kagaku Kouza, in Japanese title) (Maruzen) and so forth.

[A] Cases where the Terminal Groups $R^a$ and $R^b$ are not Alkenyl

A method for forming the bonding groups $Z^1$ to $Z^3$ of the compound (a) will be explained in the following (I) to (III) in greater detail. The formation of $Z^1$ is shown here as a representative example and the same applies to the formation of $Z^2$ and $Z^3$. The compounds (b9), (b17) and (b23) correspond to the compound (a).

(I) Formation of a Single Bond (Bonding Group $Z^1$)

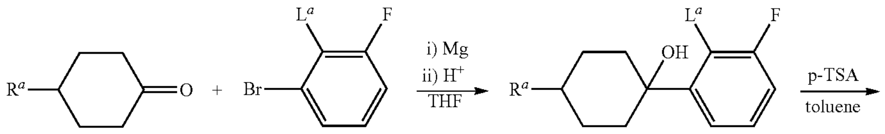

(b1) (b2) (b3)

-continued

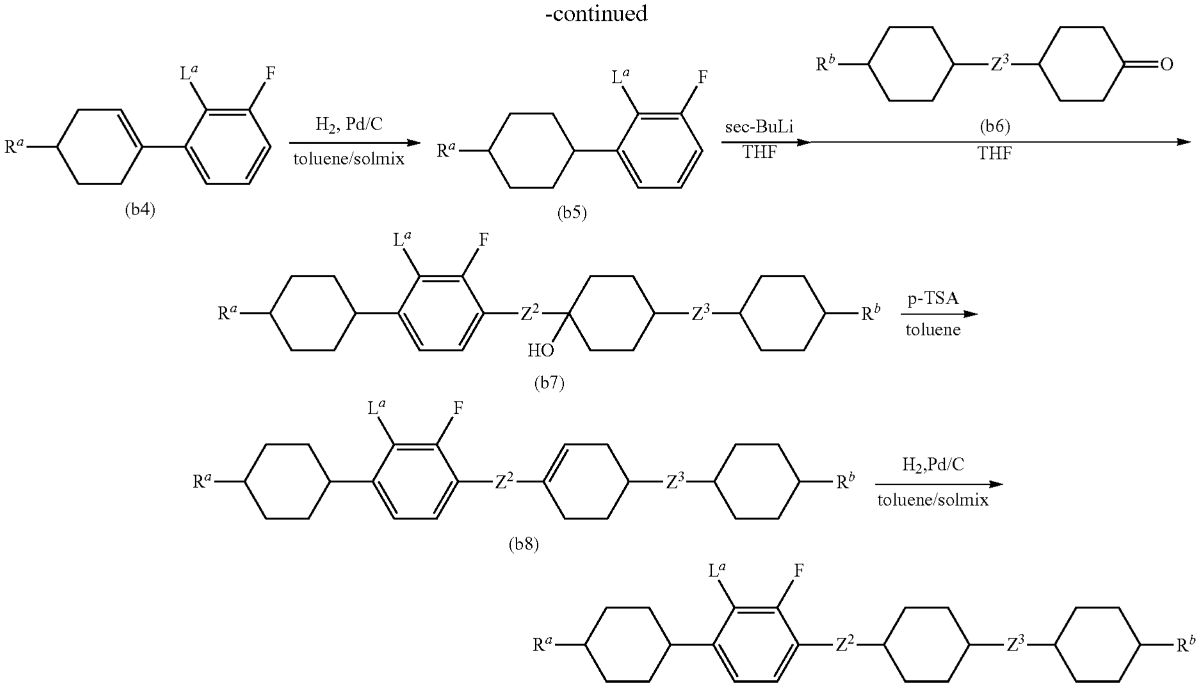

(b4) (b5) (b7) (b8) (b9)

In these formulas, $R^a$, $R^b$, $Z^2$, $Z^3$ and $L^a$ have the meanings identical to those described above.

The compound (b2) is reacted with magnesium, giving a magnesium salt, and after the compound (b1) has been added thereto, the alcohol derivative (b3) is obtained by an acid-treatment. The cyclohexene derivative (b4) is obtained by dehydrating the alcohol derivative (b3) in the presence of an acid catalyst such as p-toluenesulfonic acid. The compound (b5) is obtained by hydrogenating this compound (b4) in the presence of a catalyst such as Pd/C (palladium on carbon). A lithium salt is prepared by reacting the compound (b5) with s-butyllithium. The alcohol derivative (b7) is obtained by reacting this lithium salt with the carbonyl derivative (b6). The cyclohexene derivative (b8) is obtained by dehydrating the alcohol derivative (b7) in the presence of an acid catalyst such as p-toluenesulfonic acid. The compound (b9), which is one example of the compound (a) of the invention, can be synthesized by hydrogenating this compound (b8) in the presence of a catalyst such as Pd/C.

(II) Formation of $-(CH_2)_2-$ (Bonding Group $Z^1$)

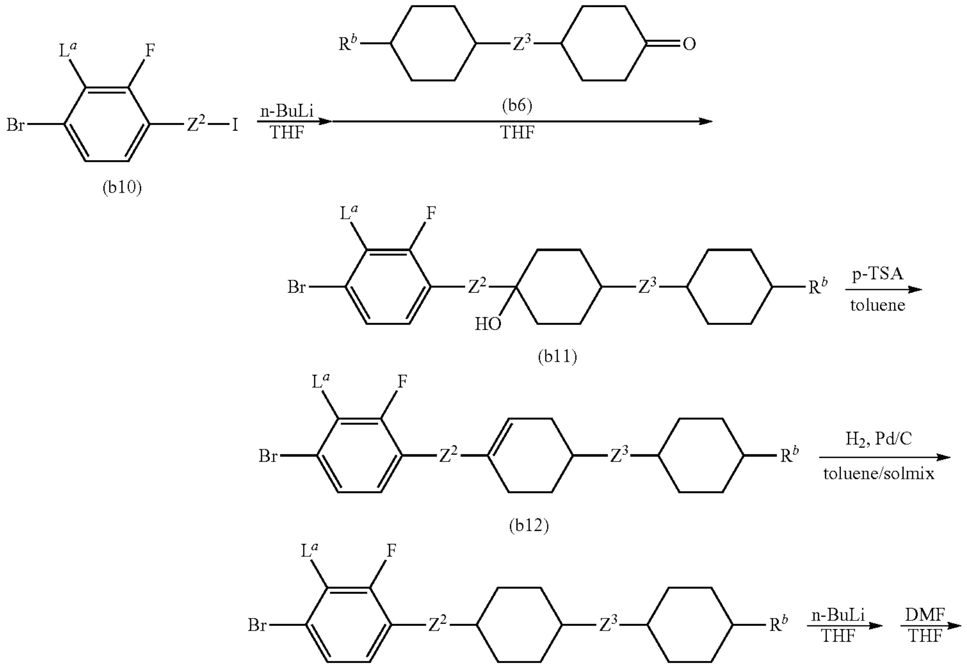

(b10) (b11) (b12) (b13)

-continued

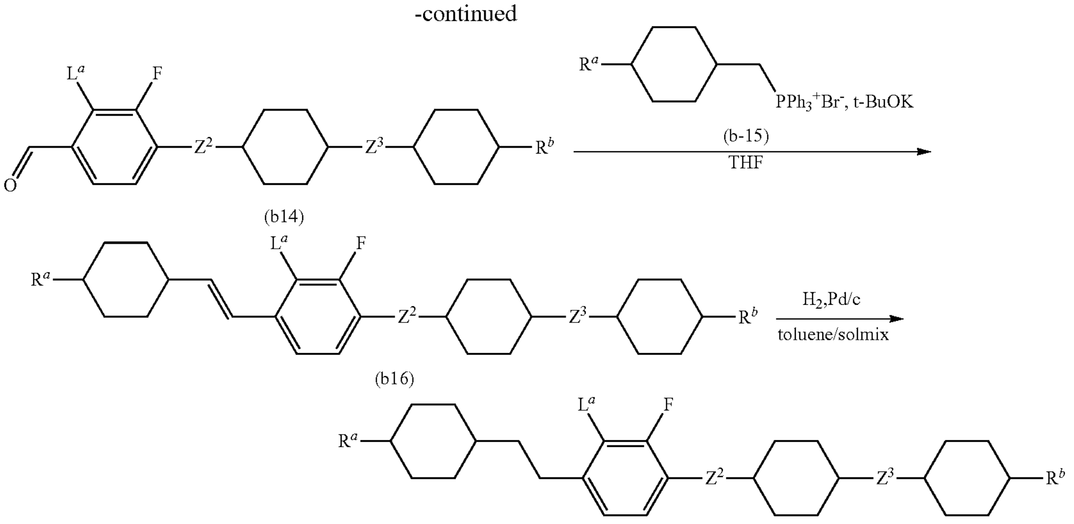

(b14)

(b16)

(b17)

In these formulas, $R^a$, $R^b$, $Z^2$, $Z^3$ and $L^a$ have the meanings identical to those described above.

A lithium salt is prepared by reacting the compound (b10) with n-butyllithium. The alcohol derivative (b11) is obtained by reacting this lithium salt with the carbonyl derivative (b6). The cyclohexene derivative (b12) is obtained by dehydrating the alcohol derivative (b11) in the presence of an acid catalyst such as p-toluenesulfonic acid. The compound (b13) is obtained by hydrogenating this compound (b12) in the presence of a catalyst such as Pd/C. A lithium salt is prepared by reacting the compound (b13) with n-butyllithium. The aldehyde derivative (b14) is obtained by reacting this lithium salt with N,N-dimethylformamide. The compound (b16) is obtained by the Wittig reaction, in which the aldehyde derivative (b14) reacts with phosphorus ylide generated by the treatment of the phosphonium salt (b15) with potassium t-butoxide. The compound (b17), which is one example of the compound (a) of the invention, can be synthesized by hydrogenating this compound (b16) in the presence of a catalyst such as Pd/C.

(III) Formation of $—CH_2O—$ or $—OCH_2—$ (Bonding Group $Z^1$)

(b13)

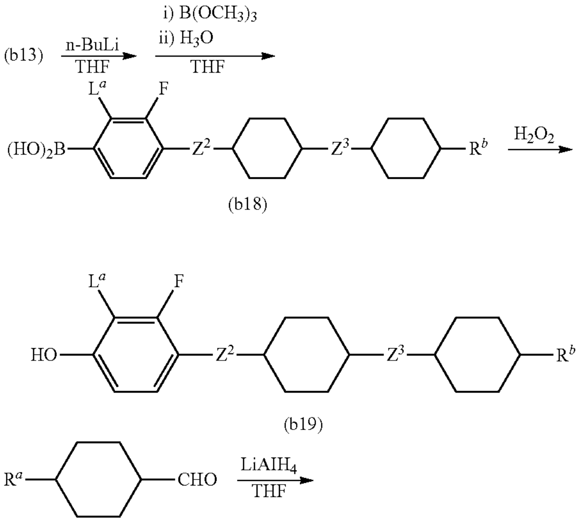

(b18)

(b19)

(b20)

-continued

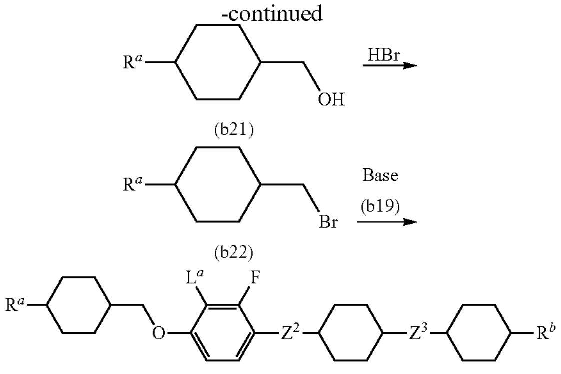

(b21)

(b22)

(b23)

In these formulas, $R^a$, $R^b$, $Z^2$, $Z^3$ and $L^a$ have the meanings identical to those described above.

As one example, a synthetic method in which $Z^1$ is $—CH_2O—$ is shown. A lithium salt is prepared by reacting the compound (b13) synthesized according to the procedure described above with n-butyllithium. The dihydroxyborane derivative (b18) is obtained by reacting this lithium salt with a boric acid ester, and then hydrolyzing the reaction product under acidic conditions. The phenol derivative (b19) is obtained by oxidizing this dihydroxyborane derivative (b18) with an oxidizing agent such as hydrogen peroxide. Separately, the compound (b21) is obtained by reducing the compound (b20) with lithium aluminum hydride or the like. Then, the compound (b22) is obtained by brominating the compound (b21) with hydrobromic acid or the like. The compound (b23), which is one example of the compound (a) of the invention, can be synthesized by etherifying the compound (b22) by the procedure described just above, with the phenol derivative (b19) in the presence of a base such as potassium carbonate.

[B] Cases where the Terminal Group $R^a$ or $R^b$ is Alkenyl

One example of synthetic methods in which any of the terminal groups $R^a$ and $R^b$ of the compound (a) is alkenyl will be explained in the following (I) and (II). The compounds (b31) and (b33) correspond to the compound (a).

(b24)

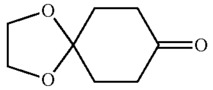

(I) Formation of Alkenyl (Terminal Group $R^a$)

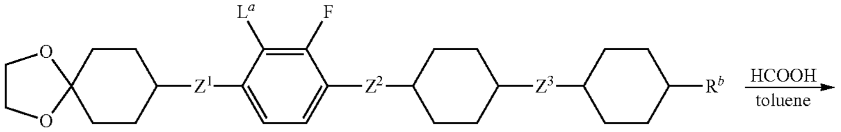

(b25)

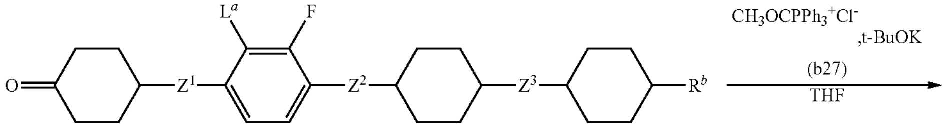

(b26)

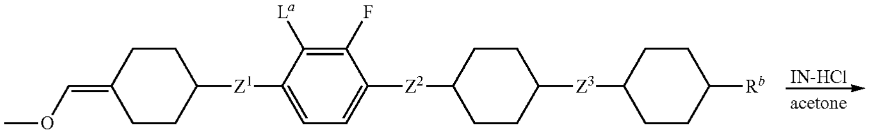

(b28)

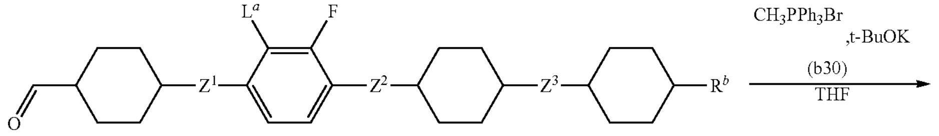

(b29)

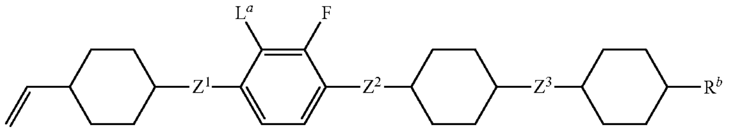

(b31)

In these formulas, $R^b$, $Z^1$, $Z^2$, $Z^3$ and $L^a$ have the meanings identical to those described above.

The compound (b25) is derived by using the compound (b24) instead of the compound (b1) in the above example of the synthetic method in which $Z^1$ a single bond. The carbonyl derivative (b26) is obtained by deprotecting this compound (b25) using formic acid. The compound (b28) is obtained by the Wittig reaction, in which the carbonyl derivative (b26) reacts with the phosphorus ylide generated by the treatment of the phosphonium salt (b27) with potassium t-butoxide. The compound (b31), which is one example of the compound (a) of the invention, can be synthesized by the Wittig reaction, in which the aldehyde derivative (b29) reacts with the phosphorus ylide generated by the treatment of the phosphonium salt (b30) with potassium t-butoxide.

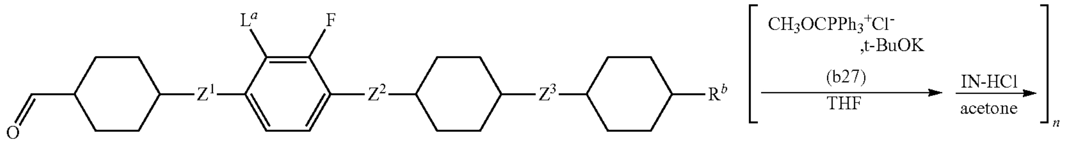

(b29)

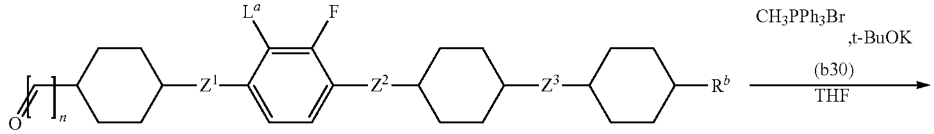

(b32)

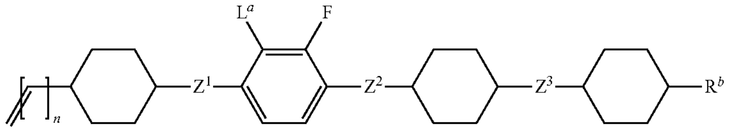

(b33)

In these formulas, $R^b$, $Z^1$, $Z^2$, $Z^3$ and $L^a$ have the meanings identical to those described above, and n is an integer of 1 to 8.

The aldehyde derivative (b32) having two or more carbons is obtained by the Wittig reaction, in which the aldehyde derivative (b29) obtained according to the procedure described above reacts with the phosphorus ylide obtained by the treatment of the phosphonium salt (b27) with potassium t-butoxide, and by the treatment with hydrochloric acid, and then by repetitions of this procedure several times (n times). The compound (b33) having alkenyl with three or more carbons, which is one example of the compound (a) of the invention, is synthesized by the Wittig reaction, in which the aldehyde derivative (b32) reacts with the phosphorus ylide generated by the treatment of the phosphonium salt (b30) with potassium t-butoxide.

(b34)

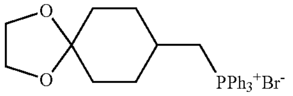

(b35)

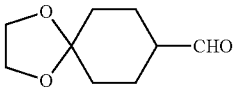

The compound (a) of the invention, in which the terminal group is alkenyl, can be synthesized by the procedure described above using the compounds (b34) and (b35) instead of the compounds (b15) and (b20), respectively, for the formation of the bonding group $Z^1$ that is $-(CH_2)_2-$, $-CH_2O-$ or $-OCH_2-$.

(b36)

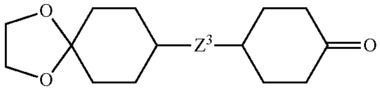

(II) Formation of Alkenyl (Terminal Group $R^b$)

The compound (a) of the invention, in which the terminal group is alkenyl, is synthesized according to the procedure described above by using the compound (b36) instead of the compound (b6), for the formation of the terminal group $R^b$ that is alkenyl, which is at the opposite side to $R^a$.

[C] Cases where the Terminal Group $R^a$ or $R^b$ is Alkoxy

One example of synthetic methods in which any of the terminal groups $R^a$ and $R^b$ of the compound (a) is alkoxy will be explained in the following (I) and (II). The compound (b39) corresponds to the compound (a).

(I) Formation of Alkoxy (Terminal Group $R^a$)

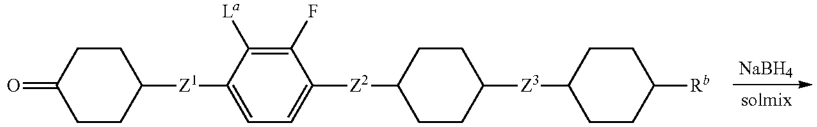

(b26)

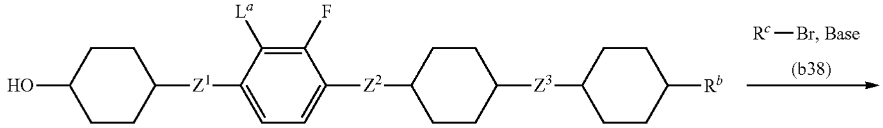

(b37)

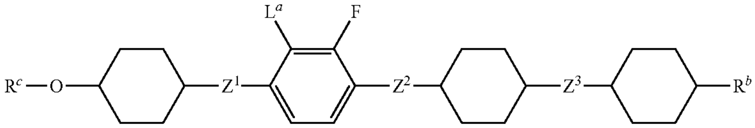

(b39)

In these formulas, $R^b$, $Z^1$, $Z^2$, $Z^3$ and $L^a$ have the meanings identical to those described above, and $R^c$ is alkyl having 1 to 9 carbons, alkenyl having 2 to 9 carbons or alkoxy having 1 to 9 carbons.

The carbonyl derivative (b25) is obtained according to the procedure described above. The alcohol derivative (b37) is obtained by reducing the derivative (b25) with $NaBH_4$. The compound (b39), which is one example of the compound (a) of the invention, can be synthesized by etherifying the alcohol derivative (b37) with the compound (b38) in the presence of a base.

(II) Formation of Alkoxy (Terminal Group $R^b$)

The compound (a) of the invention, in which the terminal group is alkenyl, is synthesized according to the procedure described above by using the compound (b36) instead of the compound (b6), for the formation of the terminal group $R^b$ that is alkoxy, which is at the opposite side to $R^a$.

[Liquid Crystal Composition (a)]

The second aspect of the invention is a composition that contains a compound represented by formula (a), preferably a liquid crystal composition that can be used for liquid crystal materials. The liquid crystal composition of the invention is required to contain a compound represented by formula (a) of the invention as the component A. The composition may be a mixture of the component A with other components in which their names are not especially described in the specification. However, the liquid crystal compositions (a), (b), (c), (d), (e) and so forth having various characteristics, of the invention can be provided by adding a component selected from the components B, C, D and E shown below to the component A.

A desirable component added to the component A is the component B consisting of at least one compound selected from the group of compounds represented by formulas (2), (3) and (4), or the component C consisting of at least one compound selected from the group of compounds represented by formula (5), or the component D consisting of at least one compound selected from the group of compounds represented by formulas (6), (7), (8), (9) and (10) [These are the liquid crystal compositions (b), (c) and (d), respectively]. Furthermore, the threshold voltage, the temperature range of the liquid crystal phase, the refractive index anisotropy, the dielectric anisotropy, the viscosity and so forth can be adjusted by mixing the component E consisting of at least one compound selected from the group of compounds represented by formulas (11), (12) and (13) [This is the liquid crystal composition (e)].

There is no significant difference in physical properties between each of components of the liquid crystal composition used in the invention and each of homologs consisting of an isotope of each element.

In the component B, suitable examples of compounds represented by formula (2) include the compounds (2-1) to (2-16), suitable examples of compounds represented by formula (3) include the compounds (3-1) to (3-112), and suitable examples of compounds represented by formula (4) include the compounds (4-1) to (4-52).

(2-1)

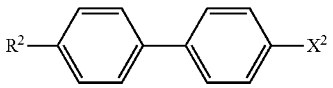

(2-2)

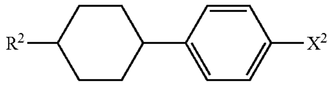

(2-3)

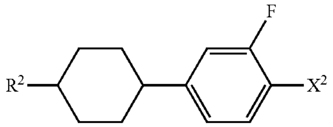

(2-4)

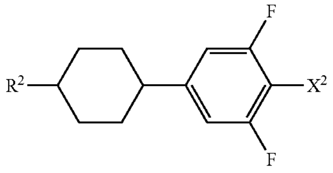

(2-5)

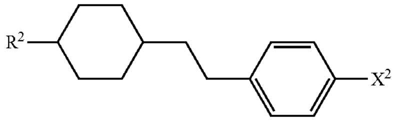

(2-6)

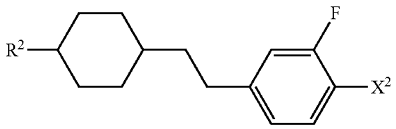

-continued (2-7)

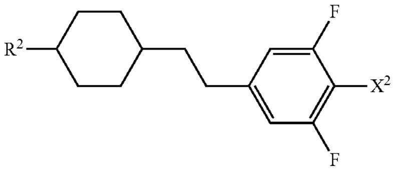

(2-8)

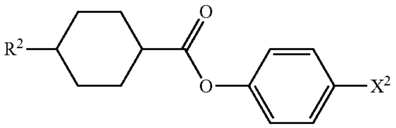

(2-9)

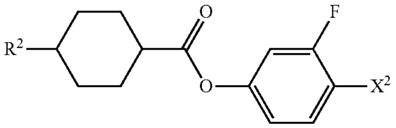

(2-10)

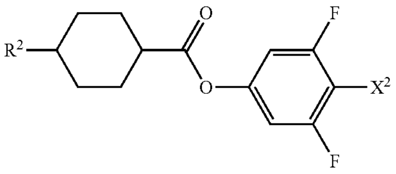

(2-11)

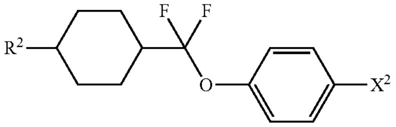

(2-12)

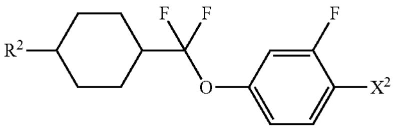

(2-13)

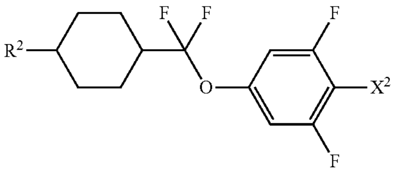

(2-14)

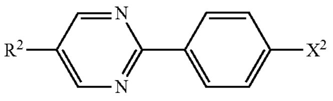

(2-15)

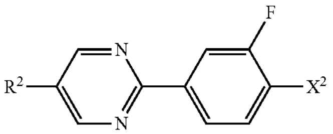

(2-16)

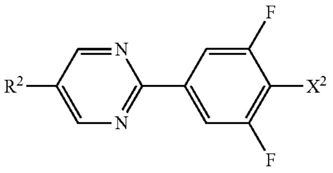

(3-1)

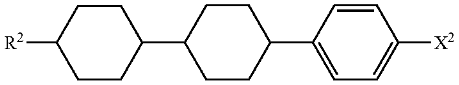

-continued
(3-2)
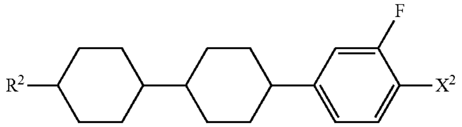
(3-3)
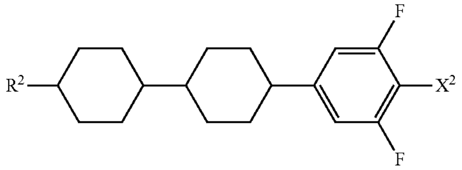
(3-4)
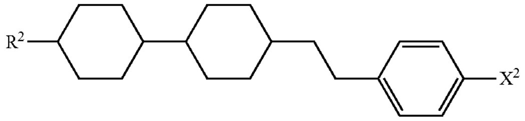
(3-5)
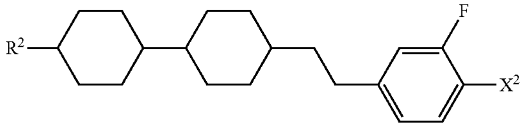
(3-6)
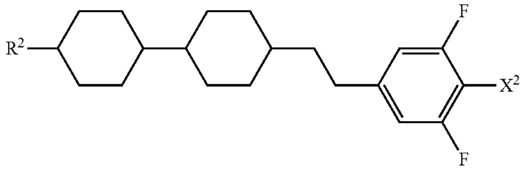
(3-7)
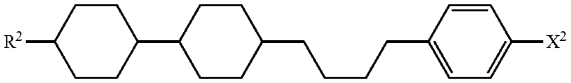
(3-8)
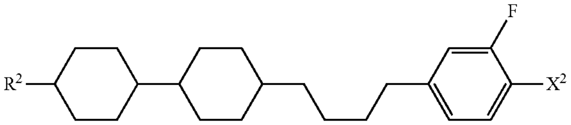
(3-9)
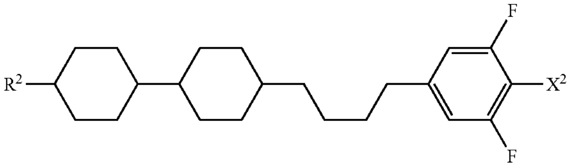
(3-10)
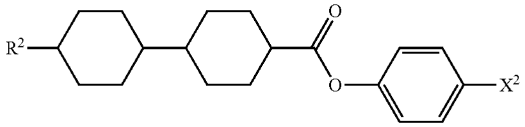
(3-11)
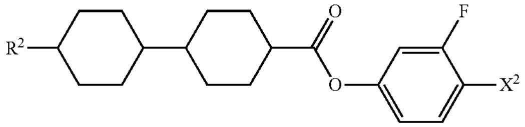
-continued
(3-12)
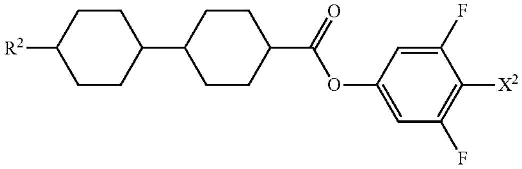
(3-13)
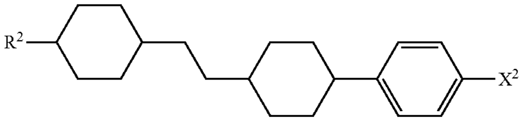
(3-14)
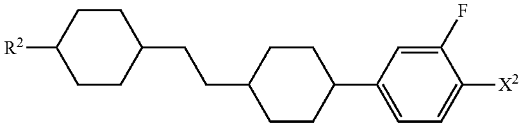
(3-15)
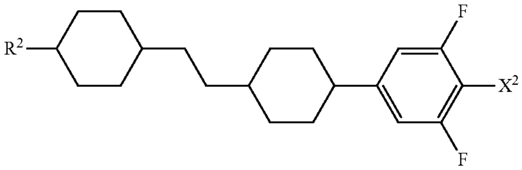
(3-16)
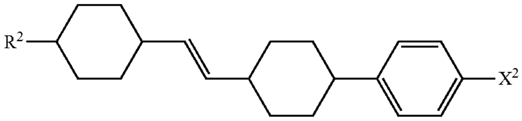
(3-17)
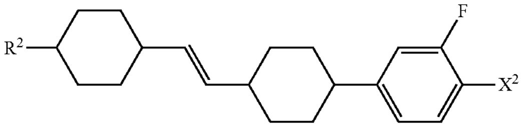
(3-18)
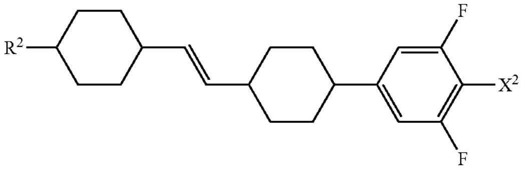
(3-19)
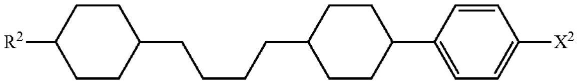
(3-20)
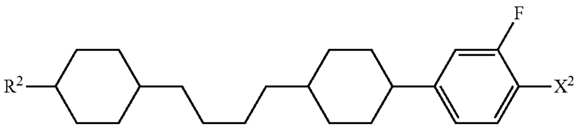

-continued
(3-21)
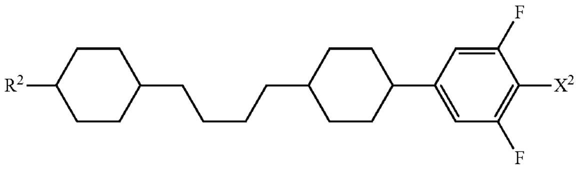
(3-22)
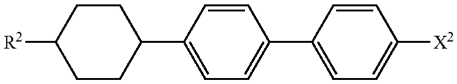
(3-23)
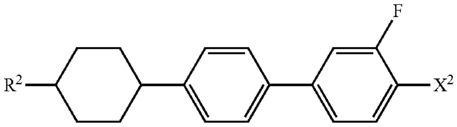
(3-24)
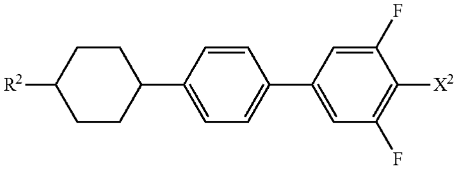
(3-25)
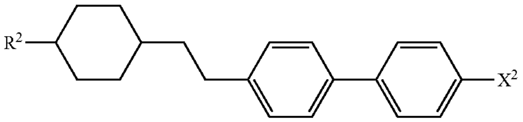
(3-26)
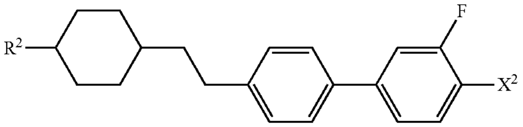
(3-27)
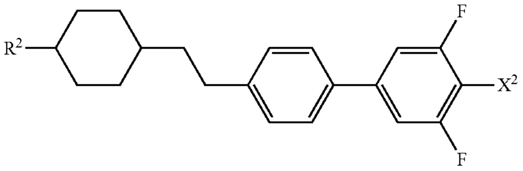
(3-28)
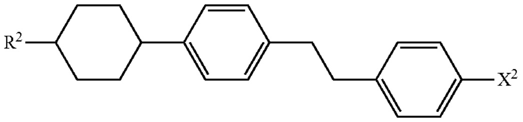
(3-29)
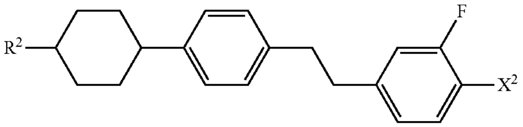
(3-30)
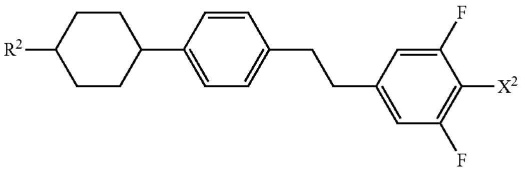
-continued
(3-31)
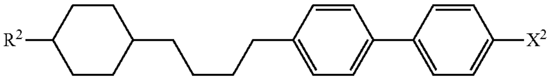
(3-32)
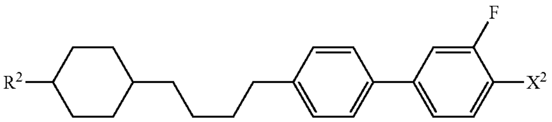
(3-33)
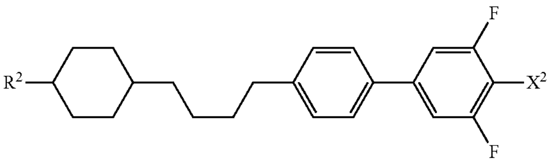
(3-34
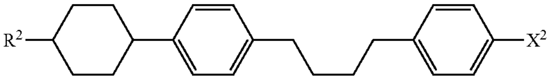
(3-35)
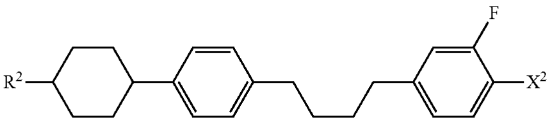
(3-36)
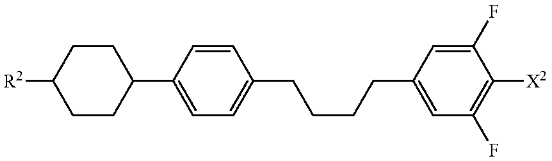
(3-37)
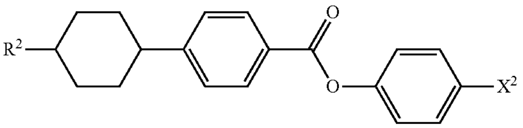
(3-38)
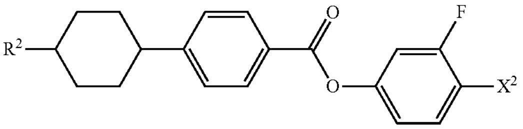
(3-39)
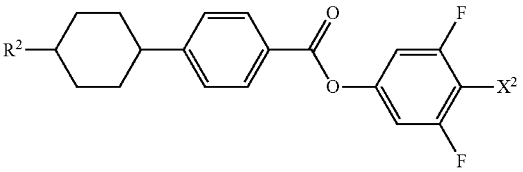
(3-40)
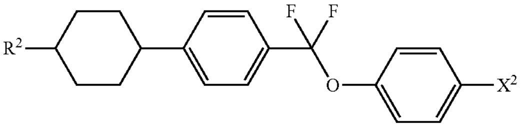

-continued
(3-41)
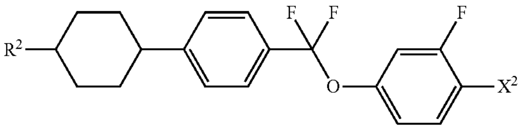
(3-42)
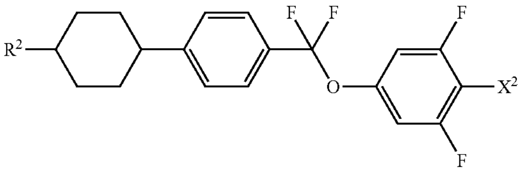
(3-43)
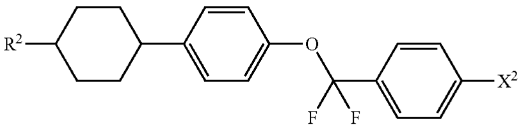
(3-44)
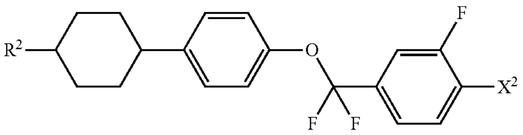
(3-45)
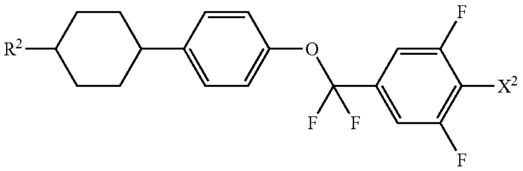
(3-46)
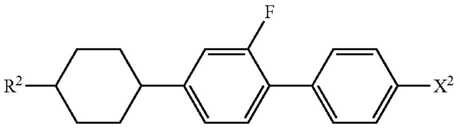
(3-47)
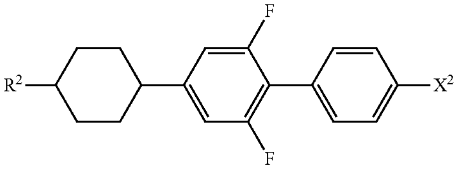
(3-48)
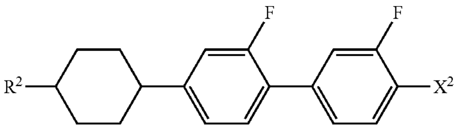
(3-49)
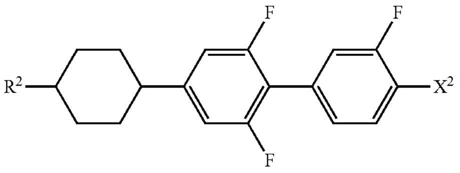
-continued
(3-50)
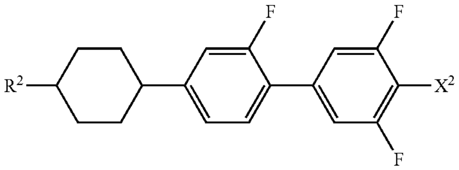
(3-51)
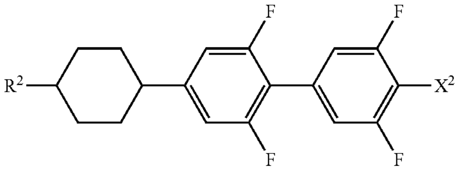
(3-52)
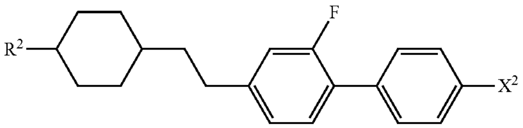
(3-53)
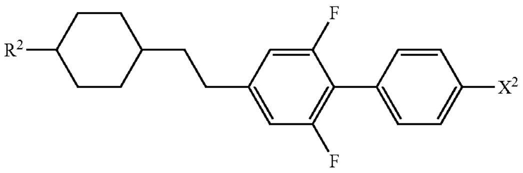
(3-54)
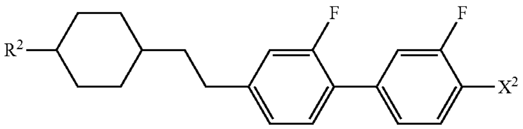
(3-55)
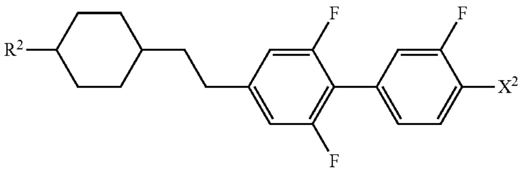
(3-56)
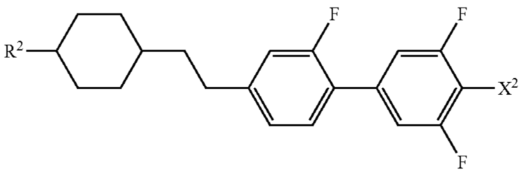
(3-57)
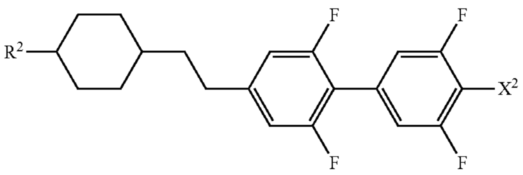

-continued
(3-58)
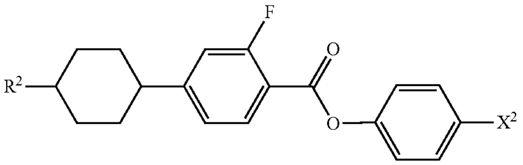
(3-59)
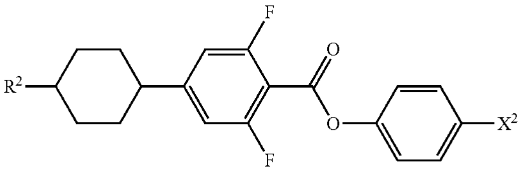
(3-60)
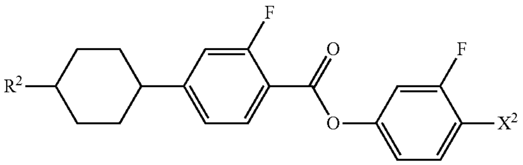
(3-61)
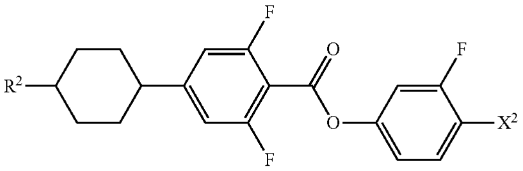
(3-62)
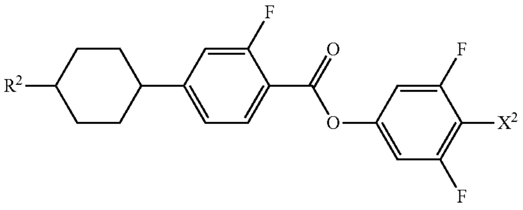
(3-63)
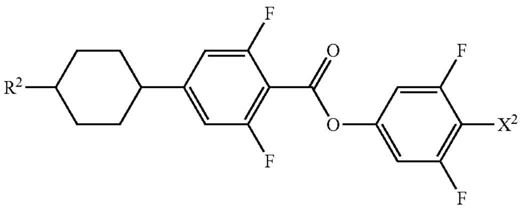
(3-64)
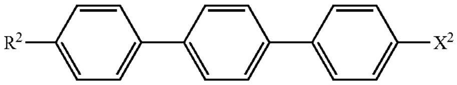
(3-65)
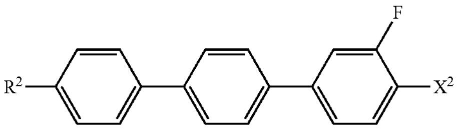
-continued
(3-66)
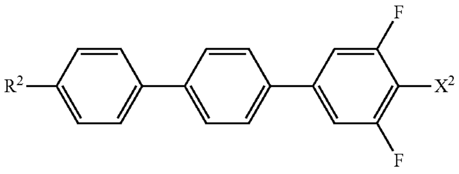
(3-67)
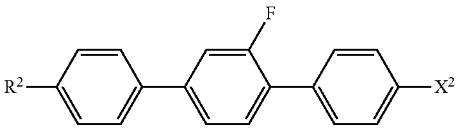
(3-68)
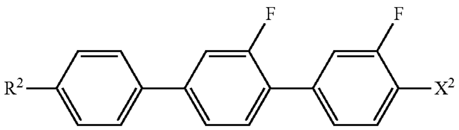
(3-69)
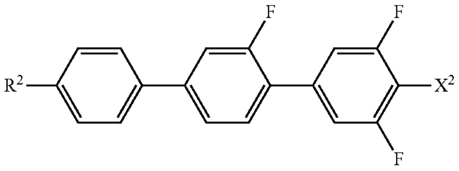
(3-70)
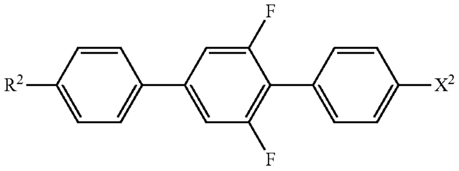
(3-71)
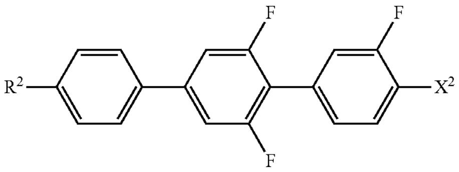
(3-72)
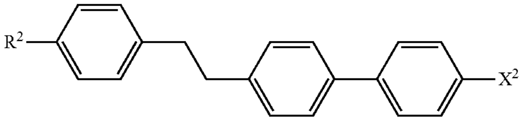
(3-73)
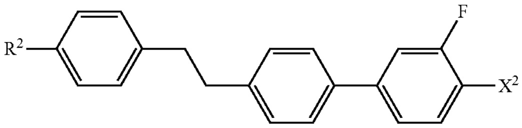
(3-74)
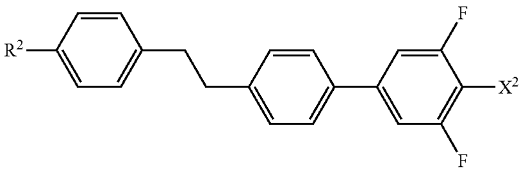

-continued
(3-75)
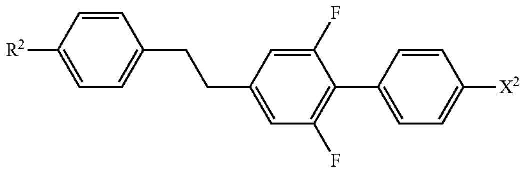
(3-76)
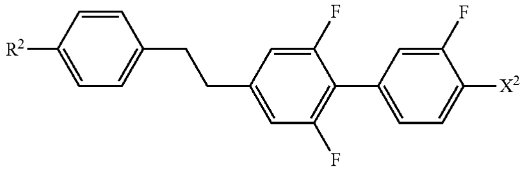
(3-77)
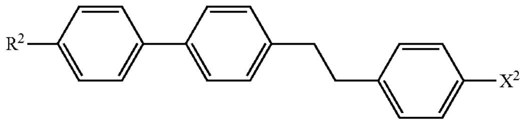
(3-78)
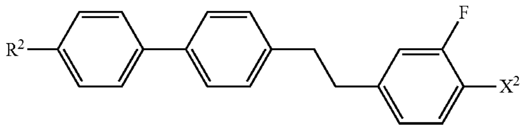
(3-79)
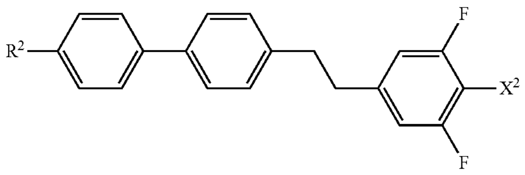
(3-80)
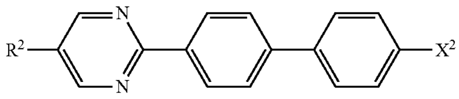
(3-81)
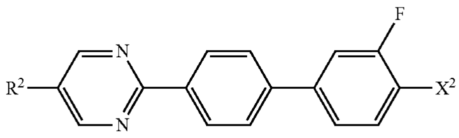
(3-82)
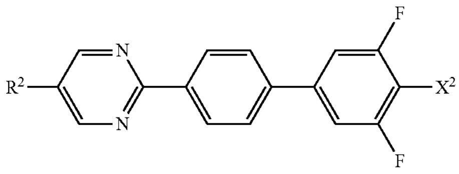
(3-83)
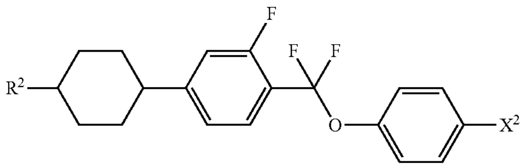
-continued
(3-84)
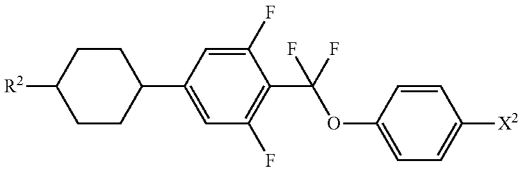
(3-85)
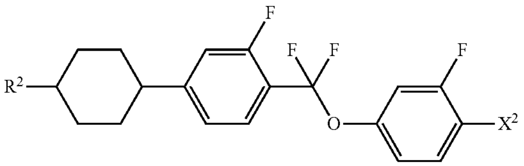
(3-86)
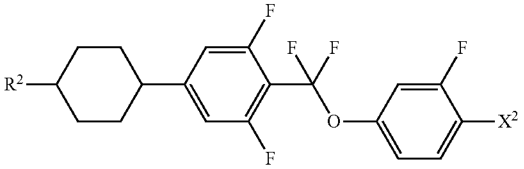
(3-87)
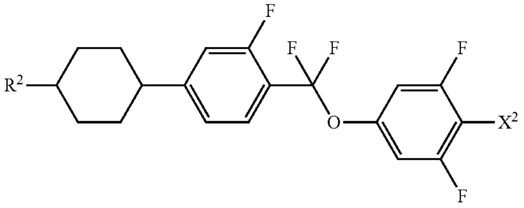
(3-88)
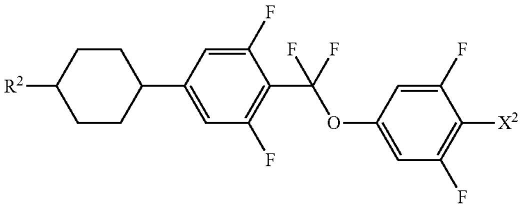
(3-89)
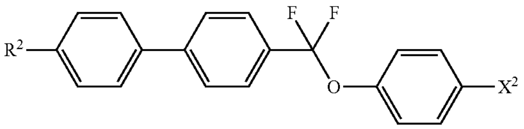
(3-90)
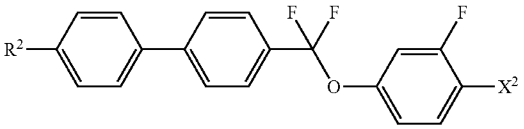
(3-91)
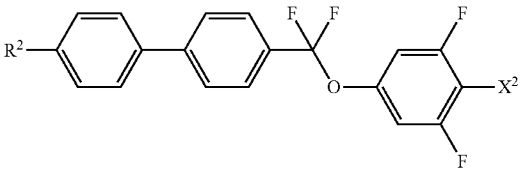

-continued
(3-92)
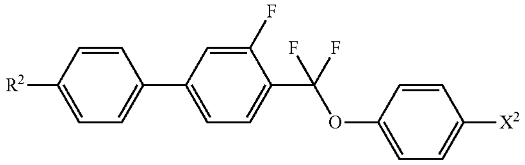
(3-93)
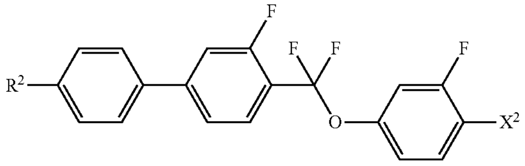
(3-94)
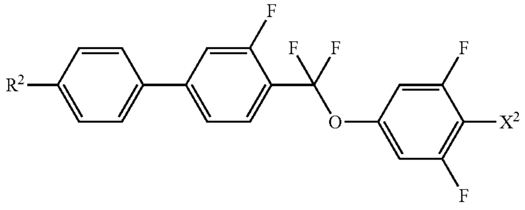
(3-95)
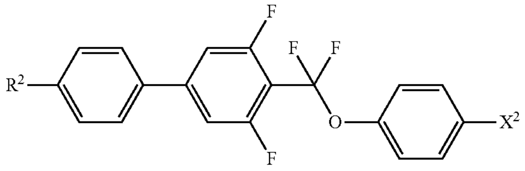
(3-96)
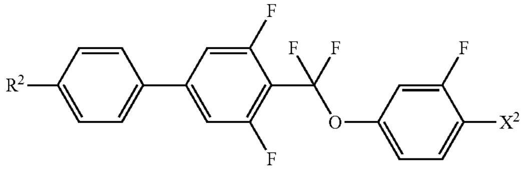
(3-97)
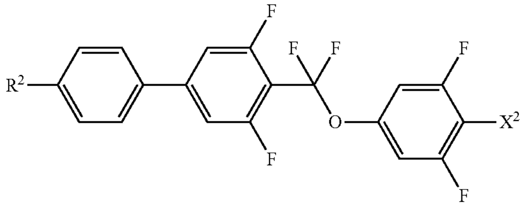
(3-98)
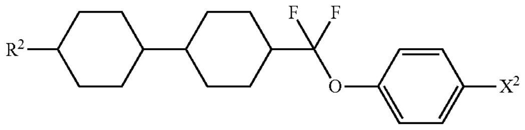
(3-99)
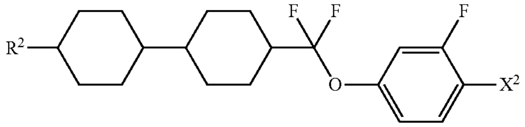
-continued
(3-100)
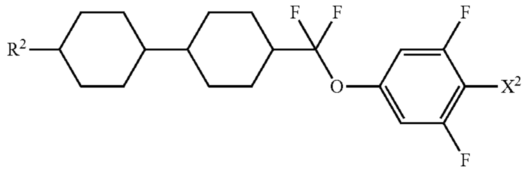
(3-101)
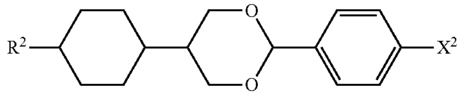
(3-102)
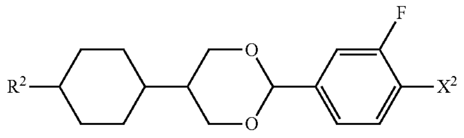
(3-103)
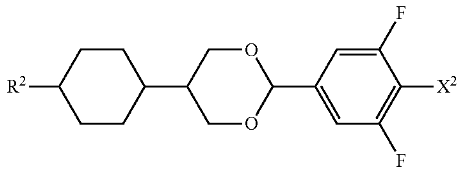
(3-104)
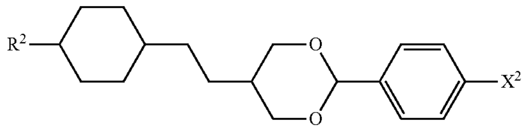
(3-105)
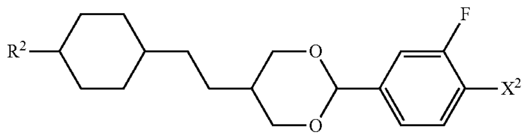
(3-106)
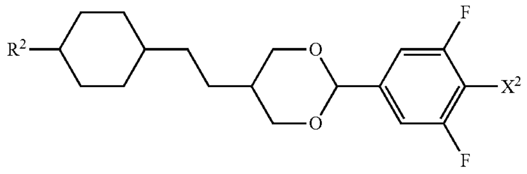
(3-107)
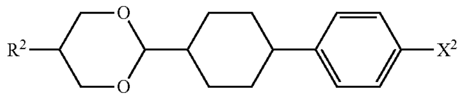
(3-108)
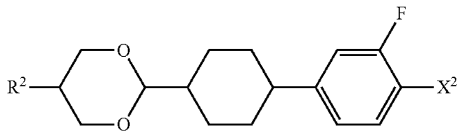
(3-109)
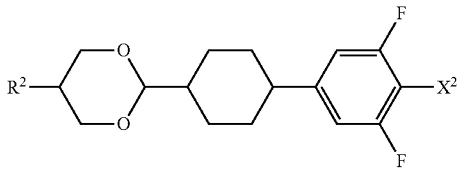

-continued
(3-110)
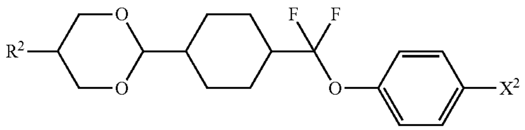
(3-111)
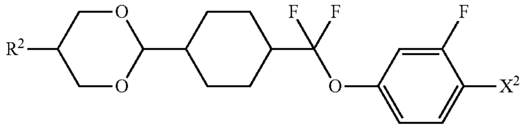
(3-112)
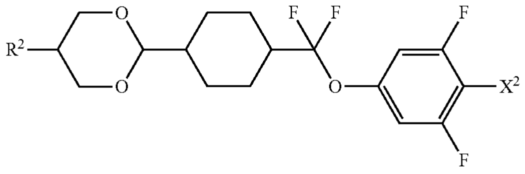
(4-1)
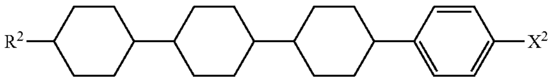
(4-2)
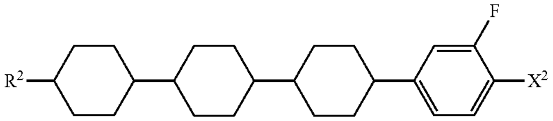
(4-3)
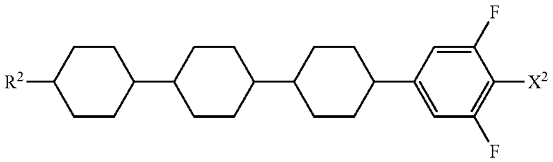
(4-4)
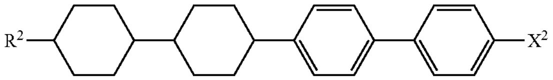
(4-5)
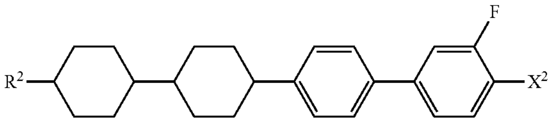
(4-6)
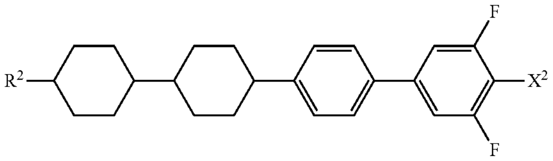
(4-7)
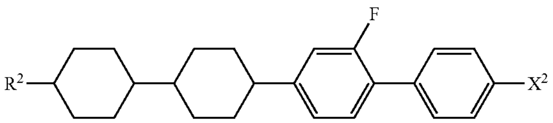
-continued
(4-8)
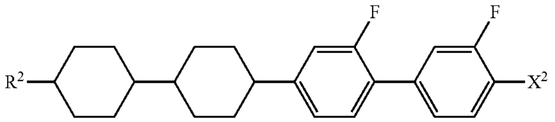
(4-9)
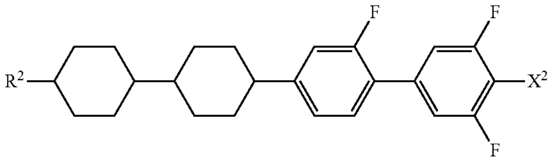
(4-10)
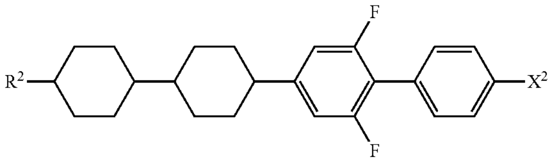
(4-11)
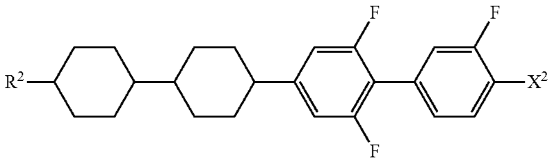
(4-12)
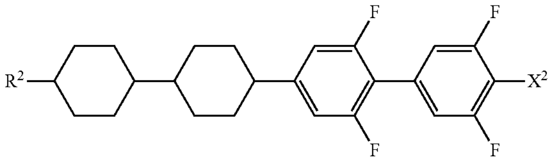
(4-13)
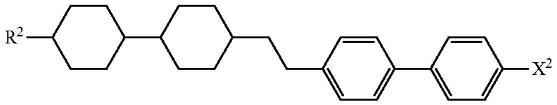
(4-14)
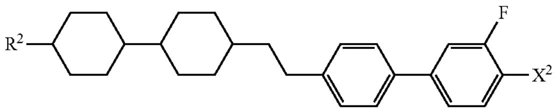
(4-15)
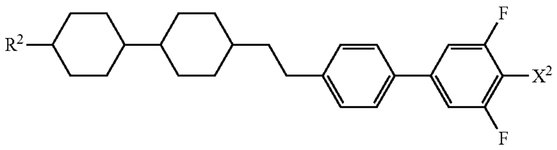
(4-16)
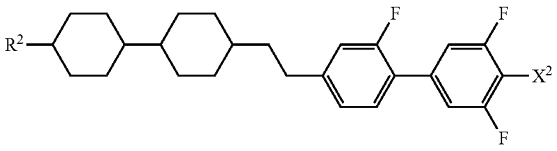

-continued
(4-17)
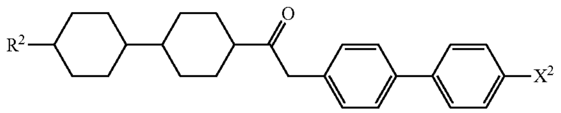
(4-18)
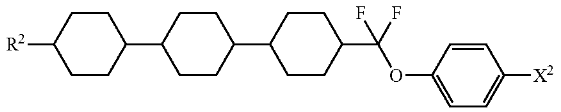
(4-19)
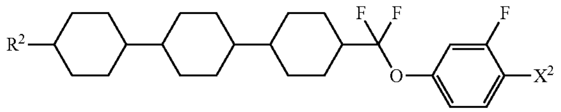
(4-20)
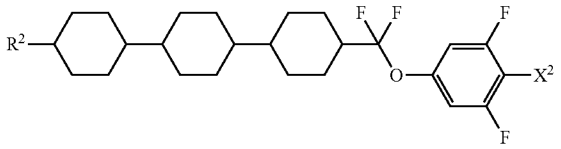
(4-21)
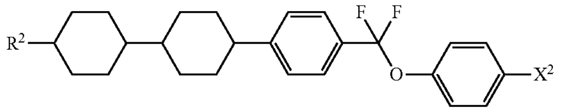
(4-22)
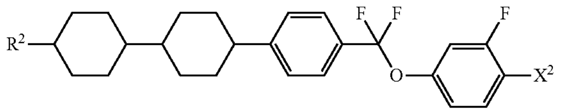
(4-23)
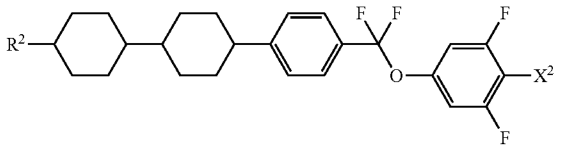
(4-24)
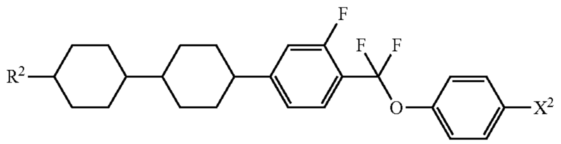
(4-25)
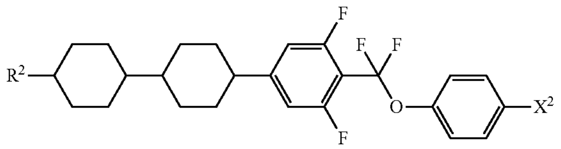
(4-26)
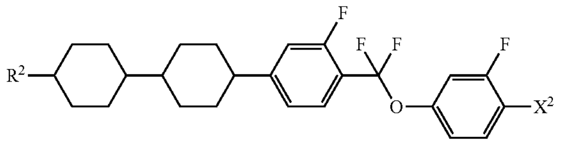
-continued
(4-27)
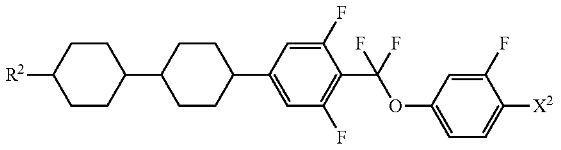
(4-28)
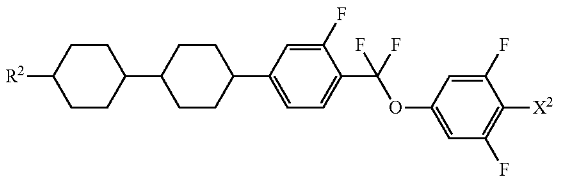
(4-29)
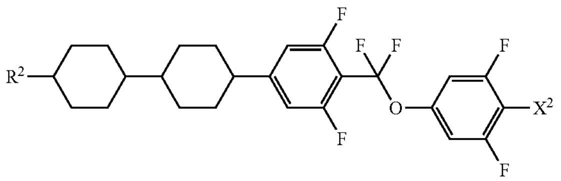
(4-30)
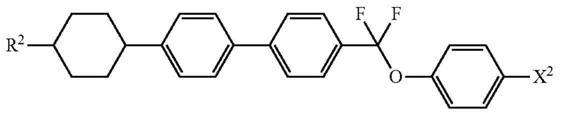
(4-31)
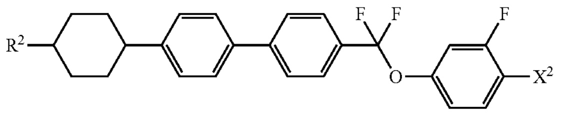
(4-32)
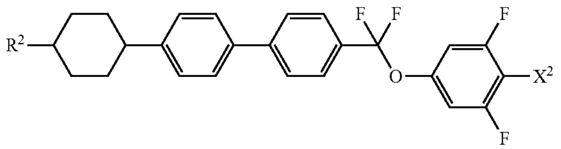
(4-33)
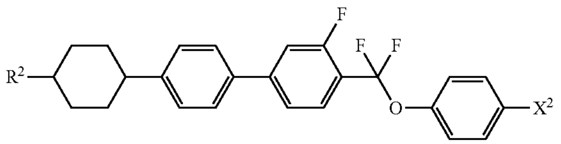
(4-34)
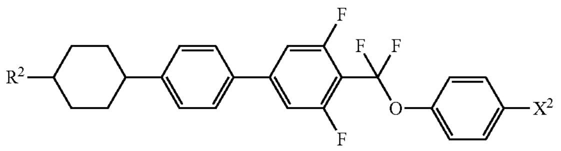
(4-35)
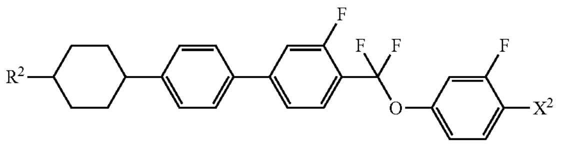

-continued
(4-36)
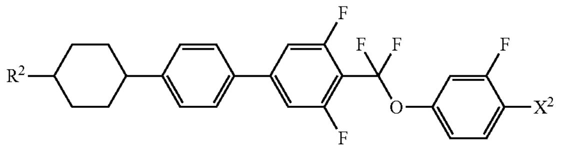
(4-37)
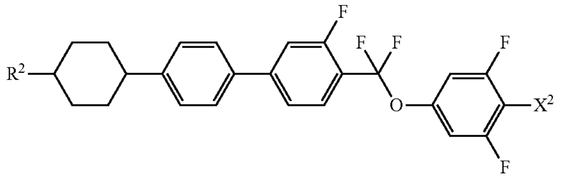
(4-38)
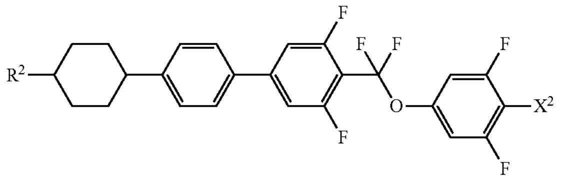
(4-39)
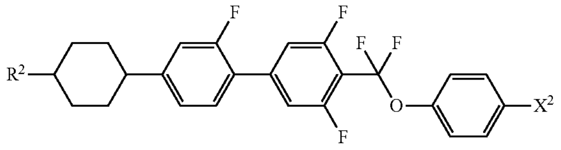
(4-40)
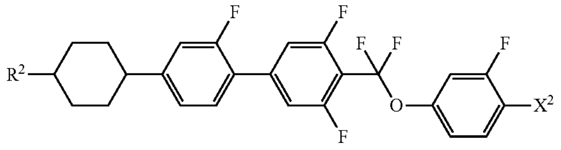
(4-41)
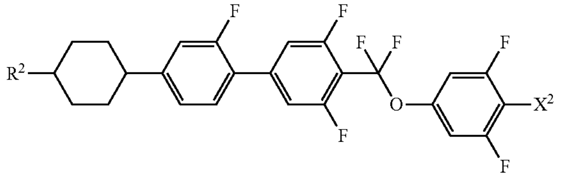
(4-42)
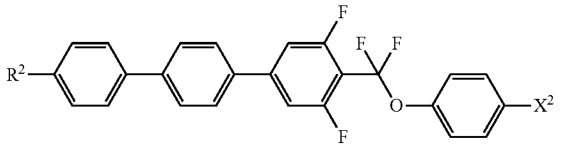
(4-43)
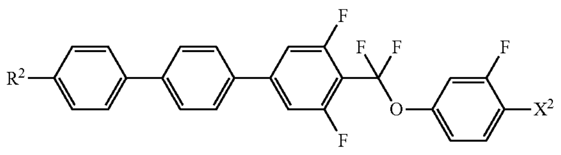
-continued
(4-44)
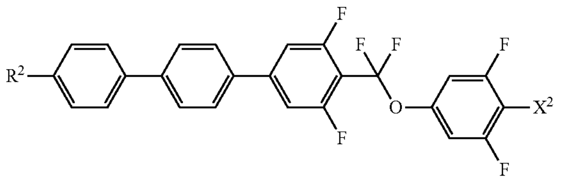
(4-45)
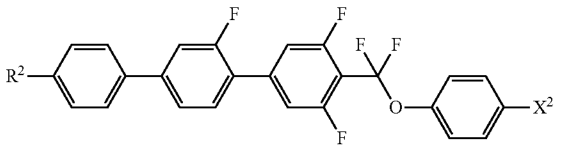
(4-46)
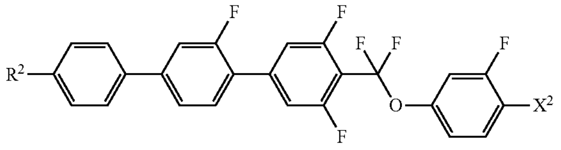
(4-47)
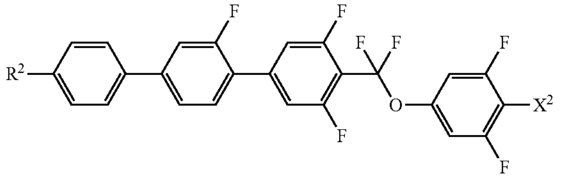
(4-48)
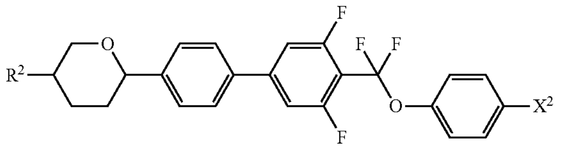
(4-49)
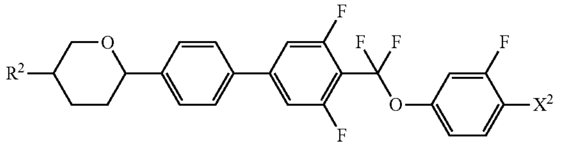
(4-50)
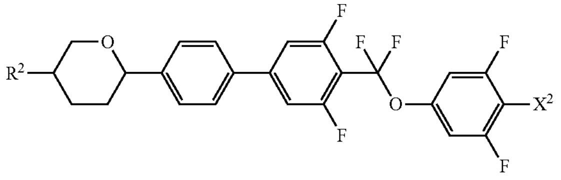
(4-51)
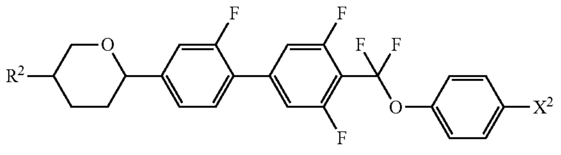

-continued (4-52)

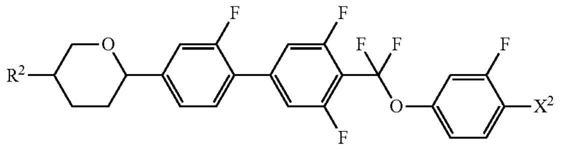

(4-53)

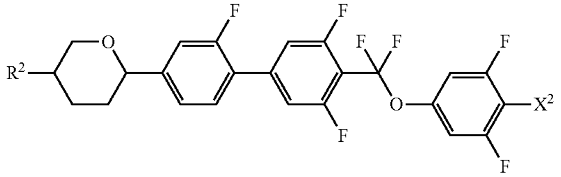

(4-54)

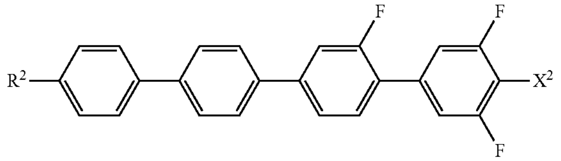

In these formulas, $R^2$ and $X^2$ have the meanings identical to those described above.

Because compounds represented by these formulas (2) to (4), namely the component B, have positive dielectric anisotropy, and are quite excellent in heat stability and chemical stability, they are used for preparing a liquid crystal composition for TFT. The content of the component B in the liquid crystal composition of the invention is suitably in the range of 1% to 99% by weight, preferably in the range of 10% to 97% by weight, and more preferably in the range of 40% to 95% by weight based on the total weight of the liquid crystal composition. The viscosity can be adjusted by further adding a compound represented by these formulas (11) to (13) (the component E).

Suitable examples of compounds represented by formula (5), namely the component C, include formulas (5-1) to (5-62).

(5-1)

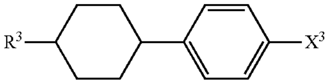

(5-2)

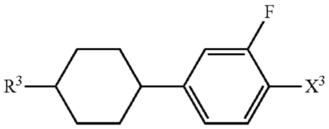

(5-3)

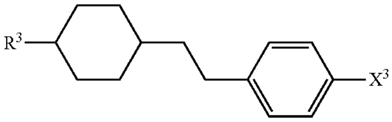

(5-4)

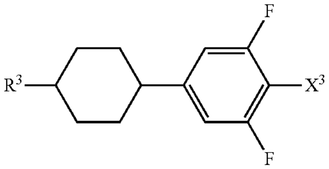

-continued (5-5)

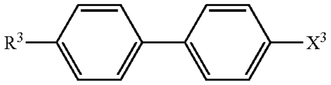

(5-6)

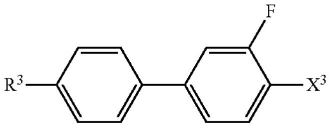

(5-7)

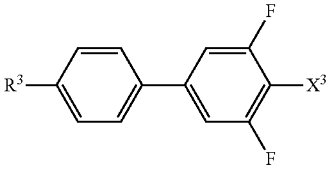

(5-8)

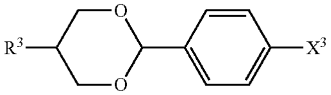

(5-9)

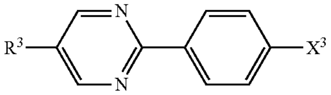

(5-10)

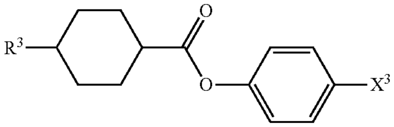

(5-11)

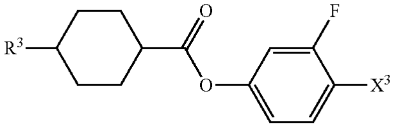

(5-12)

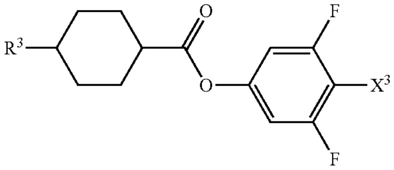

(5-13)

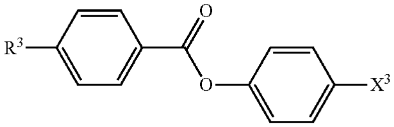

(5-14)

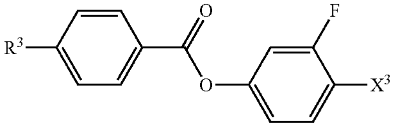

(5-15)

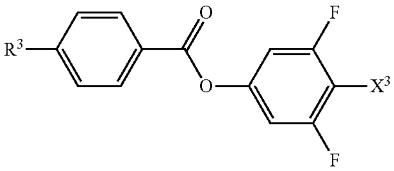

-continued
(5-16)
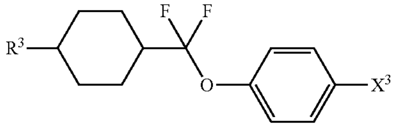
(5-17)
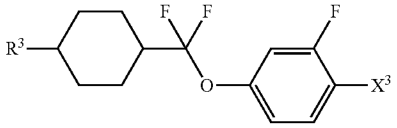
(5-18)
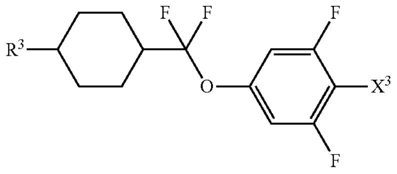
(5-19)
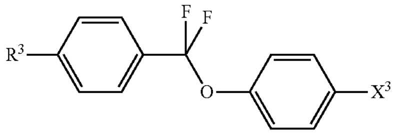
(5-20)
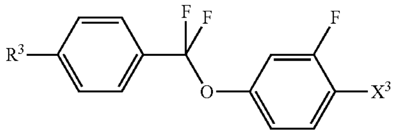
(5-21)
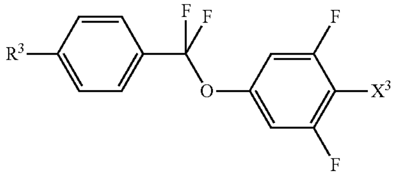
(5-22)
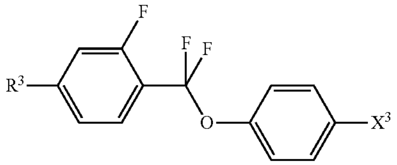
(5-23)
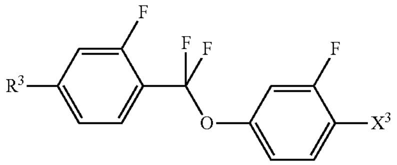
(5-24)
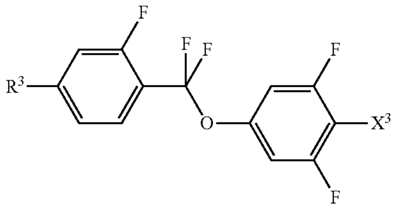
-continued
(5-25)
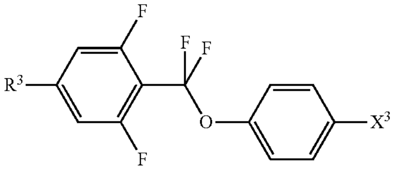
(5-26)
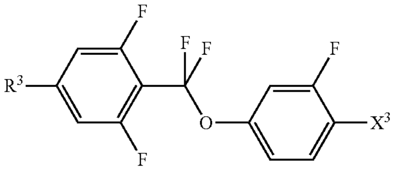
(5-27)
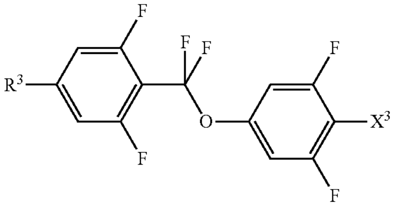
(5-28)
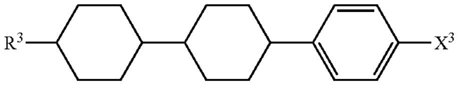
(5-29)
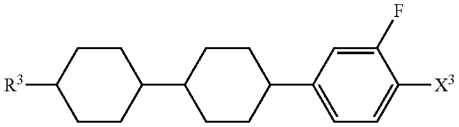
(5-30)
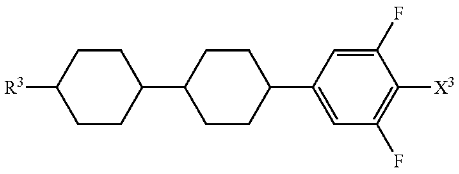
(5-31)
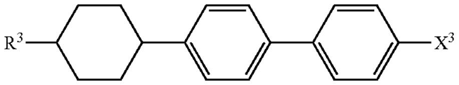
(5-32)
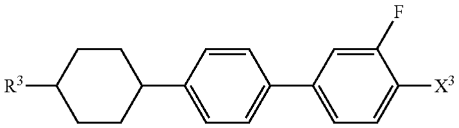
(5-33)
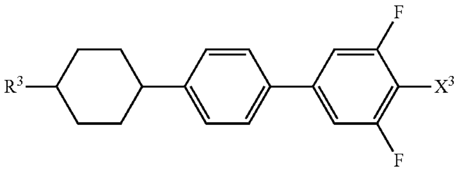
(5-34)
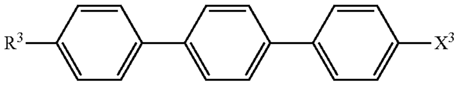
(5-35)
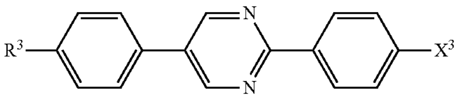

-continued
(5-36)
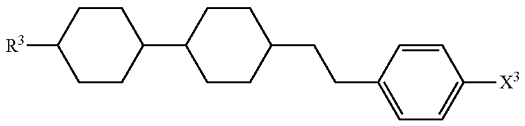
(5-37)
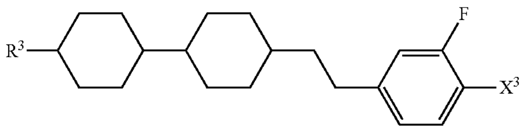
(5-38)
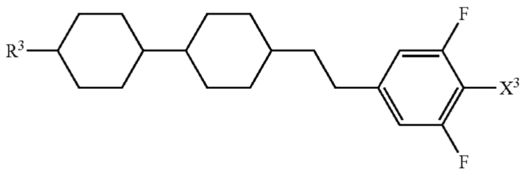
(5-39)
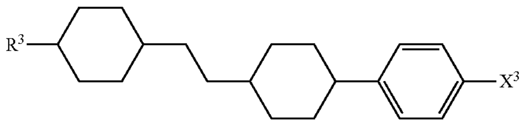
(5-40)
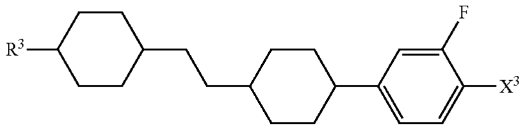
(5-41)
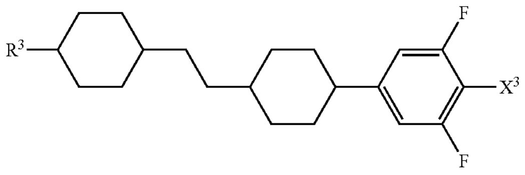
(5-42)
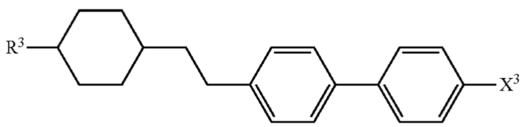
(5-43)
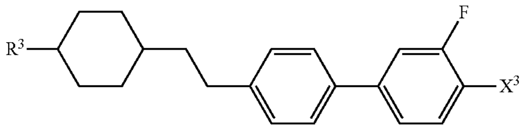
(5-44)
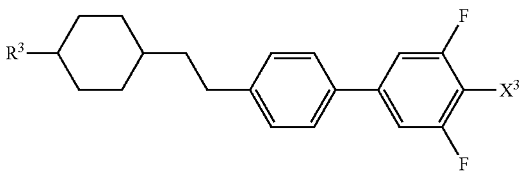
-continued
(5-45)
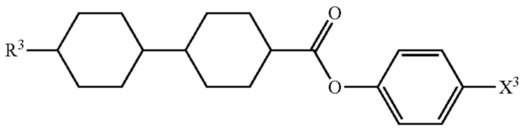
(5-46)
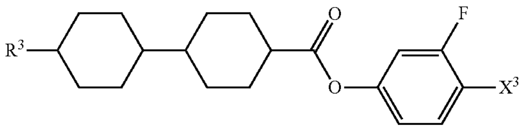
(5-47)
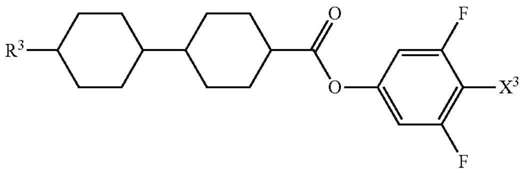
(5-48)
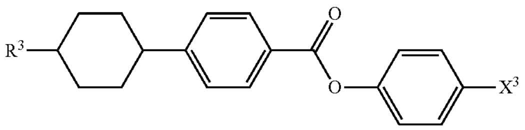
(5-49)
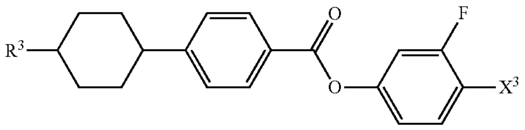
(5-50)
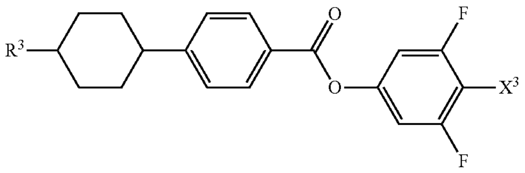
(5-51)
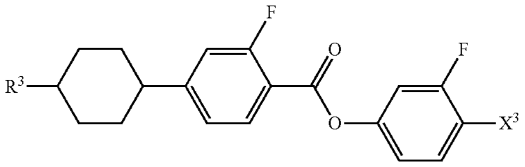
(5-52)
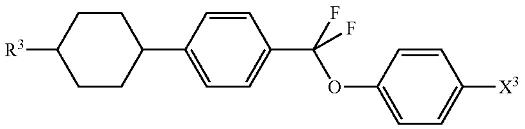
(5-53)
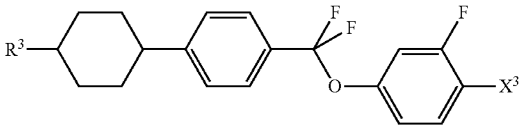

-continued (5-54)

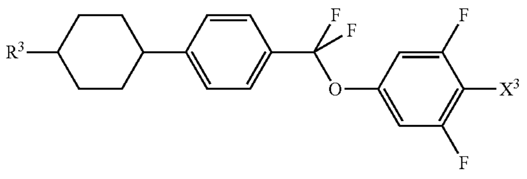

(5-55)

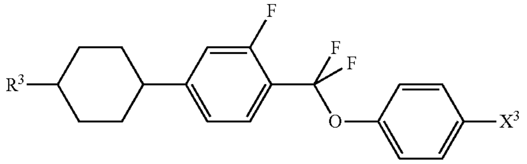

(5-56)

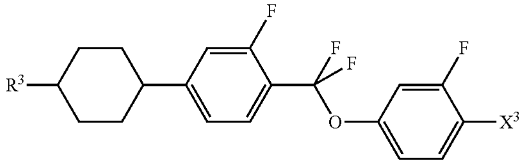

(5-57)

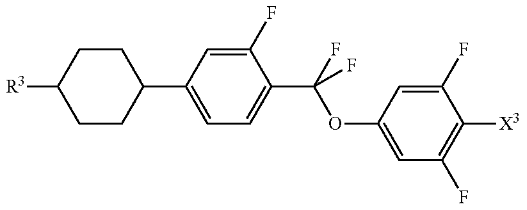

(5-58)

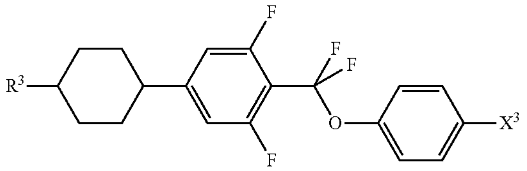

(5-59)

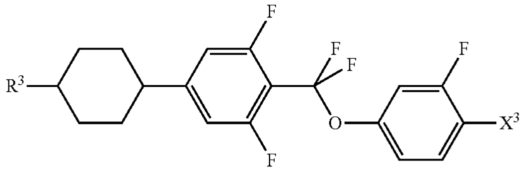

(5-60)

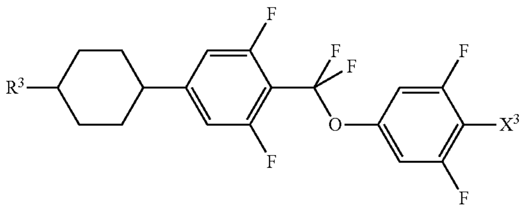

(5-61)

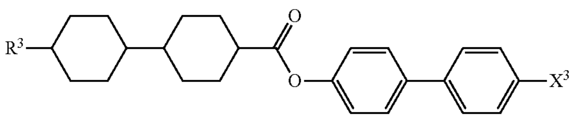

-continued (5-62)

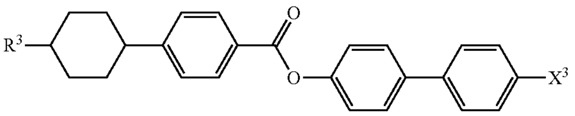

In these formulas, $R^3$ and $X^3$ have the meanings identical to those described above.

Because these compounds represented by formulas (5), namely the component C, have a very large positive dielectric anisotropy, it is mainly used for preparing a liquid crystal composition for a STN or TN mode. The threshold voltage of the composition can be decreased by adding the component C to the composition. The viscosity can be adjusted, the refractive index anisotropy can be adjusted, and the temperature ranges of the liquid crystal phase can be increased by the component C. The component C can be further utilized for an improvement of steepness.

The content of the component C is preferably in the range of 0.1% to 99.9% by weight, more preferably in the range of 10% to 97%, and most preferably 40% to 95% by weight based on the total weight of the composition, when the liquid crystal composition is prepared for a STN or TN mode. The threshold voltage, the temperature ranges of the liquid crystal phase, the refractive index anisotropy, the dielectric anisotropy, the viscosity and so forth can be adjusted by the addition of components described below.

The component D consisting at least one compound selected from the group of compounds represented by formulas (6) to (8) and formula (10) is desirable when the liquid crystal composition having negative dielectric anisotropy, of the invention is prepared for a vertical alignment (VA) mode or the like.

Suitable examples of compounds represented by these formulas (6) to (8) and formula (10) (component D) include compounds represented by formulas (6-1) to (6-5), formulas (7-1) to (7-11), formula (8-1) and formulas (10-1) to (10-11).

(6-1)

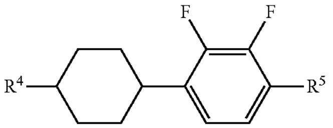

(6-2)

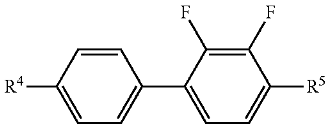

(6-3)

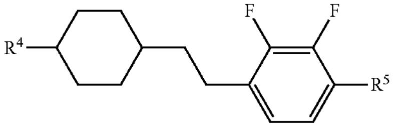

(6-4)

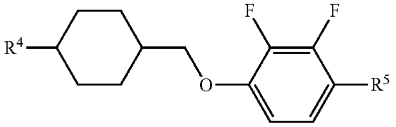

-continued
(6-5)
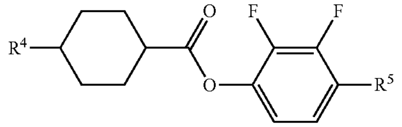
(7-1)
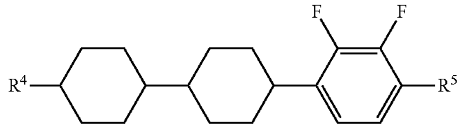
(7-2)
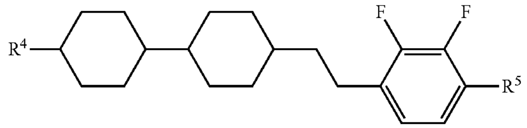
(7-3)
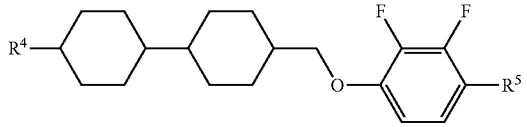
(7-4)
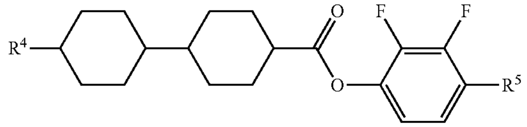
(7-5)
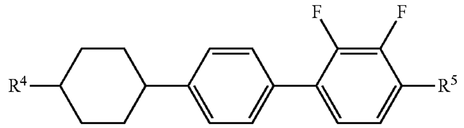
(7-6)
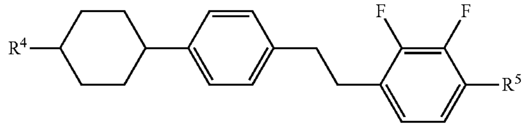
(7-7)
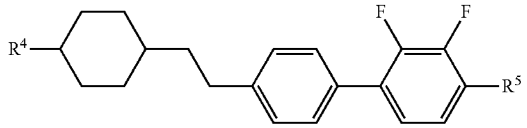
(7-8)
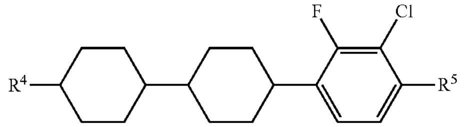
(7-9)
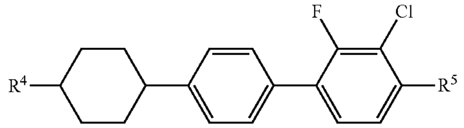
(7-10)
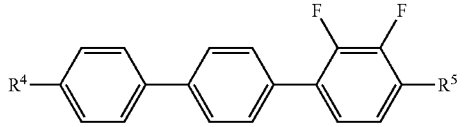
-continued
(7-11)
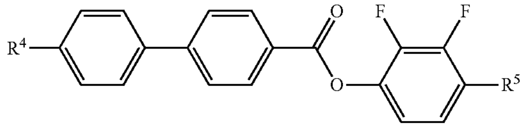
(8-1)
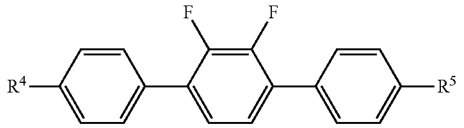
(10-1)
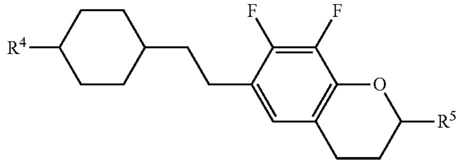
(10-2)
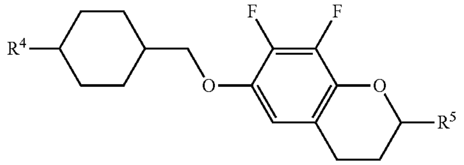
(10-3)
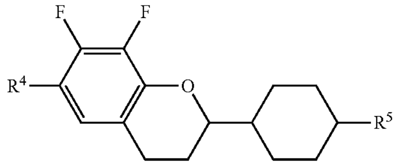
(10-4)
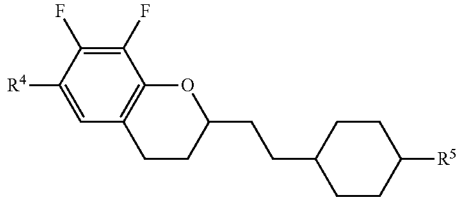
(10-5)
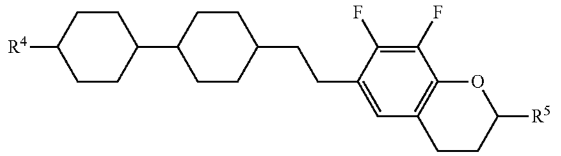
(10-6)
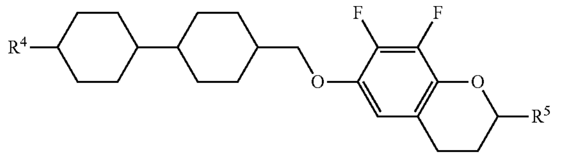
(10-7)
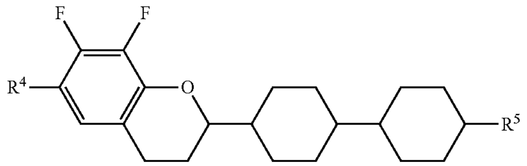

-continued (10-8)

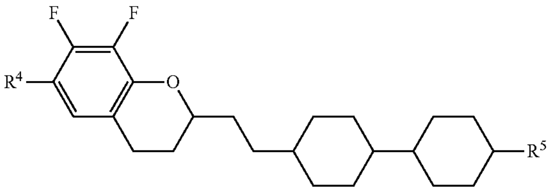

(10-9)

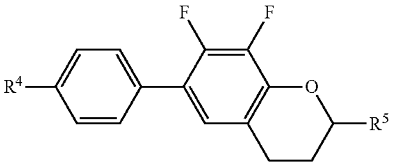

(10-10)

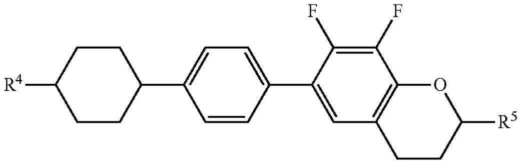

(10-11)

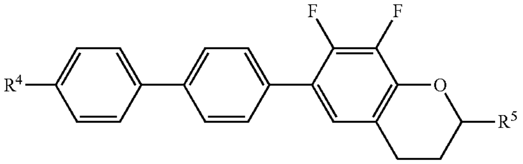

In these formulas, $R^4$ and $R^5$ have the meanings identical to those described above.

The compounds in the component D are mainly used in a liquid crystal composition for a VA mode having negative dielectric anisotropy. When the content thereof is increased, the threshold voltage of the composition is decreased but the viscosity is increased, and thus it is desirable to decrease the content as long as a desired value of threshold voltage is satisfied. However, because the absolute value of the dielectric anisotropy is around 5, the voltage-driving may not occasionally be performed when the content becomes 40% by weight or less.

Because, in the component D, compounds represented by formula (6) have two rings, they are effective mainly in adjusting the threshold voltage, the viscosity or the refractive index anisotropy. Because compounds represented by formulas (7) and (8) have three rings, they are effective in increasing the clearing point, increasing the range of the nematic phase, decreasing the threshold voltage, increasing the refractive index anisotropy, or something.

When a composition for the VA mode is prepared, the content of the component D is preferably 40% by weight or more, more preferably in the range of 50% to 95% by weight based on the total weight of the composition. The elastic constant and the voltage transmittance curve of the composition can be adjusted by mixing the component D. When the component D is mixed in a composition having positive dielectric anisotropy, its content is preferably 30% by weight or less based on the total amount of the composition.

Suitable examples of compounds represented by these formulas (11), (12) and (13) (component E) include compounds represented by formulas (11-1) to (11-11), formulas (12-1) to (12-18) and formulas (13-1) to (13-6), respectively.

(11-1)

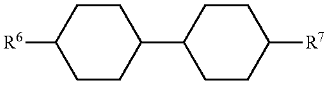

(11-2)

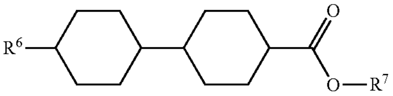

(11-3)

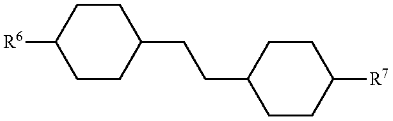

(11-4)

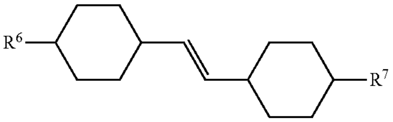

(11-5)

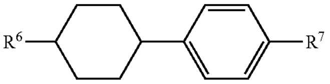

(11-6)

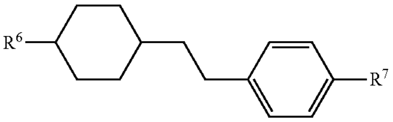

(11-7)

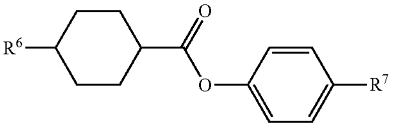

(11-8)

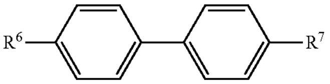

(11-9)

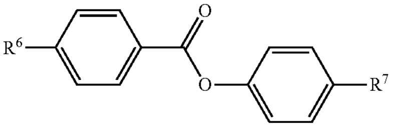

(11-10)

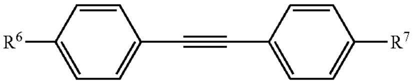

(11-11)

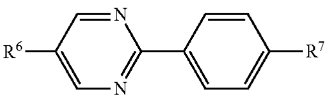

(12-1)

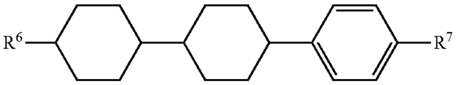

(12-2)

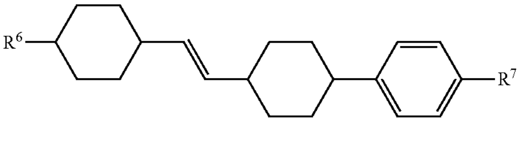

-continued (12-3)

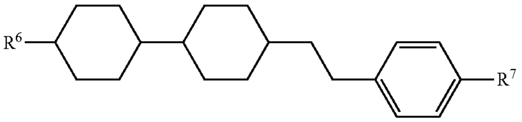

(12-4)

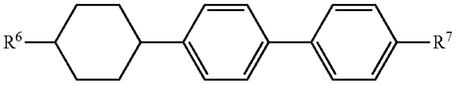

(12-5)

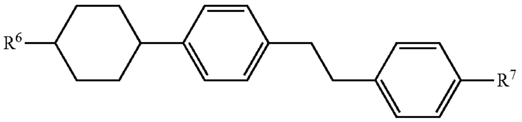

(12-6)

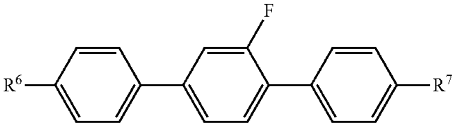

(12-7)

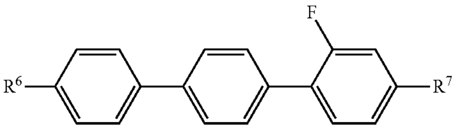

(12-8)

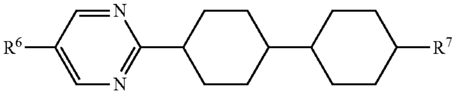

(12-9)

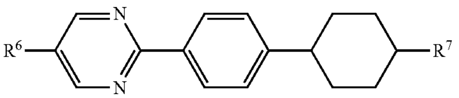

(12-10)

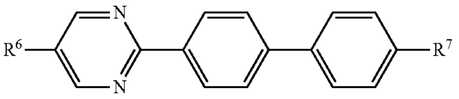

(12-11)

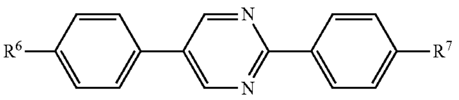

(12-12)

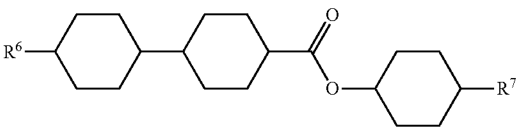

(12-13)

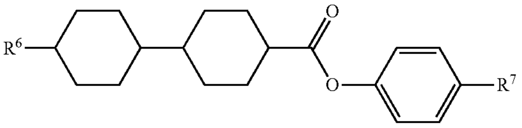

(12-14)

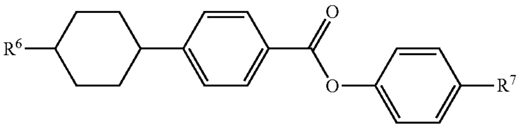

-continued (12-15)

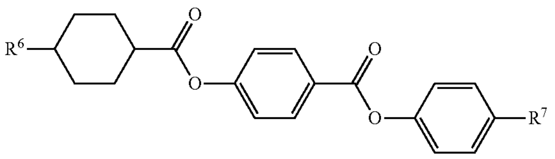

(12-16)

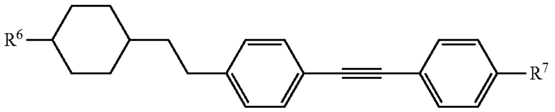

(12-17)

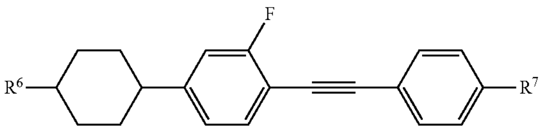

(12-18)

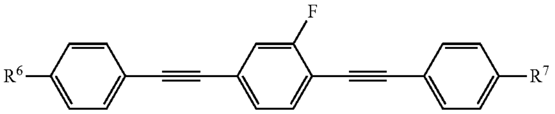

(13-1)

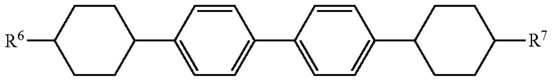

(13-2)

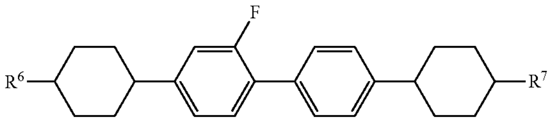

(13-3)

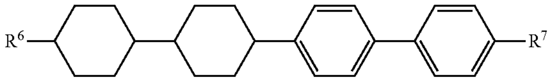

(13-4)

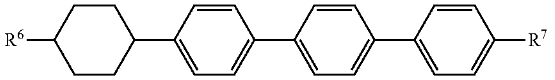

(13-5)

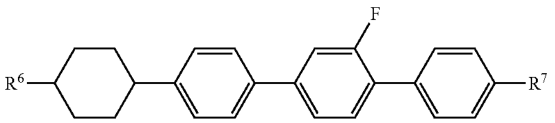

(13-6)

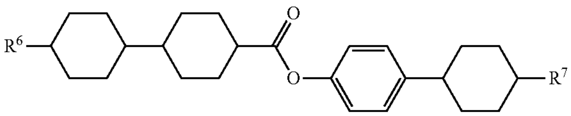

In these formulas, $R^6$ and $R^7$ have the meanings identical to those described above.

Compounds represented by formulas (11) to (13) (component E) are close to neutral because the absolute value of the dielectric anisotropy value is small. Compounds represented by formula (11) are effective mainly in adjusting the viscosity or the refractive index anisotropy, and compounds represented by formulas (12) and (13) are effective in increasing the range of the nematic phase, such as increasing the clearing point, or effective in adjusting the refractive index anisotropy.

When the content of a compound represented by the component E is increased, the threshold voltage of a liquid crystal composition is increased and the viscosity is decreased, and thus a larger content is desirable as long as a desired value of threshold voltage of the liquid crystal composition is satisfied. When a liquid crystal composition for TFT is prepared, the content of component E is preferably 30% by weight or more, more preferably 50% by weight or more based on the total amount of the composition. When a liquid crystal composition for a STN or TN mode is prepared, the content of component E is preferably 30% by weight or more, more preferably 40% by weight or more based on the total amount of the composition.

To exhibit excellent characteristics, the liquid crystal composition of the invention comprises at least one of compounds represented by formula (1) of the invention in the range of 0.1% to 99% by weight.

The liquid crystal composition of the invention is generally prepared according to any known method such as dissolution of components required at a high temperature. For example, the liquid crystal composition (e) of the invention containing an optically active compound which will be described below, or a liquid crystal composition for a GH (Guest host) mode to which a dye is added can be prepared by adding an additive well-known to a person skilled in the art, depending on its intended use. The additive is generally well known to a person skilled in the art, and is described in the literature and so forth in detail.

The liquid crystal composition (e) of the invention further comprises one or more optically active compounds in addition to the liquid crystal composition of the invention described above.

A known chiral doping agent is added as an optically active compound. This chiral doping agent is effective in inducing a helical structure of liquid crystals, adjusting the twist angle required and then preventing a reverse twist. Examples of the chiral doping agent include the optically active compounds (Op-1) to (Op-13).

(Op-1)

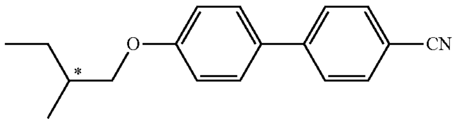

(Op-2)

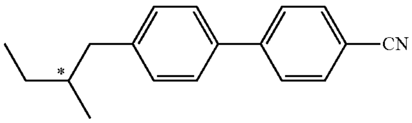

(Op-3)

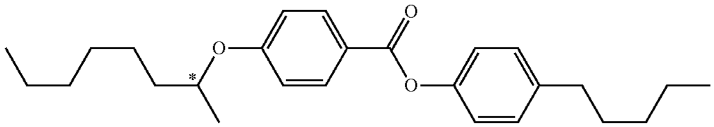

(Op-4)

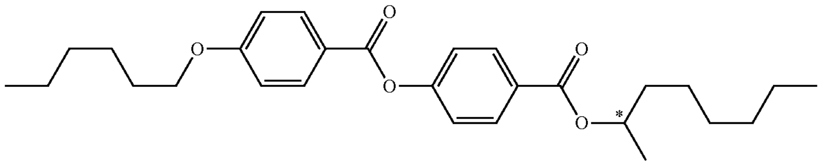

(Op-5)

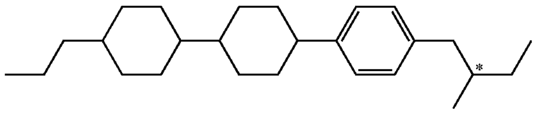

(Op-6)

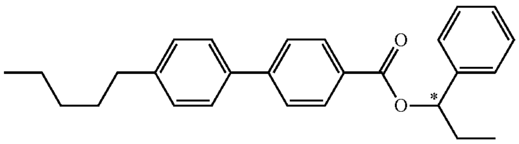

(Op-7)

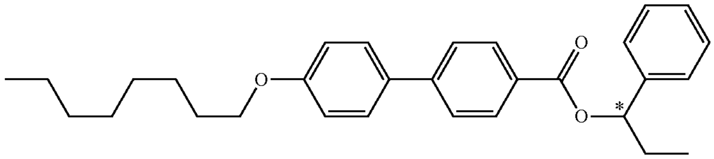

(Op-8)

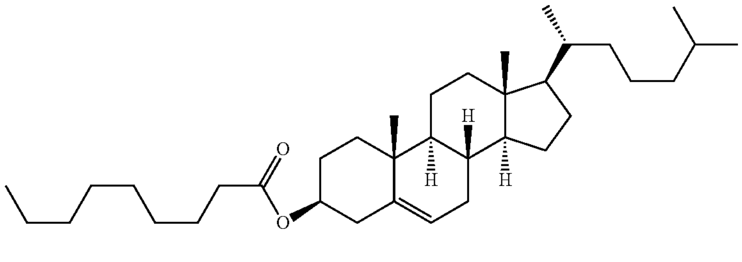

-continued (Op-9)

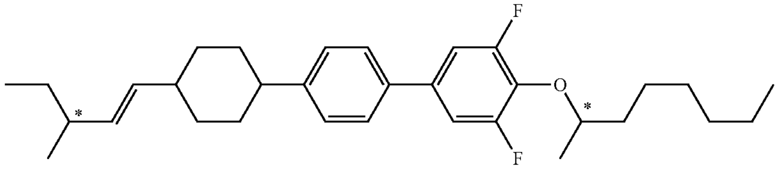

(Op-10)

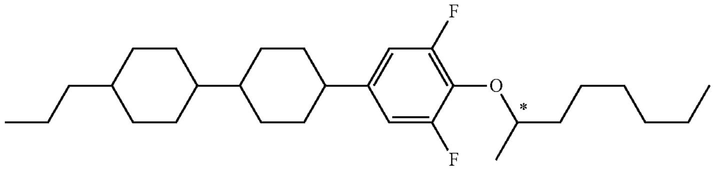

(Op-11)

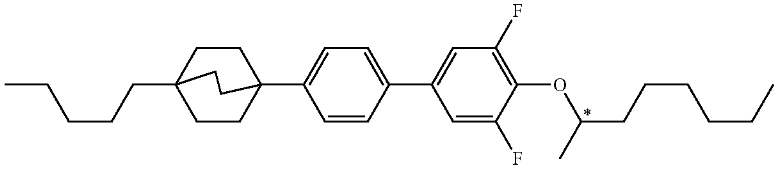

(Op-12)

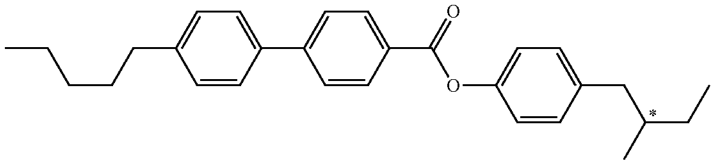

(Op-13)

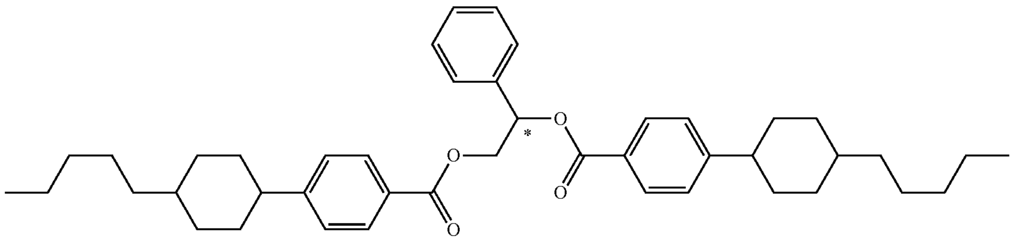

The pitch of twist is adjusted by adding this optically active compound to the liquid crystal composition (e) of the invention. It is desirable to adjust the pitch to the range of 40 μm to 200 μm in a liquid crystal composition for TFT and TN modes. It is desirable to adjust the pitch to the range of 6 μm to 20 μm in a liquid crystal composition for a STN mode. It is desirable to adjust the pitch to the range of 1.5 μm to 4 μm for a bistable TN mode. Further, two or more optically active compounds may be added for the purpose of adjusting the temperature dependence of the pitch.

The liquid crystal composition of the invention can be used for a GH mode by adding dichroic dyes such as merocyanine, stylyl, azo, azomethine, azoxy, quinophthalone, anthraquinone and tetrazine.

Further, the liquid crystal composition of the invention can be used for NCAP prepared by micro-encapsulating nematic liquid crystals, and for a polymer-distributed liquid crystal display device (PDLCD) prepared by forming a three-dimensional network polymer in liquid crystals, such as a polymer network liquid crystal display device (PNLCD), and also for a double refraction control (ECB) mode or a DS mode.

EXAMPLES

The invention will be explained below in greater detail based on examples. However, the invention is not limited to the examples. The term "%" means "% by weight," unless otherwise specified.

Because the compounds obtained herein were identified on the basis of nuclear magnetic resonance spectra obtained by means of $^1$H-NMR analysis, gas chromatograms obtained by means of gas chromatography (GC) analysis and so forth, the analytical methods will be explained first.

$^1$H-NMR Analysis:

A model DRX-500 apparatus (made by Bruker BioSpin Corporation) was used for measurement. Samples prepared in the examples and so forth were dissolved in deuterated solvents such as $CDCl_3$ in which the samples were soluble, and the measurement was carried out under the conditions of room temperature, twenty-four times of accumulation and 500 MHz. In the explanation of the nuclear magnetic resonance spectra obtained, the symbols s, d, t, q and m stand for singlet, doublet, triplet, quartet and multiplet, respectively.

Tetramethylsilane (TMS) was used as the standard reference material for a zero-point on the chemical shift δ values.

GC Analysis:

A Gas Chromatograph Model GC-14B made by Shimadzu Corporation was used for measurement. A capillary column CBP1-M25-025 (length 25 m, bore 0.22 mm, film thickness 0.25 μm; dimethylpolysiloxane as a stationary liquid phase; non-polar) made by Shimadzu Corporation was used. Helium was used as a carrier gas, and its flow rate was adjusted to 1 ml per minute. The temperature of the sample injector was set at 300° C. and the temperature of the detector (FID) was set at 300° C.

A sample was dissolved in toluene giving a 1% by weight solution, and then 1 μl of the solution obtained was injected into the sample injector.

Chromatopac Model C-R6A made by Shimadzu Corporation or its equivalent was used as a recorder. The obtained gas chromatogram showed the retention time of the peaks and the values of the peak areas corresponding to the component compounds.

Chloroform or hexane, for example, may also be used as a solvent for diluting the sample. The following capillary columns may also be used: DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd, and so forth.

The ratio of the peak areas in the gas chromatogram corresponds to the ratio of component compounds. In general, the percentage by weight of each component compound in an analytical sample is not completely the same as the percentage of each peak area in the analytical sample. In the invention, however, the percentage by weight of the component compound in the analytical sample corresponds substantially to the percentage of the peak area in the analytical sample, because the correction coefficient is essentially 1 (one) when the columns described above are used. This is because there is no significant difference among the correction coefficients of the liquid crystal compounds as components. An internal standard method using gas chromatograms is used in order to determine the composition ratio of the liquid crystal compounds in the liquid crystal composition more accurately by means of the gas chromatograms. Each liquid crystal compound (test-component) weighed accurately in a fixed amount and a liquid crystal compound serving as a standard (standard reference material) are analyzed simultaneously by means of gas chromatography, and the relative intensity is calculated in advance from the ratio of the peak area of the test-component to that of the standard reference material. Then, the composition ratio of the liquid crystal compounds in the liquid crystal composition can be determined more accurately by means of the gas-chromatographic analysis using the correction based on the relative intensity of the peak area of each component to that of the standard reference material.

[Samples for Measuring the Physical Properties of Compounds]

Two kinds of samples are used for measuring the physical properties: one is the compound itself, and the other is a mixture of the compound and mother liquid crystals.

In the latter case using a sample in which a compound is mixed with mother liquid crystals, the measurement is carried out according to the following method. First, the sample is prepared by mixing 15% by weight of the liquid crystal compound obtained and 85% by weight of the mother liquid crystals. Then, extrapolated values are calculated from the measured values of the resulting sample by means of an extrapolation method based on the following formula. The extrapolated values are regarded as physical properties of the compound.

[Extrapolated value]=(100×[Measured value of sample]−[% by weight of mother liquid crystals]×[Measured value of mother liquid crystals])/[% by weight of compound]

When a smectic phase or crystals deposited even at this ratio of the compound to the mother liquid crystals at 25° C., the ratio of the liquid crystal compound to the mother liquid crystals was changed in the order of (10% by weight: 90% by weight), (5% by weight: 95% by weight) and (1% by weight: 99% by weight). The physical properties of the sample were measured at the ratio in which the smectic phase or the crystals did not deposit at 25° C. Extrapolated values were determined according to the above equation, and regarded as physical properties of the liquid crystal compound.

There are a variety of mother liquid crystals used for measurement and, for example, the composition ratio (% by weight) of the mother liquid crystals (A) is as shown below.

Mother Liquid Crystals (A):

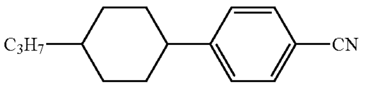

24%

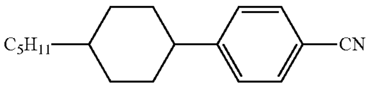

36%

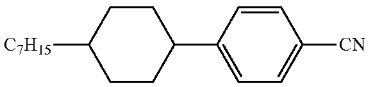

25%

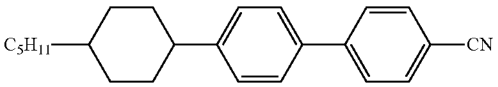

15%

[Method for Measuring Physical Properties of Compounds]

Physical properties of compounds were measured according to the following methods. Most of the measurement methods are those described in the Standard of Electronic Industries Association of Japan, EIAJ•ED-2521A, or those with some modifications. No TFT was attached to a TN device used for measurement.

In the physical properties, the values obtained by using the compound itself, as they were, were reported herein as data. The values calculated by means of the extrapolating method were reported herein as data when the mixture of the liquid crystal compound and mother liquid crystals was used as a sample.

Phase Structure and Transition Temperature (° C.):

Measurements were carried out according to the following methods (1) and (2).

(1) A compound was placed on a hot plate of a melting point apparatus (Hot Stage Model FP-52 made by Mettler Toledo International Inc.) equipped with a polarizing microscope, and the phase conditions and their changes were observed with the polarizing microscope, specifying the kinds of liquid crystal phase while the compound was heated at the rate of 3° C. per minute.

(2) A sample was heated and then cooled at a rate of 3° C. per minute using a Perkin-Elmer differential scanning calorimeter, a DSC-7 System or a Diamond DSC System. The starting point of an endothermic peak or an exothermic peak caused by a phase change of the sample was obtained by means of the extrapolation (on set) and the phase transition temperature was determined.

Hereinafter, the symbol C stood for crystals, which were expressed by $C_1$ or $C_2$ when the kinds of crystals were distinguishable. The symbols S and N stood for a smectic phase and a nematic phase, respectively. The symbol I stood for a liquid (isotropic). When a smectic A phase, a smectic B phase, a smectic C phase or a smectic F phase were distinguishable in the smectic phases, they were expressed as $S_A$, $S_B$, $S_C$ or $S_F$, respectively. Phase-transition temperatures were expressed as, for example, "C 50.0 N 100.0 I", which means that the phase-transition temperature from crystals to a nematic phase (CN) is 50.0° C., and the phase-transition temperature from the nematic phase to a liquid (NI) is 100.0° C. The same applied to the other transition temperatures.

Maximum Temperature of a Nematic Phase ($T_{NI}$; ° C.):

A sample (a mixture of a liquid crystal compound and mother liquid crystals) was placed on a hot plate of a melting point apparatus (Hot Stage Model FP-52 made by Mettler Toledo International Inc.) equipped with a polarizing microscope, and was observed with the polarizing microscope while being heated at the rate of 1° C. per minute. A maximum temperature meant a temperature measured when part of the sample began to change from a nematic phase to an isotropic liquid. Hereinafter, the maximum temperature of the nematic phase may simply be abbreviated to "maximum temperature."

Compatibility at Low Temperature:

Samples were prepared by mixing a liquid crystal compound with mother liquid crystals so that the amount of the liquid crystal compound became 20% by weight, 15% by weight, 10% by weight, 5% by weight, 3% by weight and 1% by weight, and placed in glass vials. After these glass vials had been kept in a freezer at −10° C. or −20° C. for a certain period, they were observed as to whether or not crystals or a smectic phase had been deposited.

Viscosity (η; Measured at 20° C.; mPa·s):

A mixture of a liquid crystal compound and mother liquid crystals was measured using an E-type viscometer.

Refractive Index Anisotropy (Δn):

Measurement was carried out using an Abbe refractometer with a polarizing plate attached to the ocular, on irradiation with light at a wavelength of 589 nm at 25° C. The surface of the main prism was rubbed in one direction, and then a sample (a mixture of a liquid crystal compound and mother liquid crystals) was dropped onto the main prism. A refractive index (n||) was measured when the direction of the polarized light was parallel to that of the rubbing. A refractive index (n⊥) was measured when the direction of polarized light was perpendicular to that of the rubbing. The value of the refractive index anisotropy was calculated from the equation: Δn=n||−n⊥.

Dielectric Anisotropy (Δ∈; Measured at 25° C.):

A sample (a mixture of a liquid crystal compound and mother liquid crystals) was put in a liquid crystal cell in which the distance (gap) between the two glass substrates was about 9 μm and the twist angle was 80 degrees was assembled. A voltage of 20 V was applied to the cell, and then a dielectric constant (∈||) in a major axis direction of the liquid crystal molecules was measured. A voltage of 0.5V was applied to the cell, and then the dielectric constant (∈⊥) in the minor axis direction of the liquid crystal molecules was measured. The value of the dielectric anisotropy was calculated from the equation of Δ∈=∈||−∈⊥.

Example 1

Synthesis of 4-[2-fluoro-4-(4-pentyl-cyclohexyl)-phenyl]-4'-vinyl-bicyclohexyl] (No. 5)

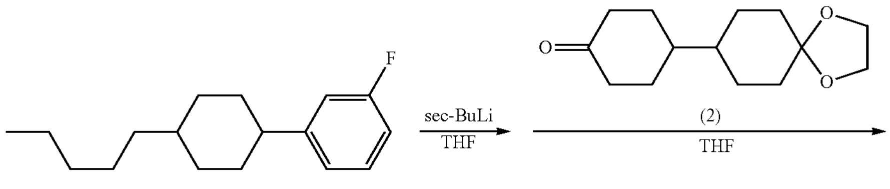

(1)

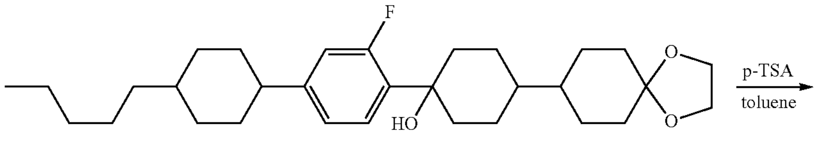

(3)

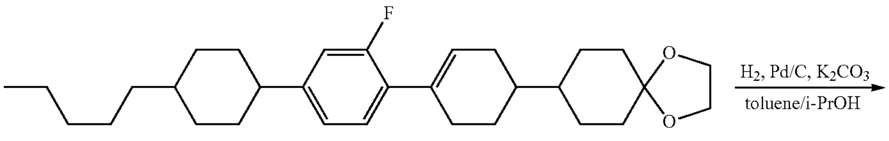

(4)

-continued

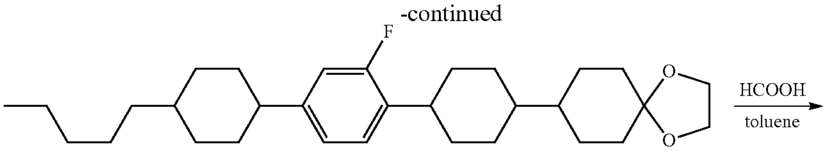

(5)

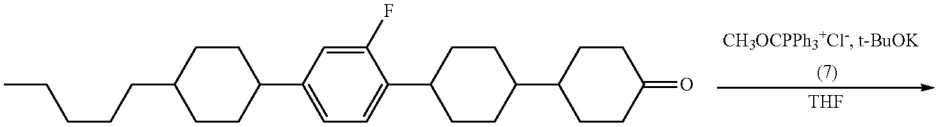

(6)

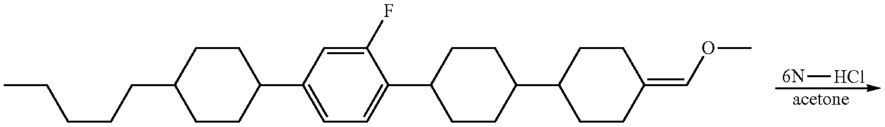

(8)

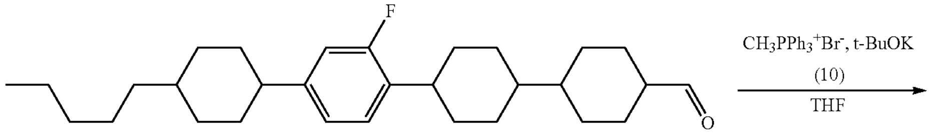

(9)

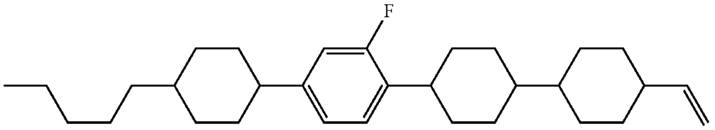

(No. 5)

First Step:

1-Fluoro-3-(4-pentyl-cyclohexyl)-benzene (1) (56.2 g) and THF (500 ml) were put in a reaction vessel under a nitrogen atmosphere, and cooled to −73° C. s-Butyllithium (1.04 M, in a n-hexane and cyclohexane solution; 250.0 ml) was added dropwise thereto in the temperature range of −74° C. to −65° C., and the mixture was stirred for another 30 minutes. Subsequently, 4-(1,4-dioxospiro[4,5] decan-8-yl) cyclohexane (2) (57.2 g) in a THF (160 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (27.8 g) and ice-water (1,000 ml), and mixed. Toluene (1360 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using a mixed solvent of toluene and ethyl acetate (toluene:ethyl acetate=7:3 by volume) as an eluent and silica gel as a stationary phase powder and dried, giving 108.6 g of 4-(1,4-dioxa-spiro[4,5] dec-8-yl)-1-[2-fluoro-4-(pentyl-cyclohexyl)-phenyl]-cyclohexanol (3). The compound (3) was a yellow solid.

Second Step:

The compound (3) (108.6 g), p-toluenesulfonic acid (4.02 g) and toluene (500 ml) were mixed, and the mixture was heated under reflux for 1.5 hours while the water being distilled was removed. The reaction mixture was cooled to 30° C., and then water (1,000 ml) and toluene (1,800 ml) were added and mixed with it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent of the solution was distilled off under reduced pressure, and the residue was purified with a fractional operation by means of column chromatography using a mixed solvent of toluene and ethyl acetate (toluene:ethyl acetate=7:3 by volume) as an eluent and silica gel as a stationary phase powder, and further purified by means of recrystallization from heptane and dried, giving 58.8 g of 8-{4-[2-fluoro-4-(4-pentyl-cyclohexyl)-phenyl]-cyclohex-3-enyl}-1,4-dioxa-spiro[4,5] decane (4). The yield based on the compound (1) was 53.4%.

Third Step:

The compound (4) was dissolved in a mixed solvent of toluene (150 ml) and isopropyl alcohol (100 ml), and palladium on carbon catalyst (NX type of 5% Pd/C; 50% wet; made by N. E. Chemcat; hereinafter referred to as Pd/C) (3.06 g) and potassium carbonate (0.52 g) were added thereto. The mixture was stirred at room temperature under a hydrogen atmosphere until hydrogen absorption had ceased. After the reaction had been completed, Pd/C was removed and then the solvent was distilled off, and the residue was purified with a fractional operation by means of column chromatography using a mixed solvent of toluene and ethyl acetate (toluene: ethyl acetate=9:1 by volume) as an eluent and silica gel as a stationary phase powder, and further purified by means of recrystallization from heptane and dried, giving 26.35 g of 8-{4-[2-fluoro-4-(4-pentyl-cyclohexyl)-phenyl]-cyclohexyl}-1,4-dioxa-spiro[4,5]decane (5). The yield based on the compound (4) was 44.6%.

Fourth Step:

The compound (5) (26.35 g), formic acid (10 ml) and toluene (100 ml) were put in a reaction vessel under a nitrogen atmosphere, heated under reflux for 8 hours, and cooled slowly to room temperature. Water (200 ml) and toluene (200 ml) were added and mixed thereto. Subsequently, the mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solution was concentrated under reduced pressure, and the residue was purified with a fractional operation by means of column chromatography using a mixed solvent of toluene and ethyl acetate (toluene:ethyl acetate=9:1 by volume) as an eluent and silica gel as a stationary phase powder, and further purified by means of recrystallization from a mixed solvent of toluene and heptane (toluene: heptane=1:1 by volume), and dried, giving 22.39 g of 4'-[2-fluoro-4-(4-pentyl-cyclohexyl)-phenyl]-bicyclohexyl-4-one (6). The yield based on the compound (5) was 93.7%.

Fifth Step:

Methoxytriphenylphosphonium chloride (7) (23.4 g) was put in a reaction vessel under a nitrogen atmosphere, and dried under reduced pressure at 50° C. After the vessel had been returned to atmospheric pressure by introducing nitrogen, potassium t-butoxide (7.68 g) and THF (200 ml) were added, and the mixture was cooled to −40° C. with stirring for 1 hour. The compound (6) in a THF (60 ml) solution was added dropwise thereto in the temperature range of −40° C. to −30° C., and the stirring was continued for another 17 hours while the mixture was allowed to return to 25° C. Then, the reaction mixture was poured into a vessel containing water (600 ml), and mixed. Toluene (520 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder and dried, giving 23.28 g of 4-[2-fluoro-4-(4-pentylcyclohexyl)-phenyl-4'-methoxymethylenebicyclohexyl (8). The yield based on the compound (6) was 97.5%.

Sixth Step:

The compound (8) (23.28 g) and acetone (350 ml) were put in a reaction vessel under a nitrogen atmosphere, and heated to 50° C. 6N-Hydrochloric acid (150 ml) was added dropwise thereto in the temperature range of 40° C. to 50° C., and the mixture was stirred for 3 hours, and then cooled slowly to room temperature. Water (700 ml) and toluene (700 ml) were added and mixed thereto. Then, the mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent was then distilled off under reduced pressure, and the residue was purified by means of recrystallization from a mixed solvent of toluene and heptane (toluene: heptane=1:1 by volume), and dried, giving 18.33 g of 4'-[2-fluoro-4-(4-pentyl-cyclohexyl)-phenyl]-bicyclohexyl-4-carbaldehyde (9). The yield based on the compound (8) was 81.3%.

Seventh Step:

Methyltriphenylphosphonium bromide (10) (17.83 g) was put in a reaction vessel under a nitrogen atmosphere, and dried under reduced pressure at 50° C. After the vessel had been returned to atmospheric pressure by introducing nitrogen, potassium t-butoxide (6.07 g) and THF (200 ml) were added and the mixture was cooled to −40° C. with stirring for 1 hour. The compound (9) in a THF (100 ml) solution was added dropwise thereto in the temperature range of −40° C. to −30° C., and the stirring was continued for another 14 hours while the mixture was allowed to return to 25° C. Then, the reaction mixture was poured into a vessel containing water (600 ml), and mixed. Toluene (600 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder and dried, giving 14.84 g of 4-[2-fluoro-4-(4-penty-cyclohexyl)-phenyl]-4'-vinyl-bicyclohexyl (No. 5). The yield based on the compound (6) was 81.4%.

The chemical shift δ (ppm) in $^1$H-NMR analysis is described below, and the compound was identified as 4-[2-fluoro-4-(4-pentyl-cyclohexyl)-phenyl]-4'-vinyl-bicyclohexyl (No. 5). The solvent for measurement was $CDCl_3$.

Chemical shift δ (ppm); 7.11 (dd, 1H), 6.92 (dd, 1H), 6.84 (dd, 1H), 5.78 (m, 1H), 4.96 (m, 1H), 4.88 (m, 1H), 2.75 (m, 1H), 2.42 (m, 1H), 1.89-1.79 (m, 13H), 1.47-0.98 (m, 23H) and 0.89 (t, 3H).

The transition temperature of the compound (No. 5) was as follows.

Transition temperature: C 47.1 $S_B$ 196.0 N 298.3 I.

Physical Properties of the Compound (No. 5)

The liquid crystal composition B consisting of 85% by weight of the mother liquid crystals A and 15% by weight of 4-{2-fluoro-4-(4-pentyl-cyclohexyl)-phenyl-4'-vinyl-bicyclohexyl (No. 5) obtained in Example 1 was prepared. The physical properties of the liquid crystal composition B were measured. The extrapolated values of the physical properties of the compound (No. 5) were calculated by extrapolating the measured values. The values were as follows.

Maximum temperature ($T_{NI}$)=219.7° C.; dielectric anisotropy (Δ∈)=2.77; and refractive index anisotropy (Δn)=0.130.

From these results, it was found that the compound (No. 5) had an excellent compatibility with other liquid crystal compounds, a wide temperature range of the nematic phase and a high maximum temperature ($T_{NI}$).

Example 2

Synthesis of 4-(2-fluoro-4-(4-pentylcyclohexyl)phenyl)-4'-vinylbi(cyclohexane) (No. 3)

(11)

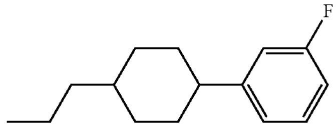

-continued (No. 3)

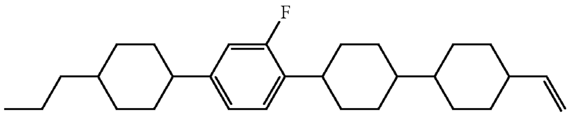

4-(2-Fluoro-4-(4-pentylcyclohexyl)phenyl)-4'-vinylbi(cyclohexane) (No. 3) was synthesized by a method similar to that described in Example 1 using 1-fluoro-3-(4-propylcyclohexyl)benzene (11) instead of 1-fluoro-3-(4-pentyl-cyclohexyl)benzene (1).

The chemical shift δ (ppm) in $^1$H-NMR analysis is described below, and the compound was identified as 4-[2-fluoro-4-(4-pentylcyclohexyl)phenyl]-4'-vinylbi(cyclohexane) (No. 3). The solvent for measurement was $CDCl_3$.

Chemical shift δ (ppm); 7.11 (dd, 1H), 6.91 (dd, 1H), 6.84 (dd, 1H), 5.78 (m, 1H), 4.96 (m, 1H), 4.88 (m, 1H), 2.74 (m, 1H), 2.42 (m, 1H), 1.86-1.79 (m, 13H), 1.45-0.99 (m, 19H) and 0.90 (t, 3H).

The transition temperature of the compound (No. 3) was as follows.

Transition temperature: C 41.9 C 76.3 $S_B$ 168.2 N 303.5 I.

Physical Properties of the Compound (No. 3)

The liquid crystal composition C consisting of 85% by weight of the mother liquid crystals A and 15% by weight of 4-(2-fluoro-4-(4-pentylcyclohexyl)phenyl)-4'-vinylbi(cyclohexane) (No. 3) obtained in Example 2 was prepared. The physical properties of the liquid crystal composition C were measured. The extrapolated values of the property values of the compound (No. 3) were calculated by extrapolating the measured values. The values were as follows.

Maximum temperature ($T_{NI}$)=219.7° C.; dielectric anisotropy (Δ∈)=2.57; and refractive index anisotropy (Δn)=0.130.

From these results, it was found that the compound (No. 3) had an excellent compatibility with other liquid crystal compounds, a wide temperature range of the nematic phase and a high maximum temperature ($T_{NI}$).

Example 3

Synthesis of (E)-4-(2-fluoro-4-(4-pentylcyclohexyl)phenyl)-4'-(prop-1-enyl)bicyclohexane) (No. 12)

First Step:

Ethyltriphenylphosphonium bromide (12) (7.28 g) was put in a reaction vessel under a nitrogen atmosphere, and dried under reduced pressure at 50° C. After the vessel had been returned to atmospheric pressure by introducing nitrogen, potassium t-butoxide (2.16 g) and THF (100 ml) were added, and the mixture was cooled to −40° C. with stirring for 1 hour. The THF solution in which the compound (9) (7.44 g) synthesized according to the method described in Example 1 was dissolved in THF (50 ml) was added dropwise thereto in the temperature range of −40° C. to −30° C., and the stirring was continued for another 19 hours while the mixture was allowed to return to 25° C. Then, the reaction mixture was poured into a vessel containing water (300 ml), and mixed. Toluene (300 ml) was added thereto and the mixture was allowed to separate into organic and aqueous phases, and then an extractive operation to an organic phase was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder and dried, giving 7.29 g of (Z)-4-(2-fluoro-4-(4-pentycyclohexyl)phenyl)-4'-(prop-1-enyl)bicyclohexane (13). The yield based on the compound (9) was 95.4%.

Second Step:

The compound (13) (7.29 g), benzenesulfinic acid sodium salt (14) (5.53 g) and isopropyl alcohol (75 ml) were put in a reaction vessel under a nitrogen atmosphere, and heated under reflux for 5 hours. The mixture was cooled slowly to room temperature, and an aqueous 6N—HCl solution (20 ml) was added thereto and the mixture was stirred for 3 hours. Then, the solvent was removed under reduced pressure, and the residue was dissolved in toluene (50 ml). The toluene solution was washed sequentially with water and a saturated aqueous solution of sodium hydrogencarbonate and brine, and then dried over anhydrous magnesium sulfate. The solvent was then distilled off under reduced pressure, and the residue was purified with a fractional operation by means of column chromatography using heptane as an eluent and silica gel as a stationary phase powder, and further purified by

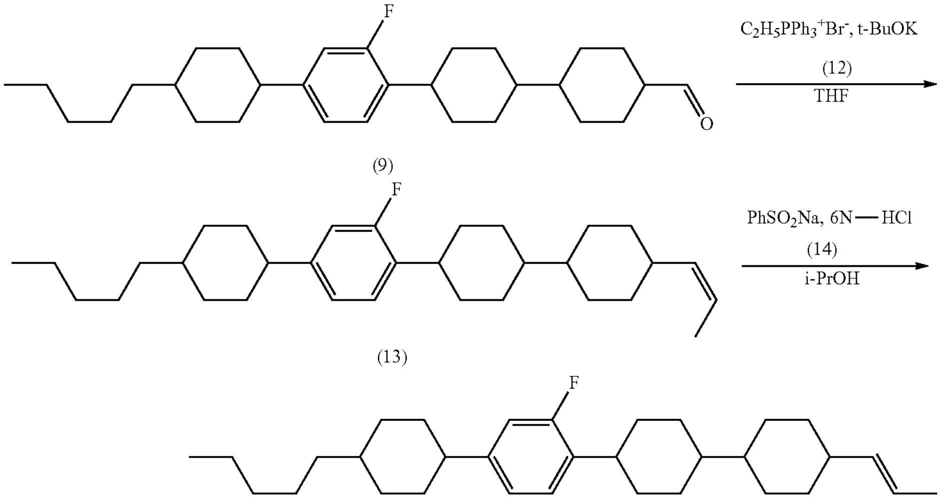

(9)

(13)

(No. 12)

means of recrystallization from a mixed solvent of toluene and heptane (toluene: heptane=1:1 by volume), and dried, giving 3.36 g of (E)-4-(2-fluoro-4-(4-pentylcyclohexyl)phenyl)-4'-(prop-1-enyl)bicyclohexane (No. 12). The yield based on the compound (13) was 46.1%.

The chemical shift δ (ppm) in $^1$H-NMR analysis is described below, and the compound was identified as (E)-4-(2-fluoro-4-pentylcyclohexyl)phenyl)-4'-(prop-1-enyl)bicyclohexane (No. 12). The solvent for measurement was $CDCl_3$.

Chemical shift δ (ppm); 7.12 (dd, 1H), 6.91 (dd, 1H), 6.84 (dd, 1H), 5.35 (dq, 1H), 5.20 (dd, 1H), 2.75 (m, 1H), 2.42 (m, 1H), 1.86-1.62 (m, 15H), 1.47-0.98 (m, 24H) and 0.89 (t, 3H).

The transition temperature of the compound (No. 12) was as follows.

Transition temperature: S 12.8 $S_B$ 205.0 N 263.6 I.

Physical Properties of the Compound (No. 12)

The liquid crystal composition D consisting of 85% by weight of the mother liquid crystals A and 15% by weight of (E)-4-{2-fluoro-4-(4-pentylcyclohexyl)phenyl}-4'-(prop-1-enyl)bicyclohexane (No. 12) obtained in Example 3 was prepared. The physical properties of the liquid crystal composition D were measured. The extrapolated values of physical properties of the compound (No. 12) were calculated by extrapolating the measured value. The values were as follows.

Maximum temperature ($T_{NI}$)=192.4° C.; dielectric anisotropy (Δ∈)=0.87; and refractive index anisotropy (Δn)=0.117.

From these results, it was found that the compound (No. 12) had an excellent compatibility with other liquid crystal compounds, a wide temperature range of the nematic phase and a high maximum temperature ($T_{NI}$).

Example 4

Synthesis of 4-(2-fluoro-4-(4-pentyl-cyclohexyl)-phenyl)-4'-propoxybicyclohexane (No. 54)

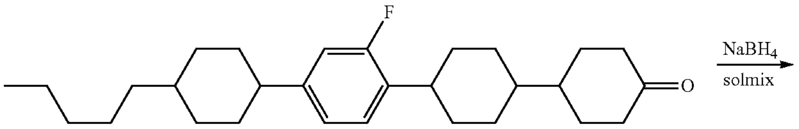

(6)

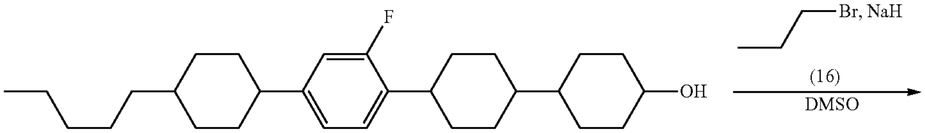

(15)

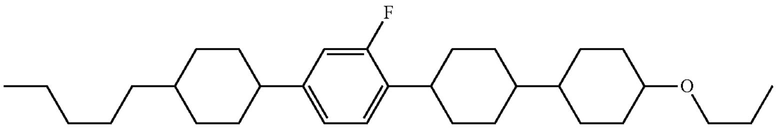

(No. 54)

First Step:

Sodium borohydride (0.99 g) and Solmix (40 ml) were put in a reaction vessel under a nitrogen atmosphere, and cooled to 0° C. A Solmix solution in which 4'-[2-fluoro-4-(4-pentyl-cyclohexyl)-phenyl]-bicyclohexyl-4-one (6) (10.7 g) synthesized according to the method described in Example 1 was dissolved in Solmix (40 ml) was added dropwise thereto, with caution in the evolution of hydrogen gas, and the mixture was stirred for 3 hours. A saturated aqueous solution of ammonium chloride (200 ml) and ethyl acetate (200 ml) were added and mixed thereto. The mixture was then allowed to stand until it had separated into organic and aqueous phases, and an extractive operation to an organic phase was carried out. The organic phase was fractionated, and washed with brine, and then dried over anhydrous magnesium sulfate. The solution was concentrated under reduced pressure, and the residue was purified with a fractional operation by means of column chromatography using a mixed solvent of toluene and ethyl acetate (toluene:ethyl acetate=5:1 by volume) as an eluent and silica gel as a stationary phase powder. The product was further purified by means of recrystallization from a mixed solvent of heptane and Solmix (heptane: Solmix=1:1 by volume), and dried, giving 8.2 g of 4'-(2-fluoro-4-(4-pentylcyclohexyl)phenyl)bi(cyclohexane)-4-ol (15). The yield based on the compound (6) was 76.6%.

Second Step:

The compound (15) (8.2 g), dimethyl sulfoxide (40 ml) and sodium hydride (1.0 g) were put in a reaction vessel under a nitrogen atmosphere, and heated to 60° C. The stirring was continued for 1 hour, and then a dimethyl sulfoxide solution in which 1-bromopropane (16) (2.6 g) was dissolved in dimethyl sulfoxide (5 ml) was added dropwise thereto, and the mixture was heated to 120° C. The stirring was continued for 2 hours, and then the mixture was cooled slowly to room temperature, and water (200 ml) and toluene (200 ml) were added and mixed thereto. The mixture was then allowed to stand until it had separated into two phases, the organic and aqueous phases, and an extractive operation to an organic phase was carried out. The organic phase was fractionated, and washed sequentially with water and a saturated aqueous solution of sodium hydrogencarbonate and brine, and then dried over anhydrous magnesium sulfate. The solution was concentrated under reduced pressure, and the residue was purified with a fractional operation by means of column chromatography using toluene as an eluent and silica gel as a stationary phase powder, and further purified by means of recrystallization from a mixed solvent of heptane and Solmix (heptane: Solmix=1:1 by volume) and dried, giving 2.8 g of 4-[2-fluoro-4-(4-pentyl-cyclohexyl)-phenyl]-4'-propoxybicyclohexane (No. 54). The yield based on the compound (12) was 31.4%.

The chemical shift δ (ppm) in $^1$H-NMR analysis is described below, and the compound was identified as 4-[2-fluoro-4-(4-pentyl-cyclohexyl)-phenyl]-4'-propoxybicyclohexane (No. 54). The solvent for measurement was $CDCl_3$.

Chemical shift δ (ppm); 7.10 (dd, 1H), 6.91 (dd, 1H), 6.84 (dd, 1H), 3.41 (t, 2H), 3.14 (m, 1H), 2.74 (m, 1H), 2.41 (m, 1H), 2.07 (dd, 2H), 1.89-1.78 (m, 11H), and 1.63-0.87 (m, 30H).

The transition temperature of the compound (No. 54) was as follows.

Transition temperature: S 40.1 $S_B$ 251.5 N 292.1 I.

Physical Properties of the Compound (No. 54)

The liquid crystal composition E consisting of 85% by weight of the mother liquid crystals A and 15% by weight of 4-[2-fluoro-4-(4-pentyl-cyclohexyl)-phenyl}-4'-propoxybicyclohexane (No. 54) obtained in Example 4 was prepared.

The physical properties of the liquid crystal composition E were measured. The extrapolated values of physical properties of the compound (No. 54) were calculated by extrapolating the measured value. The values were as follows.

Maximum temperature ($T_{NI}$)=199.0° C.; dielectric anisotropy (Δ∈)=2.50; and refractive index anisotropy (Δn)=0.110.

From these results, it was found that the compound (No. 54) had an excellent compatibility with other liquid crystal compounds, a wide temperature range of the nematic phase and a high maximum temperature ($T_{NI}$).

Example 5

Synthesis of 4-(4-(4-ethoxycyclohexyl)-2-fluorophenyl)-4'-vinylbi(cyclohexane) (No. 109)

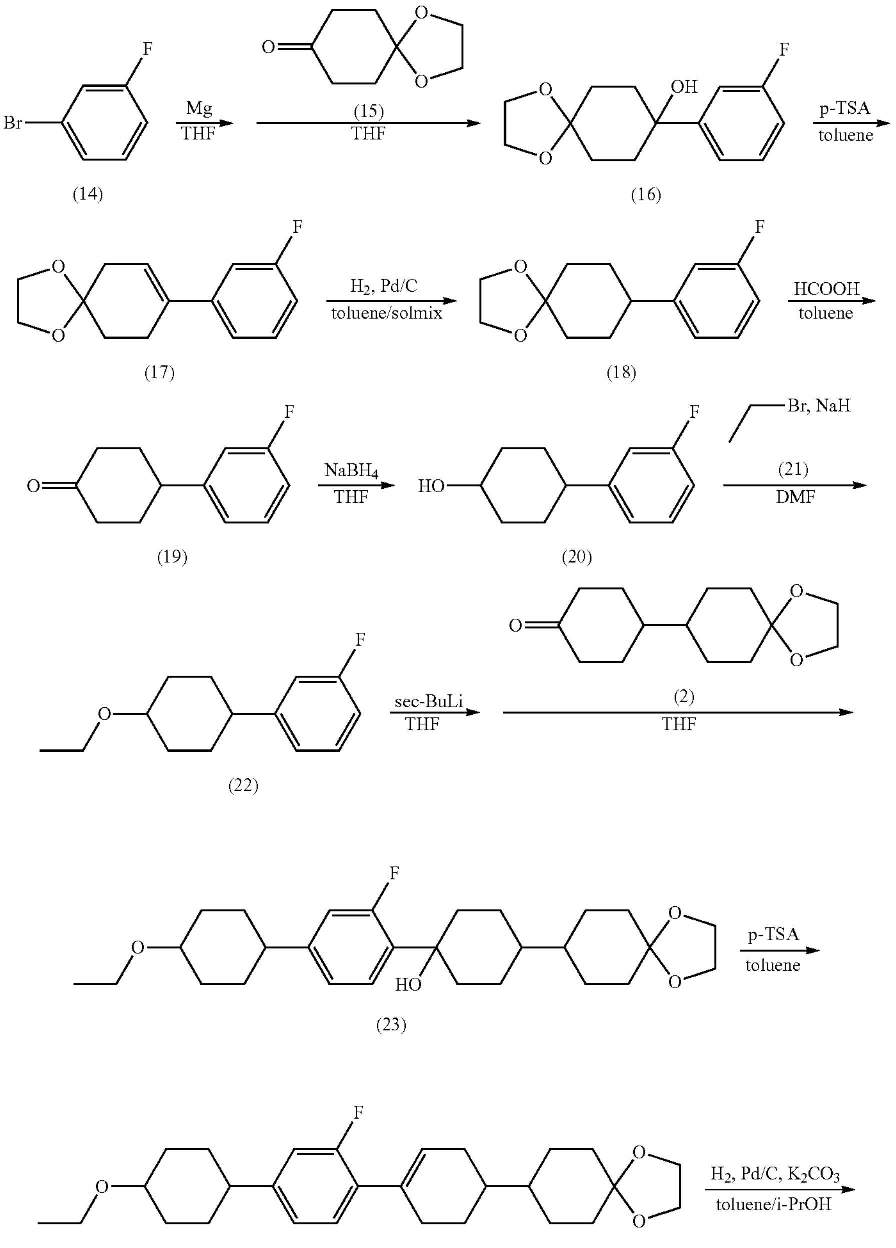

(14)
(16)
(17)
(18)
(19)
(20)
(22)
(23)
(24)

-continued

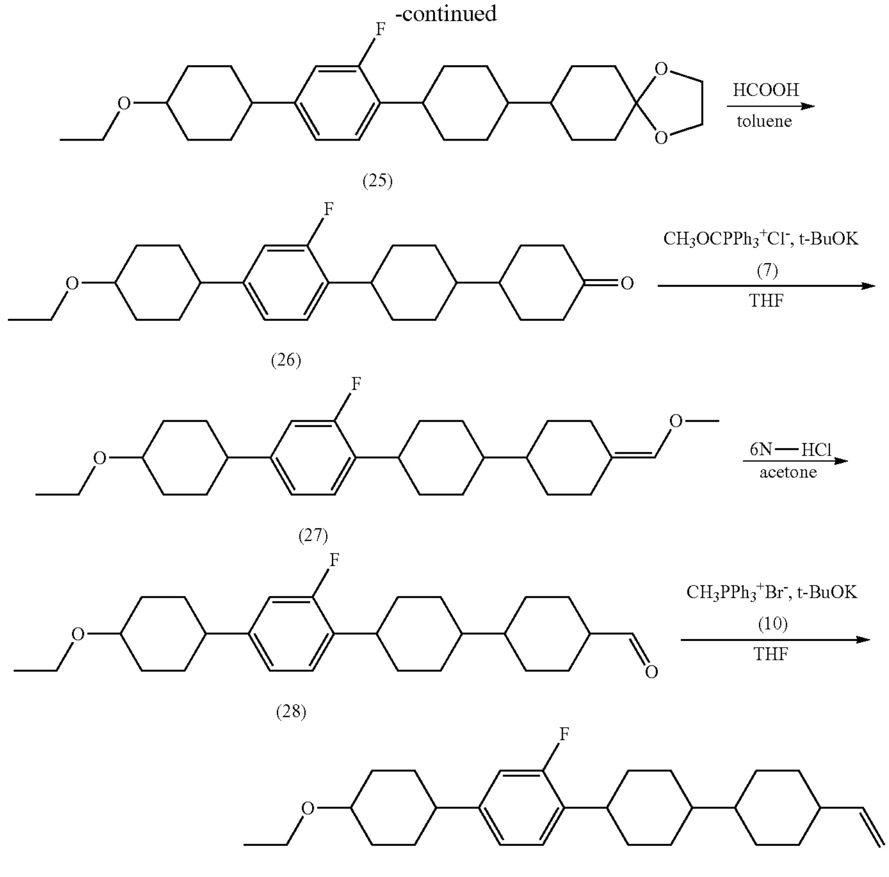

(25)

(26)

(27)

(28)

(No. 109)

First Step:

Well-dried magnesium (8.3 g) and THF (20 ml) were put in a reaction vessel under a nitrogen atmosphere, and heated to 50° C. 1-Bromo-3-fluorobenzene (14) (60.0 g) dissolved in THF (300 ml) was slowly added dropwise thereto in the temperature range of 40° C. to 60° C., and the mixture was stirred for another 60 minutes. Then, 1,4-dioxaspiro[4.5]decan-8-one (15) (64.3 g) dissolved in THF (150 ml) was slowly added dropwise thereto in the temperature range of 50° C. to 60° C., and the mixture was stirred for another 60 minutes. The reaction mixture was cooled to 30° C., and then poured into a vessel containing an aqueous 1N—HCl solution (900 ml) and ethyl acetate (500 ml), and mixed. The mixture was then allowed to stand until it had separated into two phases, the organic and aqueous phases, and an extractive operation to an organic phase was carried out. The organic phase was fractionated, and washed sequentially with water and a saturated aqueous solution of sodium hydrogencarbonate and water, and then dried over anhydrous magnesium sulfate. The solvent was then distilled off under reduced pressure, giving 74.6 g of 8-(3-fluorophenyl)-1,4-dioxaspiro[4,5]decan-8-ol (16).

Second Step:

The compound (16) (74.6 g), p-toluenesulfonic acid (2.24 g) and toluene (350 ml) were mixed, and the mixture was heated under reflux for 3 hours while water being distilled was removed. The reaction mixture was cooled to 30° C., and then water (500 ml) and toluene (150 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. Then, the solvent of the solution was distilled off under reduced pressure, and the residue was purified with a fractional operation by means of column chromatography using a mixed solvent of toluene and ethyl acetate (toluene: ethyl acetate=7:3 by volume) as an eluent and silica gel as a stationary phase powder and dried, giving 69.7 g of 8-(3-fluorophenyl)-1,4-dioxaspiro[4.5]dec-7-ene (17). The yield based on the compound (14) was 86.8%.

Third Step:

The compound (17) was dissolved in a mixed solvent of toluene (150 ml) and Solmix (150 ml) and 3.48 g of Pd/C was added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using a mixed solvent of toluene and ethyl acetate (toluene:ethyl acetate=9:1 by volume) as an eluent and silica gel as a stationary phase powder and dried, giving 61.9 g of 8-(3-fluorophenyl)-1,4-dioxaspiro[4,5]decane (18). The yield based on the compound (17) was 88.1%.

Fourth Step:

The compound (18) (61.9 g), formic acid (120 g) and toluene (120 ml) were put in a reaction vessel under a nitrogen atmosphere, heated under reflux for 3 hours, and cooled slowly to room temperature. Water (300 ml) and toluene (300 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. Then the solvent of the solution was distilled off under reduced pressure, and the residue was purified with a fractional operation by means of column chromatography using a mixed solvent of toluene and ethyl acetate (toluene:ethyl acetate=9:1 by volume) as an eluent and silica gel as a stationary phase powder and dried, giving 47.2 g of 4-(3-fluorophenyl)cyclohexanone (19). The yield based on the compound (18) was 93.7%.

Fifth Step:

Sodium borohydride (9.8 g) and THF (100 ml) were put in a reaction vessel under a nitrogen atmosphere, and cooled to 0° C. The compound (19) (47.2 g) dissolved in THF (100 ml) was added dropwise thereto, with caution in the evolution of hydrogen gas, and the mixture was stirred for 3 hours. A saturated aqueous solution of ammonium chloride (400 ml) and ethyl acetate (400 ml) were added and mixed thereto. The mixture was then allowed to stand until it had separated into organic and aqueous phases, and an extractive operation to an organic phase was carried out. The organic phase was fractionated, and washed with brine, and then dried over anhydrous magnesium sulfate. The solution was concentrated under reduced pressure, and the residue was purified with a fractional operation by means of column chromatography using a mixed solvent of toluene and ethyl acetate (toluene:ethyl acetate=10:1 by volume) as an eluent and silica gel as a stationary phase powder, and dried, giving 40.9 g of 4-(3-fluorophenyl)cyclohexanol (20). The yield based on the compound (19) was 85.7%.

Sixth Step:

The compound (20) (40.9 g), sodium hydride (11.2 g) and dimethylformamide (200 ml) were put in a reaction vessel under a nitrogen atmosphere, and heated to 60° C. The mixture was stirred for 1 hour, then bromoethane (21) (25.2 g) dissolved in dimethylformamide (250 ml) was added dropwise thereto, and the mixture was heated to 120° C. The stirring was continued for 2 hours, and cooled slowly to room temperature, and then water (500 ml) and toluene (500 ml) were added and mixed thereto. The mixture was then allowed to stand until it had separated into two phases, the organic and aqueous phases, and an extractive operation to an organic phase was carried out. The organic phase was fractionated, and washed sequentially with water and a saturated aqueous solution of sodium hydrogencarbonate and brine, and then dried over anhydrous magnesium sulfate. The solution was concentrated under reduced pressure, and then the residue was purified with a fractional operation by means of column chromatography using a mixed solvent of toluene and ethyl acetate (toluene:ethyl acetate=25:1 by volume) as an eluent and silica gel as a stationary phase powder and dried, giving 43.2 g of 1-(4-ethoxycyclohexyl)-3-fluorobenzene (22). The yield based on the compound (20) was 92.3%.

Seventh Step:

The compound (22) (30.0 g) and THF (200 ml) were put in a reaction vessel under a nitrogen atmosphere, and cooled to −73° C. s-Butyllithium (1.04 M, in a n-hexane and cyclohexane solution; 155.7 ml) was added dropwise thereto in the temperature range of −74° C. to −65° C., and the mixture was stirred for another 30 minutes. Subsequently, 4-(1,4-dioxospiro[4,5]decan-8-yl)cyclohexanone (2) (35.4 g) in a THF (100 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (18.2 g) and ice-water (500 ml), and mixed. Toluene (600 ml) was added thereto, and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was then distilled off under reduced pressure, giving 72.9 g of 1-(4-(4-ethoxycyclohexyl)-2-fluorophenyl)-4-(1,4-dioxaspiro[4,5]decan-8-yl)cyclohexanol (23).

Eighth Step:

The compound (23) (72.9 g), p-toluenesulfonic acid (2.19 g) and toluene (350 ml) were mixed, and the mixture was heated under reflux for 1.5 hours while water being distilled was removed. The reaction mixture was cooled to 30° C., and then water (700 ml) and toluene (900 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. Then the solvent of the solution was distilled off under reduced pressure, and the residue was purified with a fractional operation by means of column chromatography using a mixed solvent of toluene and ethyl acetate (toluene:ethyl acetate=7:3 by volume) as an eluent and silica gel as a stationary phase powder, and further purified by means of recrystallization from heptane, and dried, giving 39.4 g of 8-(4-(4-(4-ethoxycyclohexyl)-2-fluorophenyl)cyclohex-3-enyl)-1,4-dioxaspiro[4,5]decane (24). The yield based on the compound (No. 22) was 78.8%.

Ninth Step:

The compound (24) was dissolved in a mixed solvent of toluene (150 ml) and isopropyl alcohol (150 ml), and then Pd/C (2.35 g) and potassium carbonate (0.40 g) were added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using a mixed solvent of toluene and ethyl acetate (toluene:ethyl acetate=9:1 by volume) as an eluent and silica gel as a stationary phase powder, and dried, giving 31.4 g of 8-(4-(4-(4-ethoxycyclohexyl)-2-fluorophenyl)cyclohexyl)-1,4-dioxaspiro[4,5]decane (25). The yield based on the compound (24) was 66.4%.

Tenth Step:

The compound (25) (31.4 g), formic acid (90 g) and toluene (90 ml) were put in a reaction vessel under a nitrogen atmosphere, heated under reflux for 3 hours, and cooled slowly to room temperature. Water (200 ml) and toluene (200 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solution was concentrated under reduced pressure, and the residue was purified with a fractional operation by means of column chromatography using a mixed solvent of toluene and ethyl acetate (toluene:ethyl acetate=9:1 by volume) as an eluent and silica gel as a stationary phase powder, and further purified by means of recrystallization from a mixed solvent of toluene and heptane (toluene: heptane=1:1 by volume), and dried, giving 7.51 g of 4'-(4-(4-ethoxycyclohexyl)-2-fluorophenyl)bi(cyclohexane)-4-one (26). The yield based on the compound (25) was 26.6%.

Eleventh Step:

Methoxytriphenylphosphonium chloride (7) (9.6 g) was put in a reaction vessel under a nitrogen atmosphere, and dried under reduced pressure at 50° C. After the vessel had been returned to atmospheric pressure by introducing nitrogen, potassium t-butoxide (3.2 g) and THF (50 ml) were added, and the mixture was cooled to −40° C. with stirring for 1 hour. The compound (26) in a THF (50 ml) solution was added dropwise thereto in the temperature range of −40° C. to −30° C., and the stirring was continued for another 17 hours while the mixture was allowed to return to 25° C. Then, the reaction mixture was poured into a vessel containing water (200 ml), and mixed. Toluene (300 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder and dried, giving 7.64 g of 4-(4-(4-ethoxycyclohexyl)-2-fluorophenyl)-4'-(methoxymethylene)bi(cyclohexane) (27). The yield based on the compound (26) was 95.1%.

Twelfth Step:

The compound (27) (7.64 g) and acetone (25 ml) were put in a reaction vessel under a nitrogen atmosphere, and heated to 50° C. 6N-Hydrochloric acid (8 ml) was added dropwise thereto in the temperature range of 40° C. to 50° C., and the mixture was stirred for 3 hours, and cooled slowly to room temperature. Water (100 ml) and toluene (100 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent was then distilled off under reduced pressure, and the residue was purified by means of recrystallization from a mixed solvent of heptane and Solmix (heptane: Solmix=1:1 by volume), and dried, giving 2.29 g of 4'-(4-(4-ethoxycyclohexyl)-2-fluorophenyl)bi(cyclohexane)-4-carbaldehyde (28). The yield based on the compound (27) was 31.0%.

Thirteenth Step:

Methyltriphenylphosphonium bromide (10) (2.96 g) was put in a reaction vessel under a nitrogen atmosphere, and dried under reduced pressure at 50 ° C. After the vessel had been returned to atmospheric pressure by introducing nitrogen, potassium t-butoxide (0.93 g) and THF (50 ml) were added, and the mixture was cooled to −40 ° C. with stirring for 1 hour. The compound (28) in a THF (20 ml) solution was added dropwise thereto in the temperature range of −40 ° C. to −30 ° C., and the stifling was continued for another 14 hours while the mixture was allowed to return to 25 ° C. Then, the reaction mixture was poured into a vessel containing water (200 ml), and mixed. Toluene (200 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder. The residue was further purified by means of recrystallization from a mixed solvent of heptane and Solmix (heptane:Solmix=1:1 by volume), and dried, giving 1.13 g of 4-(4-(4-ethoxycyclohexyl)-2-fluorophenyl)-4'-vinylbi(cyclohexane) (No. 109). The yield based on a compound (28) was 49.6%.

The chemical shift δ (ppm) in $^1$H-NMR analysis is described below, and the compound was identified as 4-(4-(4-ethoxycyclohexyl)-2-fluorophenyl)-4'-vinylbi (cyclohexane) (No. 109). The solvent for measurement was $CDCl_3$.

Chemical shift δ (ppm); 7.12 (dd, 1H), 6.91 (dd, 1H), 6.83 (dd, 1H), 5.78 (m, 1H), 4.96 (m, 1H), 4.88 (m, 1H), 3.55 (q, 2H), 3.28 (m, 1H), 2.75 (m, 1H), 2.47 (m, 1H), 2.15 (m, 2H), 1.94-1.79 (m, 12H) and 1.49-1.06 (m, 16H).

The transition temperature of the compound (No. 109) was as follows.

Transition temperature: C 51.8 C 103.5 $S_B$ 134.9 N 295.2 I.

Physical Properties of the Compound (No. 109)

The liquid crystal composition F consisting of 85% by weight of the mother liquid crystals A and 15% by weight of 4-(4-(4-ethoxycyclohexyl)-2-fluorophenyl)-4'-vinylbi(cyclohexane) (No. 109) obtained in Example 1 was prepared. The physical properties of the liquid crystal composition F were measured. The extrapolated values of the physical properties of the compound (No. 109) were calculated by extrapolating the measured values. The values were as follows.

Maximum temperature ($T_{NI}$)=198.4° C.; dielectric anisotropy (Δ∈)=1.70; and refractive index anisotropy (Δn)=0.130.

From these results, it was found that the compound (No. 109) had an excellent compatibility with other liquid crystal compounds, a wide temperature range of the nematic phase and a high maximum temperature ($T_{NI}$).

Example 6

Synthesis of 4-(2,3-difluoro-4-(-propylcyclohexyl) phenyl)-4'-vinylbi(cyclohexane) (No. 141)

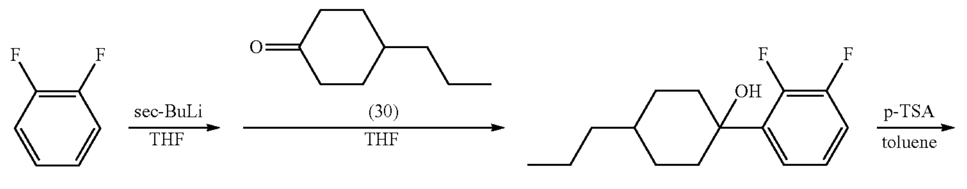

(29) (31)

-continued
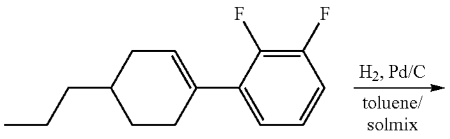
(32)
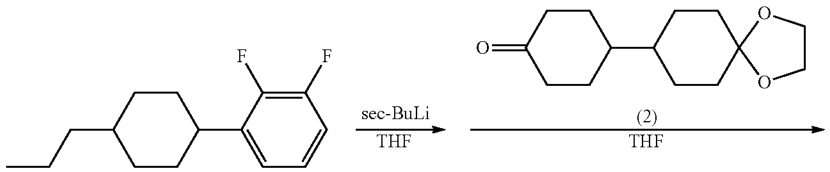
(33)
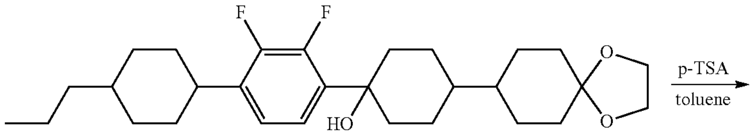
(34)
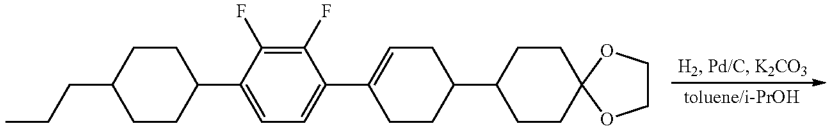
(35)
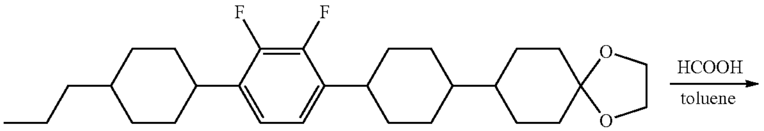
(36)
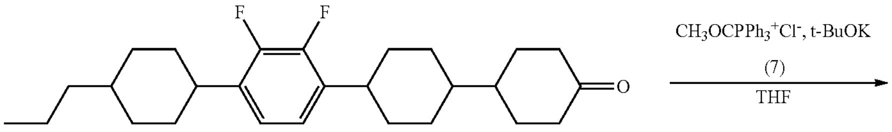
(37)
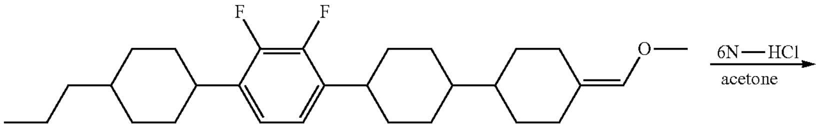
(38)
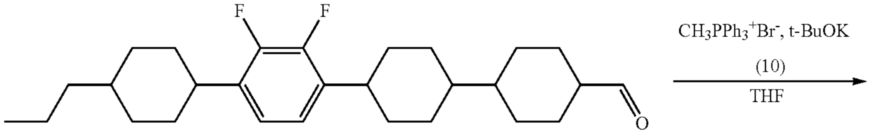
(39)
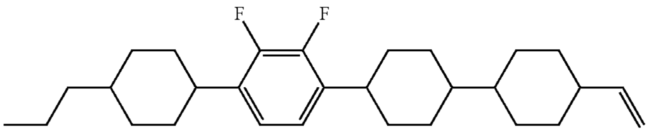
(No. 141)

First Step:

1,2-Difluorobenzene (29) (58.8 g) and THF (500 ml) were put in a reaction vessel under a nitrogen atmosphere, and cooled to −73° C. s-Butyllithium (1.03 M, in a n-hexane and cyclohexane solution; 500.0 ml) was added dropwise thereto in the temperature range of −74° C. to −65° C., and the mixture was stirred for another 2 hours. Subsequently, 4-propylcyclohexanone (30) (72.2 g) in a THF (200 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (55.1 g) and ice-water (1,000 ml), and mixed. Toluene (1500 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, giving 119.6 g of 1-(2,3-difluorophenyl)-4-propylcyclohexanol (31). The compound (31) was yellow oil.

Second Step:

The compound (31) (119.6 g), p-toluenesulfonic acid (5.98 g) and toluene (600 ml) were mixed, and the mixture was heated under reflux for 3 hours while water being distilled was removed. The reaction mixture was cooled to 30° C., and then water (1,000 ml) and toluene (1,800 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent of the solution was distilled off under reduced pressure, and the residue was purified with a fractional operation by means of column chromatography using heptane as an eluent and silica gel as a stationary phase powder, and further purified by means of recrystallization from heptane and dried, giving 89.1 g of 1,2-difluloro-3-(4-propylcylohex-1-enyl)benzene (32). The yield based on the compound (29) was 80.2%.

Third Step:

The compound (32) was dissolved in a mixed solvent of toluene (180 ml) and Solmix (180 ml), and 4.45 g of Pd/C was added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using heptane as an eluent and silica gel as a stationary phase powder, and further purified by means of recrystallization from Solmix, and dried, giving 56.5 g of 1,2-difluoro-3-(4-propylcyclohexyl)benzene (32). The yield based on the compound (32) was 62.9%.

Fourth Step:

The compound (33) (29.1 g) and THF (200 ml) were put in a reaction vessel under a nitrogen atmosphere, and cooled to −73° C. s-Butyllithium (1.03 M, in a n-hexane and cyclohexane solution; 146.7 ml) was added dropwise thereto in the temperature range of −74° C. to −65° C., and the mixture was stirred for another 30 minutes. Subsequently, 4-(1,4-dioxospiro[4,5]decan-8-yl)cyclohexanone (2) (36.1 g) in THF (100 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (16.2 g) and ice-water (500 ml), and mixed. Toluene (600 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. Then the solvent of the solution was distilled off under reduced pressure, and the residue was purified with a fractional operation by means of column chromatography using a mixed solvent of toluene and ethyl acetate (toluene: ethyl acetate=5:3 by volume) as an eluent and silica gel as a stationary phase powder and dried, giving 55.3 g of 1-(2,3-difluoro-4-(4-propylcyclohexyl)phenyl-4-(1,4-dioxaspiro[4,5]decan-8-yl)cyclohexanol (34).

Fifth Step:

The compound (34) (55.3 g), p-toluenesulfonic acid (1.66 g) and toluene (280 ml) were mixed, and the mixture was heated under reflux for 3 hours while water being distilled was removed. The reaction mixture was cooled to 30° C., and then water (500 ml) and toluene (600 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. Then the solvent of the solution was distilled off under reduced pressure, and the residue was purified with a fractional operation by means of column chromatography using a mixed solvent of toluene and ethyl acetate (toluene: ethyl acetate=7:3 by volume) as an eluent and silica gel as a stationary phase powder and dried, giving 39.0 g of 8-(4-(2,3-difluoro-4-(4-propylcyclohexyl)phenyl)cyclohex-3-enyl-1,4-dioxaspiro[4.5]decane (35). The yield based on the compound (33) was 69.5%.

Sixth Step:

The compound (35) was dissolved in a mixed solvent of toluene (80 ml) and isopropyl alcohol (80 ml), and Pd/C (1.95 g) and potassium carbonate (0.33 g) were added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using a mixed solvent of toluene and ethyl acetate (toluene: ethyl acetate=5:1 by volume) as an eluent and silica gel as a stationary phase powder and dried, giving 38.8 g of 8-(4-(2,3-difluoro-4-(4-propylcyclohexyl)phenyl)cyclohexyl)-1,4-dioxaspiro[4,5]decane (36). The yield based on the compound (35) was 99.1%.

Seventh Step:

The compound (36) (38.8 g), formic acid (120 g) and toluene (120 ml) were put in a reaction vessel under a nitrogen atmosphere, heated under reflux for 3 hours, and cooled slowly to room temperature. Water (300 ml) and toluene (300 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solution was concentrated under reduced pressure, and the residue was purified with a fractional operation by means of column chromatography using a mixed solvent of toluene and ethyl acetate (toluene: ethyl acetate=9:1 by volume) as an eluent and silica gel as a stationary phase powder, and further purified by means of recrystallization from a mixed solvent of toluene and heptane (toluene: heptane=1:1 by volume), and dried, giving 21.4 g of 4'-[2,3-difluoro-4-(4-propylcyclohexyl)phenyl)bi(cyclohexane)-4-one (37). The yield based on the compound (36) was 60.9%.

Eighth Step:

Methoxytriphenylphosphonium chloride (7) (9.82 g) was put in a reaction vessel under a nitrogen atmosphere, and dried under reduced pressure at 50° C. After the vessel had been returned to atmospheric pressure by introducing nitrogen, potassium t-butoxide (3.24 g) and THF (100 ml) were added, and the mixture was cooled to −40° C. with stirring for 1 hour. The THF solution in which the compound (36) (10.08 g) was dissolved in THF (50 ml) was added dropwise thereto in the temperature range of −40° C. to −30° C., and the stirring was continued for another 17 hours while the mixture was allowed to return to 25° C. Then, the reaction mixture was poured into a vessel containing water (300 ml), and mixed. Toluene (300 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using toluene as an eluent and silica gel as a stationary phase powder and dried, giving 10.2 g of 4'-(2,3-difluoro-4-(4-propylcyclohexyl)phenyl)-4'-(methoxymethylene)bi(cyclohexane) (38). The yield based on the compound (37) was 95.6%.

Ninth Step:

The compound (38) (10.2 g) and acetone (30 ml) were put in a reaction vessel under a nitrogen atmosphere, and heated to 50° C. 6N-Hydrochloric acid (10 ml) was added dropwise thereto in the temperature range of 40° C. to 50° C., and the mixture was stirred for 3 hours, and cooled slowly to room temperature. Water (200 ml) and toluene (200 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent was then distilled off under reduced pressure, and the residue was purified by means of recrystallization from a mixed solvent of heptane and ethyl acetate (heptane:ethyl acetate=2:1 by volume), and dried, giving 7.2 g of 4'-[2,3-difluoro-4-(4-propylcyclohexyl)phenyl)bi(cyclohexane)-4-carbaldehyde (39). The yield based on the compound (38) was 72.4%.

Tenth Step:

Methyltriphenylphosphonium bromide (10) (7.13 g) was put in a reaction vessel under a nitrogen atmosphere, and dried under reduced pressure at 50° C. After the vessel had been returned to atmospheric pressure by introducing nitrogen, potassium t-butoxide (2.24 g) and THF (50 ml) were added, and the mixture was cooled to −40° C. with stirring for 1 hour. The compound (39) in a THF (50 ml) solution was added dropwise thereto in the temperature range of −40° C. to −30° C., and the stirring was continued for another 14 hours while the mixture was allowed to return to 25° C. Then, the reaction mixture was poured into a vessel containing water (200 ml), and mixed. Toluene (200 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, and the residue was purified with a fractional operation by means of column chromatography using heptane as an eluent and silica gel as a stationary phase powder and dried, giving 5.1 g of 4-(2,3-difluoro-4-(-propylcyclohexyl)phenyl)-4'-vinylbi (cyclohexane) (No. 141). The yield based on the compound (39) was 71.5%.

The chemical shift δ (ppm) in $^1$H-NMR analysis is described below, and the compound was identified as 4-(2,3-difluoro-4-(-propylcyclohexyl)phenyl)-4'-vinylbi(cyclohexane) (No. 141). The solvent for measurement was $CDCl_3$.

Chemical shift δ (ppm); 6.88 (dd, 2H), 5.78 (m, 1H), 4.96 (m, 1H), 4.88 (m, 1H), 2.78 (m, 2H), 1.89-1.79 (m, 13H), 1.48-1.03 (m, 23H) and 0.90 (t, 3H).

The transition temperature of the compound (No. 141) was as follows.

Transition temperature: C 65.9 $S_B$ 131.2 N 298.2 I.

Physical Properties of the Compound (No. 141)

The liquid crystal composition G consisting of 85% by weight of the mother liquid crystals A and 15% by weight of 4-(2,3-difluoro-4-(-propylcyclohexyl)phenyl)-4'-vinylbi(cyclohexane) (No. 141) obtained in Example 6 was prepared. The physical properties of the liquid crystal composition G were measured. The extrapolated values of the physical properties of the compound (No. 141) were calculated by extrapolating the measured values. The values were as follows.

Maximum temperature ($T_{NI}$)=222.6° C.; dielectric anisotropy (Δε)=−2.47; and refractive index anisotropy (Δn)=0.112.

From these results, it was found that the compound (No. 141) had an excellent compatibility with other liquid crystal compounds, a wide temperature range of the nematic phase and a high maximum temperature ($T_{NI}$).

Example 7

Synthesis of 4-(2,3-difluoro-4-(4-pentylcyclohexyl) phenyl)-4'-methoxybi(cyclohexane) (No. 163)

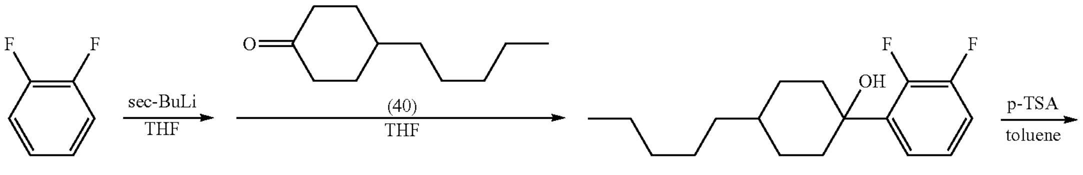

(29) (41)

-continued

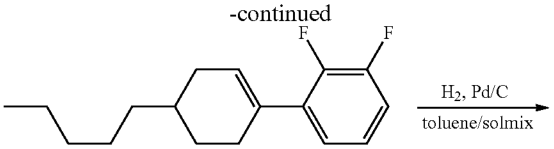

(42)

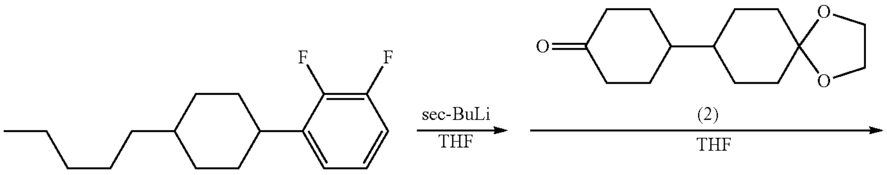

(43)

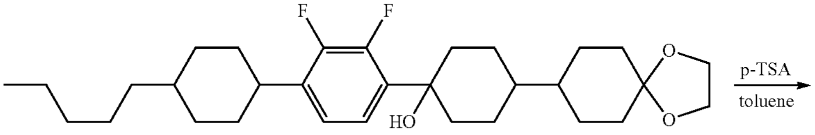

(44)

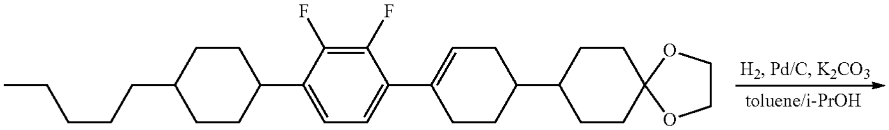

(45)

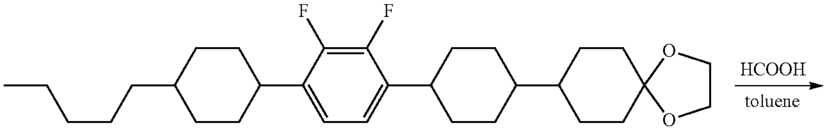

(46)

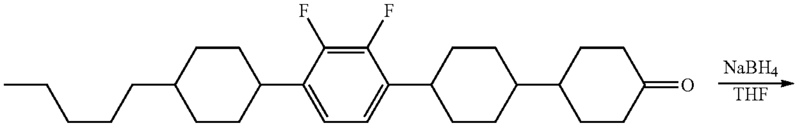

(47)

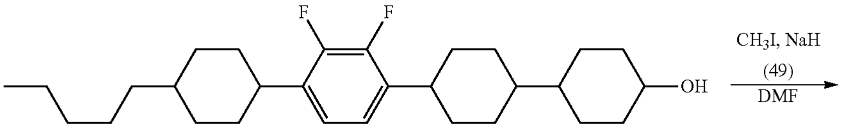

(48)

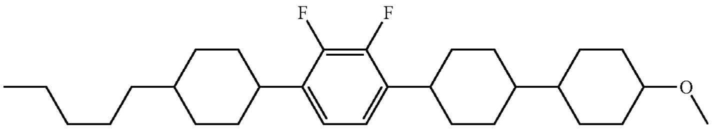

(No. 163)

First Step:

1,2-Difluorobenzene (29) (60.5 g) and THF (500 ml) were put in a reaction vessel under a nitrogen atmosphere, and cooled to −73° C. s-Butyllithium (1.06 M, in a n-hexane and cyclohexane solution; 500.0 ml) was added dropwise thereto in the temperature range of −74° C. to −65° C., and the mixture was stirred for another 2 hours. Subsequently, 4-pentylcyclohexanone (40) (89.2 g) in a THF (200 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (55.1 g) and ice-water (1,000 ml), and mixed. Toluene (1500 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. The solvent was distilled off under reduced pressure, giving 173.5 g of 1-(2,3-difluoropheyl)-4-pentylcyclohexanol (41). The compound (41) was pale-yellow oil.

Second Step:

The compound (41) (173.5 g), p-toluenesulfonic acid (8.68 g) and toluene (900 ml) were mixed, and the mixture was heated under reflux for 3 hours while water being distilled was removed. The reaction mixture was cooled to 30° C., and then water (1,000 ml) and toluene (1,800 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solvent of the solution was distilled off under reduced pressure, and the residue was purified with a fractional operation by means of column chromatography using heptane as an eluent and silica gel as a stationary phase powder and dried, giving 118.1 g of 1,2-difluloro-3-(4-pentylcylohex-1-enyl)benzene (42). The yield based on the compound (29) was 84.2%.

Third Step:

The compound (42) was dissolved in a mixed solvent of toluene (250 ml) and Solmix (250 ml), and Pd/C (5.91 g) was further added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using heptane as an eluent and silica gel as a stationary phase powder, and further purified by means of recrystallization from Solmix, and dried, giving 79.4 g of 1,2-difluoro-3-(4-pentylcyclohexyl)benzene (43). The yield based on the compound (42) was 66.7%.

Fourth Step:

The compound (43) (30.0 g) and THF (200 ml) were put in a reaction vessel under a nitrogen atmosphere, and cooled to −73° C. s-Butyllithium (1.03 M, in a n-hexane and cyclohexane solution; 131.2 ml) was added dropwise thereto in the temperature range of −74° C. to −65° C., and the mixture was stirred for another 30 minutes. Subsequently, 4-(1,4-dioxospiro[4,5]decan-8-yl)cyclohexanone (2) (32.2 g) in a THF (100 ml) solution was added dropwise thereto in the temperature range of −76° C. to −65° C., and the stirring was continued for another 20 hours while the mixture was allowed to return to 25° C. Then, the reaction mixture was poured into a vessel containing ammonium chloride (14.5 g) and ice-water (500 ml), and mixed. Toluene (600 ml) was added thereto and the mixture was allowed to separate into organic and aqueous phases, and then an extractive operation was carried out. The organic phase was fractionated, and washed sequentially with water and a saturated aqueous solution of sodium hydrogencarbonate and brine, and then dried over anhydrous magnesium sulfate. Then the solvent of the solution was distilled off under reduced pressure, and the residue was purified with a fractional operation by means of column chromatography using a mixed solvent of toluene and ethyl acetate (toluene: ethyl acetate=5:3 by volume) as an eluent and silica gel as a stationary phase powder and dried, giving 69.3 g of 1-(2,3-difluoro-4-(4-pentylcyclohexyl)phenyl-4-(1,4-dioxaspiro[4,5]decan-8-yl)cyclohexanol (44).

Fifth Step:

The compound (44) (69.3 g), p-toluenesulfonic acid (2.01 g) and toluene (350 ml) were mixed, and the mixture was heated under reflux for 3 hours while water being distilled was removed. The reaction mixture was cooled to 30° C., and then water (500 ml) and toluene (600 ml) were added and mixed to it. The mixture was then allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. Then the solvent of the solution was distilled off under reduced pressure, and the residue was purified with a fractional operation by means of column chromatography using a mixed solvent of toluene and ethyl acetate (toluene: ethyl acetate=7:3 by volume) as an eluent and silica gel as a stationary phase powder and dried, giving 37.1 g of 8-(4-(2,3-difluoro-4-(4-pentylcyclohexyl)phenyl)cyclohex-3-enyl-1,4-dioxaspiro[4.5]decane (45). The yield based on the compound (43) was 67.6%.

Sixth Step:

The compound (45) was dissolved in a mixed solvent of toluene (80 ml) and isopropyl alcohol (80 ml), and Pd/C (1.85 g) and potassium carbonate (0.32 g) were added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using a mixed solvent of toluene and ethyl acetate (toluene: ethyl acetate=5:1 by volume) as an eluent and silica gel as a stationary phase powder and dried, giving 36.7 g of 8-(4-(2,3-difluoro-4-(4-pentylcyclohexyl)phenyl)cyclohexyl)-1,4-dioxaspiro[4,5]decane (46). The yield based on the compound (45) was 98.5%.

Seventh Step:

The compound (46) (36.7 g), formic acid (120 g) and toluene (120 ml) were put in a reaction vessel under a nitrogen atmosphere, heated under reflux for 3 hours, and cooled slowly to room temperature. Water (300 ml) and toluene (300 ml) were added and mixed thereto. The mixture was allowed to stand until it had separated into two phases, the organic and aqueous phases, and an extractive operation to an organic phase was carried out. The organic phase was fractionated, and washed sequentially with a saturated aqueous solution of sodium hydrogencarbonate and water, and then dried over anhydrous magnesium sulfate. The solution was concentrated under reduced pressure, and the residue was purified with a fractional operation by means of column chromatography using a mixed solvent of toluene and ethyl acetate (toluene: ethyl acetate=9:1 by volume) as an eluent and silica gel as a stationary phase powder. The residue was further purified by means of recrystallization from a mixed solvent of toluene and heptane (toluene: heptane=1:1 by volume), and dried, giving 15.3 g of 4'-(2,3-difluoro-4-(4-pentylcyclohexyl)phenyl)bi(cyclohexane)-4-one (47). The yield based on the compound (46) was 45.9%.

Eighth Step:

Sodium borohydride (1.37 g) and THF (60 ml) were put in a reaction vessel under a nitrogen atmosphere, and cooled to 0° C. The compound (47) (15.3 g) dissolved in a THF (60 ml) was added dropwise thereto, with caution in the evolution of hydrogen gas, and the mixture was stirred for 3 hours. A saturated aqueous solution of ammonium chloride (300 ml) and ethyl acetate (300 ml) were added and mixed thereto. The mixture was then allowed to stand until it had separated into organic and aqueous phases, and an extractive operation to an organic phase was carried out. The organic phase was fractionated, and washed with brine, and then dried over anhydrous magnesium sulfate. The solution was concentrated under reduced pressure, and the residue was purified with a fractional operation by means of column chromatography using a mixed solvent of toluene and ethyl acetate (toluene: ethyl acetate=5:1 by volume) as an eluent and silica gel as a stationary phase powder, and further purified by means of recrystallization from a mixed solvent of heptane and Solmix (heptane:Solmix=1:1 by volume), and dried, giving 12.0 g of 4'-(2,3-difluoro-4-(4-pentylcyclohexyl)phenyl)bi(cyclohexane)-4-ol (48). The yield based on the compound (47) was 78.3%.

Ninth Step:

The compound (48) (5.0 g), sodium hydride (0.59 g) and dimethylformamide (10 ml) were put in a reaction vessel under a nitrogen atmosphere, and heated to 60° C. The mixture was stirred for 1 hour, then iodomethane (49) (1.75 g) dissolved in dimethylformamide (10 ml) was added dropwise thereto, and the mixture was heated to 120° C. The stirring was continued for 2 hours, and then cooled slowly to room temperature, and then water (200 ml) and toluene (200 ml) were added and mixed thereto. The mixture was then allowed to stand until it had separated into two phases, the organic and aqueous phases, and an extractive operation to an organic phase was carried out. The organic phase was fractionated, and washed sequentially with water and a saturated aqueous solution of sodium hydrogencarbonate and brine, and then dried over anhydrous magnesium sulfate. The solution was concentrated under reduced pressure, and the residue was purified with a fractional operation by means of column chromatography using a mixed solvent of toluene and heptane (toluene:heptane=2:1 by volume) as an eluent and silica gel as a stationary phase powder, and further purified by means of recrystallization from a mixed solvent of heptane and Solmix (heptane: Solmix=1:1 by volume), and dried, giving 3.6 g of 4-(2,3-difluoro-4-(4-pentylcyclohexyl)phenyl-4'-methoxybi (cyclohexane) (No. 163). The yield based on the compound (48) was 70.0%.

The chemical shift δ (ppm) in $^1$H-NMR analysis is described below, and the compound was identified as 4-(2,3-difluoro-4-(4-pentylcyclohexyl)phenyl-4'-methoxybi(cycloh exane) (No. 163). The solvent for measurement was $CDCl_3$.

Chemical shift δ (ppm); 6.88 (dd, 2H), 3.35 (s, 3H), 3.07 (m, 1H), 2.77 (m, 2H), 2.10 (m, 2H), 1.89 to 1.79 (m, 10H), 1.45 to 0.99 (m, 23H) and 0.89 (t, 3H).

The transition temperature of the compound (No. 163) was as follows.

Transition temperature: C 71.9 $S_B$ 103.9 N 263.0 I.

Physical Properties of the Compound (No. 163)

The liquid crystal composition H consisting of 85% by weight of the mother liquid crystals A and 15% by weight of 4-(2,3-difluoro-4-(4-pentylcyclohexyl)phenyl-4'-methoxybi (cyclohexane) (No. 163) obtained in Example 7 was prepared. The physical properties of the liquid crystal composition H were measured. The extrapolated values of the physical properties of the compound (No. 163) were calculated by extrapolating the measured values. The values were as follows.

Maximum temperature ($T_{NI}$)=197.9° C.; dielectric anisotropy (Δε)=−2.72; and refractive index anisotropy (Δn)=0.103.

From these results, it was found that the compound (No. 163) had an excellent compatibility with other liquid crystal compounds, a wide temperature range of the nematic phase and a high maximum temperature ($T_{NI}$).

Example 8

Synthesis of 4-(2,3-difluoro-4-(4-pentylcyclohexyl) phenyl-4'-ethoxybi(cyclohexane) (No. 168)

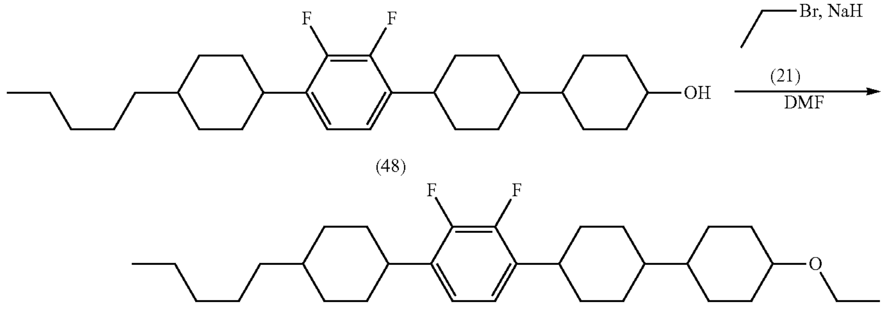

(48)

(No. 168)

First Step:

4'-(2,3-Difluoro-4-(4-pentylcylohexyl)phenyl)bi(cyclohexane)-4-ol (48) (5.0 g) synthesized according to the method described in Example 7, sodium hydride (0.59 g) and dimethylformamide (50 ml) were put in a reaction vessel under a nitrogen atmosphere, and heated to 60° C. The mixture was stirred for 1 hour, then bromoethane (49) (1.34 g) dissolved in dimethylformamide (10 ml) was added dropwise thereto, and the mixture was heated to 120° C. The stirring was continued for 2 hours, and cooled slowly to room temperature, and then water (200 ml) and toluene (200 ml) were added and mixed thereto. The mixture was then allowed to stand until it had separated into two phases, the organic and aqueous phases, and an extractive operation to an organic phase was carried out. The organic phase was fractionated, and washed sequentially with water and a saturated aqueous solution of sodium hydrogencarbonate and brine, and then dried over anhydrous magnesium sulfate. The solution was concentrated under reduced pressure, and the residue was purified with a fractional operation by means of column chromatography using a mixed solvent of toluene and heptane (toluene:heptane=2:1 by volume) as an eluent and silica gel as a stationary phase powder, and further purified by means of recrystallization from a mixed solvent of heptane and Solmix (heptane: Solmix=1:1 by volume), and dried, giving 3.2 g of 4-(2,3-difluoro-4-(4-pentylcyclohexyl)phenyl-4'-ethoxybi(cyclohexane) (No. 168). The yield based on the compound (48) was 59.5%.

The chemical shift δ (ppm) in $^1$H-NMR analysis is described below, and the compound was identified as 4-(2,3-difluoro-4-(4-pentylcyclohexyl)phenyl-4'-ethoxybi(cyclohexane) (No. 168). The solvent for measurement was $CDCl_3$.

Chemical shift δ (ppm); 6.87 (dd, 2H), 3.52 (q, 2H), 3.12 (m, 1H), 2.77 (m, 2H), 2.07 (m, 2H), 1.89 to 1.78 (m, 10H), 1.48 to 0.99 (m, 26H) and 0.89 (t, 3H).

The transition temperature of the compound (No. 168) was as follows.

Transition temperature: C 63.9 $S_B$ 176.8 N 287.8 I.

Physical Properties of the Compound (No. 168)

The liquid crystal composition I consisting of 85% by weight of the mother liquid crystals A and 15% by weight of 4-(2,3-difluoro-4-(4-pentylcyclohexyl)phenyl-4'-ethoxybi (cyclohexane) (No. 168) was prepared. The physical properties of the liquid crystal composition I were measured. The extrapolated values of physical properties of the compound (No. 168) were calculated by extrapolating the measured values. The values were as follows.

Maximum temperature ($T_{NI}$)=212.6° C.; dielectric anisotropy (Δ∈)=−3.02; and refractive index anisotropy (Δn)=0.115.

From these results, it was found that the compound (No. 168) had an excellent compatibility with other liquid crystal compounds, a wide temperature range of the nematic phase and a high maximum temperature ($T_{NI}$).

The Compounds (No. 1) to (No. 496) shown below can be synthesized by a method similar to that described in Examples 1 to 8. Appendixed data was values measured by means of the methods described above. The transition temperature is shown by the measured value of the compound itself, and the maximum temperature ($T_{NI}$), dielectric anisotropy (Δ∈) and optical anisotropy (Δn) are shown by physical properties calculated from the measured values of the sample, in which the compound was mixed in the mother liquid crystals (i), by means of the extrapolation method described above.

(a)

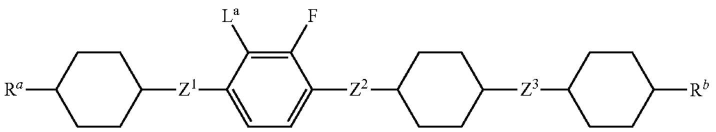

| No. | $R^a$ | $Z^1$ | $Z^2$ | $Z^3$ | $L^1$ | $R^b$ | Physical Properties |
|---|---|---|---|---|---|---|---|
| 1 | $CH_3$ | — | — | — | H | $CH{=}CH_2$ | |
| 2 | $C_2H_5$ | — | — | — | H | $CH{=}CH_2$ | |
| 3 | $C_3H_7$ | — | — | — | H | $CH{=}CH_2$ | No.3; C 41.9 C 76.3 SB 168.2 N 303.5 I TNI; 219.7° C., Δϵ; 2.57, Δn; 0.130 |
| 4 | $C_4H_9$ | — | — | — | H | $CH{=}CH_2$ | |
| 5 | $C_5H_{11}$ | — | — | — | H | $CH{=}CH_2$ | No.5; C 47.1 SB 196.0 N 298.3 I TNI; 219.7° C., Δϵ; 2.77, Δn; 0.130 |
| 6 | $C_7H_{15}$ | — | — | — | H | $CH{=}CH_2$ | |
| 7 | $C_9H_{19}$ | — | — | — | H | $CH{=}CH_2$ | |
| 8 | $CH_3$ | — | — | — | H | $CH{=}CHCH_3$ | |
| 9 | $C_2H_5$ | — | — | — | H | $CH{=}CHCH_3$ | |
| 10 | $C_3H_7$ | — | — | — | H | $CH{=}CHCH_3$ | |
| 11 | $C_4H_9$ | — | — | — | H | $CH{=}CHCH_3$ | |
| 12 | $C_5H_{11}$ | — | — | — | H | $CH{=}CHCH_3$ | No.12; C 12.8 SB 205.0 N 263.6 I TNI; 192.4° C., Δϵ; 0.87, Δn; 0.117 |
| 13 | $C_7H_{15}$ | — | — | — | H | $CH{=}CHCH_3$ | |
| 14 | $C_9H_{19}$ | — | — | — | H | $CH{=}CHCH_3$ | |
| 15 | $C_3H_7$ | — | — | — | H | $CH_2CH{=}CH_2$ | |
| 16 | $C_5H_{11}$ | — | — | — | H | $CH_2CH{=}CH_2$ | |
| 17 | $C_7H_{15}$ | — | — | — | H | $CH_2CH{=}CH_2$ | |
| 18 | $C_5H_{11}$ | — | — | — | H | $CH{=}CHC_2H_5$ | |
| 19 | $C_6H_{13}$ | — | — | — | H | $CH{=}CHC_2H_5$ | |
| 20 | $C_7H_{15}$ | — | — | — | H | $CH{=}CHC_2H_5$ | |
| 21 | $C_8H_{17}$ | — | — | — | H | $CH{=}CHC_2H_5$ | |
| 22 | $C_7H_{15}$ | — | — | — | H | $C_2H_4CH{=}CH_2$ | |
| 23 | $C_5H_{11}$ | — | — | — | H | $CH_2CH{=}CHCH_3$ | |
| 24 | $CH_2{=}CH$ | — | — | — | H | $CH_3$ | |
| 25 | $CH_2{=}CH$ | — | — | — | H | $C_2H_5$ | |
| 26 | $CH_2{=}CH$ | — | — | — | H | $C_3H_7$ | |
| 27 | $CH_2{=}CH$ | — | — | — | H | $C_4H_9$ | |
| 28 | $CH_2{=}CH$ | — | — | — | H | $C_5H_{11}$ | |
| 29 | $CH_2{=}CH$ | — | — | — | H | $C_7H_{15}$ | |
| 30 | $CH_2{=}CH$ | — | — | — | H | $C_9H_{19}$ | |
| 31 | $CH_3CH{=}CH$ | — | — | — | H | $CH_3$ | |
| 32 | $CH_3CH{=}CH$ | — | — | — | H | $C_2H_5$ | |
| 33 | $CH_3CH{=}CH$ | — | — | — | H | $C_3H_7$ | |
| 34 | $CH_3CH{=}CH$ | — | — | — | H | $C_4H_9$ | |
| 35 | $CH_3CH{=}CH$ | — | — | — | H | $C_5H_{11}$ | |
| 36 | $CH_3CH{=}CH$ | — | — | — | H | $C_7H_{15}$ | |
| 37 | $CH_3CH{=}CH$ | — | — | — | H | $C_9H_{19}$ | |
| 38 | $CH_2{=}CHCH_2$ | — | — | — | H | $C_3H_7$ | |
| 39 | $CH_2{=}CHCH_2$ | — | — | — | H | $C_5H_{11}$ | |
| 40 | $CH_2{=}CHCH_2$ | — | — | — | H | $C_7H_{15}$ | |
| 41 | $C_2H_5CH{=}CH$ | — | — | — | H | $C_5H_{11}$ | |
| 42 | $C_2H_5CH{=}CH$ | — | — | — | H | $C_6H_{13}$ | |
| 43 | $C_2H_5CH{=}CH$ | — | — | — | H | $C_7H_{15}$ | |
| 44 | $C_2H_5CH{=}CH$ | — | — | — | H | $C_8H_{17}$ | |

-continued (a)

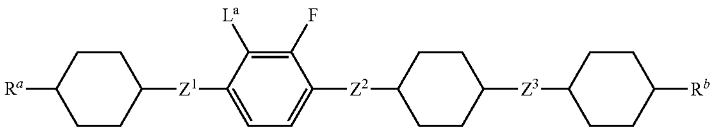

| No. | $R^a$ | $Z^1$ | $Z^2$ | $Z^3$ | $L^1$ | $R^b$ | Physical Properties |
|---|---|---|---|---|---|---|---|
| 45 | $CH_2{=}CHC_2H_4$ | — | — | — | H | $C_7H_{15}$ | |
| 46 | $CH_3CH{=}CHCH_2$ | — | — | — | H | $C_5H_{11}$ | |
| 47 | $C_3H_7$ | — | — | — | H | $OCH_3$ | |
| 48 | $C_7H_{15}$ | — | — | — | H | $OCH_3$ | |
| 49 | $C_9H_{19}$ | — | — | — | H | $OCH_3$ | |
| 50 | $CH_3$ | — | — | — | H | $OC_2H_5$ | |
| 51 | $C_2H_5$ | — | — | — | H | $OC_2H_5$ | |
| 52 | $C_3H_7$ | — | — | — | H | $OC_2H_5$ | |
| 53 | $C_4H_9$ | — | — | — | H | $OC_2H_5$ | |
| 54 | $C_5H_{11}$ | — | — | — | H | $OC_3H_7$ | No.54; C 40.1 SB 251.5 N 292.5 I TNI; 199.0° C., Δε; 2.50, Δn; 0.110 |
| 55 | $C_7H_{15}$ | — | — | — | H | $OC_3H_7$ | |
| 56 | $C_9H_{19}$ | — | — | — | H | $OC_3H_7$ | |
| 57 | $C_3H_7$ | — | — | — | H | $CH_2OC_2H_5$ | |
| 58 | $C_5H_{11}$ | — | — | — | H | $CH_2OC_2H_5$ | |
| 59 | $C_7H_{15}$ | — | — | — | H | $CH_2OC_2H_5$ | |
| 60 | $C_5H_{11}$ | — | — | — | H | $C_2H_4OCH_3$ | |
| 61 | $C_6H_{13}$ | — | — | — | H | $C_2H_4OCH_3$ | |
| 62 | $C_7H_{15}$ | — | — | — | H | $C_2H_4OCH_3$ | |
| 63 | $C_9H_{17}$ | — | — | — | H | $C_2H_4OCH_3$ | |
| 64 | $C_7H_{15}$ | — | — | — | H | $OC_4H_9$ | |
| 65 | $C_5H_{11}$ | — | — | — | H | $OC_5H_{11}$ | |
| 66 | $CH_3O$ | — | — | — | H | $C_5H_{11}$ | |
| 67 | $CH_3O$ | — | — | — | H | $C_7H_{15}$ | |
| 68 | $CH_3O$ | — | — | — | H | $C_9H_{19}$ | |
| 69 | $C_2H_5O$ | — | — | — | H | $CH_3$ | |
| 70 | $C_2H_5O$ | — | — | — | H | $C_2H_5$ | |
| 71 | $C_2H_5O$ | — | — | — | H | $C_3H_7$ | |
| 72 | $C_2H_5O$ | — | — | — | H | $C_4H_9$ | |
| 73 | $C_3H_7O$ | — | — | — | H | $C_5H_{11}$ | |
| 74 | $C_3H_7O$ | — | — | — | H | $C_7H_{15}$ | |
| 75 | $C_3H_7O$ | — | — | — | H | $C_9H_{19}$ | |
| 76 | $C_2H_5OCH_2$ | — | — | — | H | $C_3H_7$ | |
| 77 | $C_2H_5OCH_2$ | — | — | — | H | $C_5H_{11}$ | |
| 78 | $C_2H_5OCH_2$ | — | — | — | H | $C_7H_{15}$ | |
| 79 | $CH_3OC_2H_4$ | — | — | — | H | $C_5H_{11}$ | |
| 80 | $CH_3OC_2H_4$ | — | — | — | H | $C_6H_{13}$ | |
| 81 | $CH_3OC_2H_4$ | — | — | — | H | $C_7H_{15}$ | |
| 82 | $CH_3OC_2H_4$ | — | — | — | H | $C_8H_{17}$ | |
| 83 | $C_4H_9O$ | — | — | — | H | $C_7H_{15}$ | |
| 84 | $C_5H_{11}O$ | — | — | — | H | $C_5H_{11}$ | |
| 85 | $CH_2{=}CH$ | — | — | — | H | $OCH_3$ | |
| 86 | $CH_2{=}CH$ | — | — | — | H | $OC_2H_5$ | |
| 87 | $CH_2{=}CH$ | — | — | — | H | $OC_3H_7$ | |
| 88 | $CH_2{=}CH$ | — | — | — | H | $OC_4H_9$ | |
| 89 | $CH_2{=}CH$ | — | — | — | H | $OC_5H_{11}$ | |
| 90 | $CH_2{=}CH$ | — | — | — | H | $CH_2OC_2H_5$ | |
| 91 | $CH_2{=}CH$ | — | — | — | H | $C_2H_4OCH_3$ | |
| 92 | $CH_3CH{=}CH$ | — | — | — | H | $OCH_3$ | |
| 93 | $CH_3CH{=}CH$ | — | — | — | H | $OC_2H_5$ | |
| 94 | $CH_3CH{=}CH$ | — | — | — | H | $OC_3H_7$ | |
| 95 | $CH_3CH{=}CH$ | — | — | — | H | $OC_4H_9$ | |
| 96 | $CH_3CH{=}CH$ | — | — | — | H | $OC_5H_{11}$ | |
| 97 | $CH_3CH{=}CH$ | — | — | — | H | $CH_2OC_2H_5$ | |
| 98 | $CH_3CH{=}CH$ | — | — | — | H | $C_2H_4OCH_3$ | |
| 99 | $CH_2{=}CHCH_2$ | — | — | — | H | $OCH_3$ | |
| 100 | $CH_2{=}CHCH_2$ | — | — | — | H | $OC_2H_5$ | |
| 101 | $CH_2{=}CHCH_2$ | — | — | — | H | $OC_3H_7$ | |
| 102 | $C_2H_5CH{=}CH$ | — | — | — | H | $OC_2H_5$ | |
| 103 | $C_2H_5CH{=}CH$ | — | — | — | H | $OC_5H_{11}$ | |
| 104 | $C_2H_5CH{=}CH$ | — | — | — | H | $CH_2OC_2H_5$ | |
| 105 | $C_2H_5CH{=}CH$ | — | — | — | H | $C_2H_4OCH_3$ | |
| 106 | $CH_2{=}CHC_2H_4$ | — | — | — | H | $OCH_3$ | |
| 107 | $CH_3CH{=}CHCH_2$ | — | — | — | H | $OC_2H_5$ | |
| 108 | $CH_3O$ | — | — | — | H | $CH{=}CH_2$ | |
| 109 | $C_2H_5O$ | — | — | — | H | $CH{=}CH_2$ | No.109; C 51.8 C 103.5 SB 134.9 N 295.2 I TNI; 198.4° C., Δε; 1.70, Δn; 0.130 |
| 110 | $C_3H_7O$ | — | — | — | H | $CH{=}CH_2$ | |
| 111 | $C_4H_9O$ | — | — | — | H | $CH{=}CH_2$ | |

-continued (a)

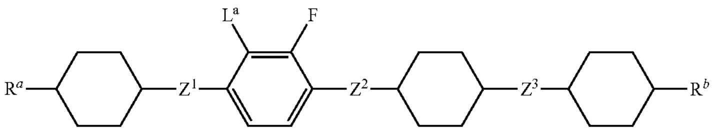

| No. | $R^a$ | $Z^1$ | $Z^2$ | $Z^3$ | $L^1$ | $R^b$ | Physical Properties |
|---|---|---|---|---|---|---|---|
| 112 | $C_5H_{11}O$ | — | — | — | H | $CH{=}CH_2$ | |
| 113 | $C_2H_5OCH_2$ | — | — | — | H | $CH{=}CH_2$ | |
| 114 | $CH_3OC_2H_4$ | — | — | — | H | $CH{=}CH_2$ | |
| 115 | $CH_3O$ | — | — | — | H | $CH{=}CHCH_3$ | |
| 116 | $C_2H_5O$ | — | — | — | H | $CH{=}CHCH_3$ | |
| 117 | $C_3H_7O$ | — | — | — | H | $CH{=}CHCH_3$ | |
| 118 | $C_4H_9O$ | — | — | — | H | $CH{=}CHCH_3$ | |
| 119 | $C_5H_{11}O$ | — | — | — | H | $CH{=}CHCH_3$ | |
| 120 | $C_2H_5OCH_2$ | — | — | — | H | $CH{=}CHCH_3$ | |
| 121 | $CH_3OC_2H_4$ | — | — | — | H | $CH{=}CHCH_3$ | |
| 122 | $CH_3O$ | — | — | — | H | $CH_2CH{=}CH_2$ | |
| 123 | $C_2H_5O$ | — | — | — | H | $CH_2CH{=}CH_2$ | |
| 124 | $C_3H_7O$ | — | — | — | H | $CH_2CH{=}CH_2$ | |
| 125 | $C_2H_5O$ | — | — | — | H | $CH{=}CHC_2H_5$ | |
| 126 | $C_5H_{11}O$ | — | — | — | H | $CH{=}CHC_2H_5$ | |
| 127 | $C_2H_5OCH_2$ | — | — | — | H | $CH{=}CHC_2H_5$ | |
| 128 | $CH_3OC_2H_4$ | — | — | — | H | $CH{=}CHC_2H_5$ | |
| 129 | $CH_3O$ | — | — | — | H | $C_2H_4CH{=}CH_2$ | |
| 130 | $C_2H_5O$ | — | — | — | H | $CH_2CH{=}CHCH_3$ | |
| 131 | $C_2H_5CH{=}CH$ | — | — | — | H | $CH{=}CH_2$ | |
| 132 | $CH_2{=}CH$ | — | — | — | H | CH═CHC2H5 | |
| 133 | $C_2H_5O$ | — | — | — | H | $OC_4H_9$ | |
| 134 | $C_4H_9O$ | — | — | — | H | $OC_2H_5$ | |
| 135 | $CH_2{=}CHC_2H_4O$ | — | — | — | H | $C_3H_7$ | |
| 136 | $C_3H_7$ | — | — | — | H | $OC_2H_4CH{=}CH_2$ | |
| 137 | $CH_2{=}CHC_2H_4O$ | — | — | — | H | $CH{=}CHCH_2OCH_3$ | |
| 138 | $CH_3OCH_2CH{=}CH$ | — | — | — | H | $OC_2H_4CH{=}CH_2$ | |
| 139 | $CH_3$ | — | — | — | F | $CH{=}CH_2$ | |
| 140 | $C_2H_5$ | — | — | — | F | $CH{=}CH_2$ | |
| 141 | $C_3H_7$ | — | — | — | F | $CH{=}CH_2$ | No.141; C 65.9 SB 131.2 N 298.2 I TNI; 222.6° C., Δε; −2.47, Δn; 0.112 |
| 142 | $C_4H_9$ | — | — | — | F | $CH{=}CH_2$ | |
| 143 | $C_5H_{11}$ | — | — | — | F | $CH{=}CH_2$ | |
| 144 | $C_7H_{15}$ | — | — | — | F | $CH{=}CH_2$ | |
| 145 | $C_9H_{19}$ | — | — | — | F | $CH{=}CH_2$ | |
| 146 | $CH_3$ | — | — | — | F | $CH{=}CHCH_3$ | |
| 147 | $C_2H_5$ | — | — | — | F | $CH{=}CHCH_3$ | |
| 148 | $C_3H_7$ | — | — | — | F | $CH{=}CHCH_3$ | |
| 149 | $C_4H_9$ | — | — | — | F | $CH{=}CHCH_3$ | |
| 150 | $C_5H_{11}$ | — | — | — | F | $CH{=}CHCH_3$ | |
| 151 | $C_7H_{15}$ | — | — | — | F | $CH{=}CHCH_3$ | |
| 152 | $C_9H_{19}$ | — | — | — | F | $CH{=}CHCH_3$ | |
| 153 | $C_3H_7$ | — | — | — | F | $CH_2CH{=}CH_2$ | |
| 154 | $C_5H_{11}$ | — | — | — | F | $CH_2CH{=}CH_2$ | |
| 155 | $C_7H_{15}$ | — | — | — | F | $CH_2CH{=}CH_2$ | |
| 156 | $C_5H_{11}$ | — | — | — | F | $CH{=}CHC_2H_5$ | |
| 157 | $C_6H_{13}$ | — | — | — | F | $CH{=}CHC_2H_5$ | |
| 158 | $C_7H_{15}$ | — | — | — | F | $CH{=}CHC_2H_5$ | |
| 159 | $C_8H_{17}$ | — | — | — | F | $CH{=}CHC_2H_5$ | |
| 160 | $C_7H_{15}$ | — | — | — | F | $C_2H_4CH{=}CH_2$ | |
| 161 | $C_5H_{11}$ | — | — | — | F | $CH_2CH{=}CHCH_3$ | |
| 162 | $C_3H_7$ | — | — | — | F | $OCH_3$ | |
| 163 | $C_5H_{11}$ | — | — | — | F | $OCH_3$ | No.163; C 71.9 SB 103.9 N 263.0 I TNI; 197.9° C., Δε; −2.72, Δn; 0.103 |
| 164 | $C_9H_{19}$ | — | — | — | F | $OCH_3$ | |
| 165 | $CH_3$ | — | — | — | F | $OC_2H_5$ | |
| 166 | $C_3H_7$ | — | — | — | F | $OC_2H_5$ | |
| 167 | $C_4H_9$ | — | — | — | F | $OC_2H_5$ | |
| 168 | $C_5H_{11}$ | — | — | — | F | $CC_2H_5$ | No.168; C 63.9 SB 176.8 N 287.8 I TNI; 212.6° C., Δε; −3.02, Δn; 0.115 |
| 169 | $C_5H_{11}$ | — | — | — | F | $OC_3H_7$ | |
| 170 | $C_7H_{15}$ | — | — | — | F | $OC_3H_7$ | |
| 171 | $C_9H_{19}$ | — | — | — | F | $OC_3H_7$ | |
| 172 | $C_3H_7$ | — | — | — | F | $CH_2OC_2H_5$ | |
| 173 | $C_5H_{11}$ | — | — | — | F | $CH_2OC_2H_5$ | |
| 174 | $C_7H_{15}$ | — | — | — | F | $CH_2OC_2H_5$ | |
| 175 | $C_5H_{11}$ | — | — | — | F | $C_2H_4OCH_3$ | |
| 176 | $C_6H_{13}$ | — | — | — | F | $C_2H_4OCH_3$ | |
| 177 | $C_7H_{15}$ | — | — | — | F | $C_2H_4OCH_3$ | |

-continued (a)

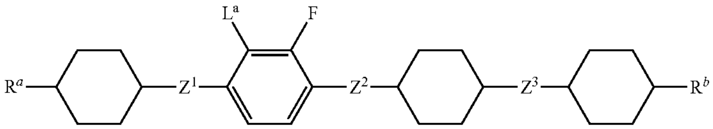

| No. | $R^a$ | $Z^1$ | $Z^2$ | $Z^3$ | $L^1$ | $R^b$ | Physical Properties |
|---|---|---|---|---|---|---|---|
| 178 | $C_8H_{17}$ | — | — | — | F | $C_2H_4OCH_3$ | |
| 179 | $C_7H_{15}$ | — | — | — | F | $OC_4H_9$ | |
| 180 | $C_5H_{11}$ | — | — | — | F | $OC_5H_{11}$ | |
| 181 | $CH_2{=}CH$ | — | — | — | F | $OCH_3$ | |
| 182 | $CH_2{=}CH$ | — | — | — | F | $OC_2H_5$ | |
| 183 | $CH_2{=}CH$ | — | — | — | F | $OC_3H_7$ | |
| 184 | $CH_2{=}CH$ | — | — | — | F | $OC_4H_9$ | |
| 185 | $CH_2{=}CH$ | — | — | — | F | $OC_5H_{11}$ | |
| 186 | $CH_2{=}CH$ | — | — | — | F | $CH_2OC_2H_5$ | |
| 187 | $CH_2{=}CH$ | — | — | — | F | $C_2H_4OCH_3$ | |
| 188 | $CH_3CH{=}CH$ | — | — | — | F | $OCH_3$ | |
| 189 | $CH_3CH{=}CH$ | — | — | — | F | $OC_2H_5$ | |
| 190 | $CH_3CH{=}CH$ | — | — | — | F | $OC_3H_7$ | |
| 191 | $CH_3CH{=}CH$ | — | — | — | F | $OC_4H_9$ | |
| 192 | $CH_3CH{=}CH$ | — | — | — | F | $OC_5H_{11}$ | |
| 193 | $CH_3CH{=}CH$ | — | — | — | F | $CH_2OC_2H_5$ | |
| 194 | $CH_3CH{=}CH$ | — | — | — | F | $C_2H_4OCH_3$ | |
| 195 | $CH_2{=}CHCH_2$ | — | — | — | F | $OCH_3$ | |
| 196 | $CH_2{=}CHCH_2$ | — | — | — | F | $OC_2H_5$ | |
| 197 | $CH_2{=}CHCH_2$ | — | — | — | F | $OC_3H_7$ | |
| 198 | $C_2H_5CH{=}CH$ | — | — | — | F | $OC_2H_5$ | |
| 199 | $C_2H_5CH{=}CH$ | — | — | — | F | $OC_5H_{11}$ | |
| 200 | $C_2H_5CH{=}CH$ | — | — | — | F | $CH_2OC_2H_5$ | |
| 201 | $C_2H_5CH{=}CH$ | — | — | — | F | $C_2H_4OCH_3$ | |
| 202 | $CH_2{=}CHC_2H_4$ | — | — | — | F | $OCH_3$ | |
| 203 | $CH_3CH{=}CHCH_2$ | — | — | — | F | $OC_2H_5$ | |
| 204 | $CH_3O$ | — | — | — | F | $CH{=}CH_2$ | |
| 205 | $C_2H_5O$ | — | — | — | F | $CH{=}CH_2$ | |
| 206 | $C_3H_7O$ | — | — | — | F | $CH{=}CH_2$ | |
| 207 | $C_4H_9O$ | — | — | — | F | $CH{=}CH_2$ | |
| 208 | $C_5H_{11}O$ | — | — | — | F | $CH{=}CH_2$ | |
| 209 | $C_2H_5OCH_2$ | — | — | — | F | $CH{=}CH_2$ | |
| 210 | $CH_3OC_2H_4$ | — | — | — | F | $CH{=}CH_2$ | |
| 211 | $CH_3O$ | — | — | — | F | $CH{=}CHCH_3$ | |
| 212 | $C_2H_5O$ | — | — | — | F | $CH{=}CHCH_3$ | |
| 213 | $C_3H_7O$ | — | — | — | F | $CH{=}CHCH_3$ | |
| 214 | $C_4H_9O$ | — | — | — | F | $CH{=}CHCH_3$ | |
| 215 | $C_5H_{11}O$ | — | — | — | F | $CH{=}CHCH_3$ | |
| 216 | $C_2H_5OCH_2$ | — | — | — | F | $CH{=}CHCH_3$ | |
| 217 | $CH_3OC_2H_4$ | — | — | — | F | $CH{=}CHCH_3$ | |
| 218 | $CH_3O$ | — | — | — | F | $CH_2CH{=}CH_2$ | |
| 219 | $C_2H_5O$ | — | — | — | F | $CH_2CH{=}CH_2$ | |
| 220 | $C_3H_7O$ | — | — | — | F | $CH_2CH{=}CH_2$ | |
| 221 | $C_2H_5O$ | — | — | — | F | $CH{=}CHC_2H_5$ | |
| 222 | $C_5H_{11}O$ | — | — | — | F | $CH{=}CHC_2H_5$ | |
| 223 | $C_2H_5OCH_2$ | — | — | — | F | $CH{=}CHC_2H_5$ | |
| 224 | $CH_3OC_2H_4$ | — | — | — | F | $CH{=}CHC_2H_5$ | |
| 225 | $CH_3O$ | — | — | — | F | $C_2H_4CH{=}CH_2$ | |
| 226 | $C_2H_5O$ | — | — | — | F | $CH_2CH{=}CHCH_3$ | |
| 227 | $C_2H_5CH{=}CH$ | — | — | — | F | $CH{=}CH_2$ | |
| 228 | $CH_2{=}CH$ | — | — | — | F | $CH{=}CHC_2H_5$ | |
| 229 | $C_2H_5O$ | — | — | — | F | $OC_4H_9$ | |
| 230 | $C_4H_9O$ | — | — | — | F | $OC_2H_5$ | |
| 231 | $CH_2{=}CHC_2H_4O$ | — | — | — | F | $OC_3H_7$ | |
| 232 | $C_3H_7$ | — | — | — | F | $OC_2H_4CH{=}CH_2$ | |
| 233 | $CH_2{=}CHC_2H_4O$ | — | — | — | F | $CH{=}CHCH_2OCH_3$ | |
| 234 | $CH_3OCH_2CH{=}CH$ | — | — | — | F | $OC_2H_4CH{=}CH_2$ | |
| 235 | $C_3H_7$ | $-CH_2CH_2-$ | — | — | H | $CH{=}CH_2$ | |
| 236 | $CH_2{=}CH$ | $-CH_2CH_2-$ | — | — | H | $C_5H_{11}$ | |
| 237 | $C_7H_{15}$ | $-CH_2CH_2-$ | — | — | H | $OC_2H_5$ | |
| 238 | $C_2H_5O$ | $-CH_2CH_2-$ | — | — | H | $C_7H_{15}$ | |
| 239 | $C_2H_5CH{=}CH$ | $-CH_2CH_2-$ | — | — | H | $OC_4H_9$ | |
| 240 | $C_4H_9O$ | $-CH_2CH_2-$ | — | — | H | $CH{=}CHC_2H_5$ | |
| 241 | $CH_2{=}CH$ | $-CH_2CH_2-$ | — | — | H | $CH_2CH{=}CHCH_3$ | |
| 242 | $CH_3CH{=}CHCH_2$ | $-CH_2CH_2-$ | — | — | H | $CH{=}CH_2$ | |
| 243 | $CH_3OC_2H_4$ | $-CH_2CH_2-$ | — | — | H | $OC_3H_7$ | |
| 244 | $C_3H_7O$ | $-CH_2CH_2-$ | — | — | H | $C_2H_4OCH_3$ | |
| 245 | $C_3H_7$ | — | $-CH_2CH_2-$ | — | H | $CH{=}CH_2$ | |
| 246 | $C_2H_5CH{=}CH$ | — | $-CH_2CH_2-$ | — | H | $C_9H_{19}$ | |

-continued (a)

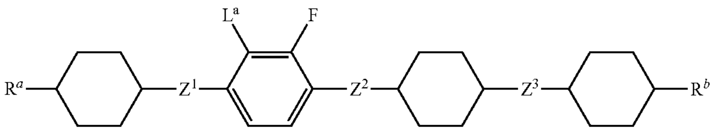

| No. | $R^a$ | $Z^1$ | $Z^2$ | $Z^3$ | $L^1$ | $R^b$ | Physical Properties |
|---|---|---|---|---|---|---|---|
| 247 | $C_7H_{15}$ | — | —$CH_2CH_2$— | — | H | $OC_2H_5$ | |
| 248 | $C_2H_5O$ | — | —$CH_2CH_2$— | — | H | $C_7H_{15}$ | |
| 249 | $C_2H_5CH=CH$ | — | —$CH_2CH_2$— | — | H | $OC_3H_7$ | |
| 250 | $C_3H_7O$ | — | —$CH_2CH_2$— | — | H | $CH=CHC_2H_5$ | |
| 251 | $CH_3CH=CH$ | — | —$CH_2CH_2$— | — | H | $CH_2CH=CHC_2H_5$ | |
| 252 | $C_2H_5CH=CHCH_2$ | — | —$CH_2CH_2$— | — | H | $CH=CHCH_3$ | |
| 253 | $C_2H_5OC_2H_4$ | — | —$CH_2CH_2$— | — | H | $OC_6H_{13}$ | |
| 254 | $C_6H_{13}O$ | — | —$CH_2CH_2$— | — | H | $C_2H_4OC_2H_5$ | |
| 255 | $C_7H_{15}$ | — | — | —$CH_2CH_2$— | H | $CH=CHCH_3$ | |
| 256 | $CH_3CH=CH$ | — | — | —$CH_2CH_2$— | H | $C_5H_{11}$ | |
| 257 | $C_5H_{11}$ | — | — | —$CH_2CH_2$— | H | $OCH_3$ | |
| 258 | $C_2H_5O$ | — | — | —$CH_2CH_2$— | H | $C_5H_{11}$ | |
| 259 | $C_3H_7CH=CH$ | — | — | —$CH_2CH_2$— | H | $OC_4H_9$ | |
| 260 | $C_4H_9O$ | — | — | —$CH_2CH_2$— | H | $CH=CHC_3H_7$ | |
| 261 | $CH_2=CH$ | — | — | —$CH_2CH_2$— | H | $C_2H_4CH=CH_2$ | |
| 262 | $CH_2=CHC_2H_4$ | — | — | —$CH_2CH_2$— | H | $CH=CH_2$ | |
| 263 | $C_2H_5OC_2H_4$ | — | — | —$CH_2CH_2$— | H | $OCH_3$ | |
| 264 | $CH_3O$ | — | — | —$CH_2CH_2$— | H | $C_2H_4OC_2H_5$ | |
| 265 | $C_5H_{11}$ | —$CH_2CH_2$— | —$CH_2CH_2$— | — | H | $CH=CH_2$ | |
| 266 | $CH_2=CH$ | —$CH_2CH_2$— | —$CH_2CH_2$— | — | H | $C_5H_{11}$ | |
| 267 | $C_2H_5CH=CH$ | —$CH_2CH_2$— | —$CH_2CH_2$— | — | H | $OC_4H_9$ | |
| 268 | $C_4H_9O$ | —$CH_2CH_2$— | —$CH_2CH_2$— | — | H | $CH=CHC_2H_5$ | |
| 269 | $C_2H_5CH=CHCH_2$ | —$CH_2CH_2$— | —$CH_2CH_2$— | — | H | $CH=CHCH_3$ | |
| 270 | $C_3H_7$ | — | —$CH_2CH_2$— | —$CH_2CH_2$— | H | $CH=CHC_3H_7$ | |
| 271 | $C_3H_7CH=CH$ | — | —$CH_2CH_2$— | —$CH_2CH_2$— | H | $C_3H_7$ | |
| 272 | $C_2H_5O$ | — | —$CH_2CH_2$— | —$CH_2CH_2$— | H | $CH=CHCH_3$ | |
| 273 | $CH_3CH=CH$ | — | —$CH_2CH_2$— | —$CH_2CH_2$— | H | $OC_2H_5$ | |
| 274 | $CH_3CH=CH$ | — | —$CH_2CH_2$— | —$CH_2CH_2$— | H | $C_2H_4CH=CH_2$ | |
| 275 | $C_7H_{15}$ | —$CH_2CH_2$— | — | —$CH_2CH_2$— | H | $CH=CHCH_3$ | |
| 276 | $CH_3CH=CH$ | —$CH_2CH_2$— | — | —$CH_2CH_2$— | H | $C_5H_{11}$ | |
| 277 | $C_6H_{13}O$ | —$CH_2CH_2$— | — | —$CH_2CH_2$— | H | $CH_2CH=CHC_2H_5$ | |
| 278 | $C_2H_5CH=CHCH_2$ | —$CH_2CH_2$— | — | —$CH_2CH_2$— | H | $OC_6H_{13}$ | |
| 279 | $CH_3CH=CH$ | —$CH_2CH_2$— | — | —$CH_2CH_2$— | H | $CH_2CH=CHC_2H_5$ | |
| 280 | $C_9H_{19}$ | —$CH_2CH_2$— | —$CH_2CH_2$— | —$CH_2CH_2$— | H | $CH=CHC_2H_5$ | |
| 281 | $C_2H_5CH=CH$ | —$CH_2CH_2$— | —$CH_2CH_2$— | —$CH_2CH_2$— | H | $C_9H_{19}$ | |
| 282 | $C_4H_9O$ | —$CH_2CH_2$— | —$CH_2CH_2$— | —$CH_2CH_2$— | H | $CH=CH_2$ | |
| 283 | $CH_2=CH$ | —$CH_2CH_2$— | —$CH_2CH_2$— | —$CH_2CH_2$— | H | $OC_4H_9$ | |
| 284 | $C_3H_7CH=CH$ | —$CH_2CH_2$— | —$CH_2CH_2$— | —$CH_2CH_2$— | H | $CH_2CH=CHC_2H_5$ | |
| 285 | $C_5H_{11}$ | —$OCH_2$— | — | — | H | $CH=CH_2$ | |
| 286 | $CH_2=CH$ | —$OCH_2$— | — | — | H | $C_5H_{11}$ | |
| 287 | $C_7H_{15}$ | —$OCH_2$— | — | — | H | $OC_2H_5$ | |
| 288 | $C_2H_5O$ | —$OCH_2$— | — | — | H | $C_7H_{15}$ | |
| 289 | $C_2H_5CH=CH$ | —$OCH_2$— | — | — | H | $OC_4H_9$ | |
| 290 | $C_4H_9O$ | —$OCH_2$— | — | — | H | $CH=CHC_2H_5$ | |
| 291 | $CH_2=CH$ | —$OCH_2$— | — | — | H | $CH_2CH=CHCH_3$ | |
| 292 | $CH_3CH=CHCH_2$ | —$OCH_2$— | — | — | H | $CH=CH_2$ | |
| 293 | $CH_3OC_2H_4$ | —$OCH_2$— | — | — | H | $OC_3H_7$ | |
| 294 | $C_3H_7O$ | —$OCH_2$— | — | — | H | $C_2H_4OCH_3$ | |
| 295 | $C_9H_{19}$ | —$OCH_2$— | — | — | H | $CH=CHC_2H_5$ | |
| 296 | $C_2H_5CH=CH$ | — | —$OCH_2$— | — | H | $C_9H_{19}$ | |
| 297 | $C_7H_{15}$ | — | —$OCH_2$— | — | H | $OC_2H_5$ | |
| 298 | $C_2H_5O$ | — | —$OCH_2$— | — | H | $C_3H_7$ | |
| 299 | $C_2H_5CH=CH$ | — | —$OCH_2$— | — | H | $OC_3H_7$ | |
| 300 | $C_3H_7O$ | — | —$OCH_2$— | — | H | $CH=CHCH_3$ | |
| 301 | $CH_3CH=CH$ | — | —$OCH_2$— | — | H | $CH_2CH=CHC_2H_5$ | |
| 302 | $C_2H_5CH=CHCH_2$ | — | —$OCH_2$— | — | H | $CH=CHCH_3$ | |
| 303 | $C_2H_5OC_2H_4$ | — | —$OCH_2$— | — | H | $OC_6H_{13}$ | |
| 304 | $C_6H_{13}O$ | — | —$OCH_2$— | — | H | $C_2H_4OC_2H_5$ | |
| 305 | $C_7H_{15}$ | — | — | —$OCH_2$— | H | $CH=CHCH_3$ | |
| 306 | $CH_3CH=CH$ | — | — | —$OCH_2$— | H | $C_5H_{11}$ | |
| 307 | $C_5H_{11}$ | — | — | —$OCH_2$— | H | $OCH_3$ | |
| 308 | $CH_3O$ | — | — | —$OCH_2$— | H | $C_5H_{11}$ | |
| 309 | $C_3H_7CH=CH$ | — | — | —$OCH_2$— | H | $OC_4H_9$ | |
| 310 | $C_4H_9O$ | — | — | —$OCH_2$— | H | $CH=CHC_3H_7$ | |
| 311 | $CH_2=CH$ | — | — | —$OCH_2$— | H | $C_2H_4CH=CH_2$ | |
| 312 | $CH_2=CHC_2H_4$ | — | — | —$OCH_2$— | H | $CH=CH_2$ | |
| 313 | $C_2H_5OC_2H_4$ | — | — | —$OCH_2$— | H | $OCH_3$ | |
| 314 | $CH_3O$ | — | — | —$OCH_2$— | H | $C_2H_4OC_2H_5$ | |
| 315 | $C_5H_{11}$ | —$OCH_2$— | —$OCH_2$— | | H | $CH=CH_2$ | |

-continued (a)

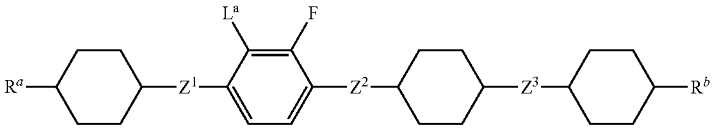

| No. | $R^a$ | $Z^1$ | $Z^2$ | $Z^3$ | $L^1$ | $R^b$ | Physical Properties |
|---|---|---|---|---|---|---|---|
| 316 | $CH_2$=CH | —$OCH_2$— | —$OCH_2$— | | H | $C_5H_{11}$ | |
| 317 | $C_2H_5CH$=CH | —$OCH_2$— | —$OCH_2$— | | H | $OC_4H_9$ | |
| 318 | $C_4H_9O$ | —$OCH_2$— | —$OCH_2$— | | H | CH=$CHC_2H_5$ | |
| 319 | $C_2H_5CH$=$CHCH_2$ | —$OCH_2$— | —$OCH_2$— | | H | CH=$CHCH_3$ | |
| 320 | $C_7H_{15}$ | | —$OCH_2$— | —$OCH_2$— | H | CH=$CHCH_3$ | |
| 321 | $CH_3CH$=CH | | —$OCH_2$— | —$OCH_2$— | H | $C_5H_{11}$ | |
| 322 | $C_6H_{13}O$ | | —$OCH_2$— | —$OCH_2$— | H | $CH_2CH$=$CHC_2H_5$ | |
| 323 | $C_2H_5CH$=$CHCH_2$ | | —$OCH_2$— | —$OCH_2$— | H | $OC_6H_{13}$ | |
| 324 | $CH_3CH$=CH | | —$OCH_2$— | —$OCH_2$— | H | $CH_2CH$=$CHC_2H_5$ | |
| 325 | $C_9H_{19}$ | —$OCH_2$— | | —$OCH_2$— | H | CH=$CHC_2H_5$ | |
| 326 | $C_2H_5CH$=CH | —$OCH_2$— | | —$OCH_2$— | H | $C_9H_{19}$ | |
| 327 | $C_4H_9O$ | —$OCH_2$— | | —$OCH_2$— | H | CH=$CH_2$ | |
| 328 | $CH_2$=CH | —$OCH_2$— | | —$OCH_2$— | H | $OC_4H_9$ | |
| 329 | $C_3H_7CH$=CH | —$OCH_2$— | | —$OCH_2$— | H | $CH_2CH$=$CHC_2H_5$ | |
| 330 | $C_3H_7$ | —$OCH_2$— | —$OCH_2$— | —$OCH_2$— | H | CH=$CHC_3H_7$ | |
| 331 | $C_3H_7CH$=CH | —$OCH_2$— | —$OCH_2$— | —$OCH_2$— | H | $C_3H_7$ | |
| 332 | $C_2H_5O$ | —$OCH_2$— | —$OCH_2$— | —$OCH_2$— | H | CH=$CHCH_3$ | |
| 333 | $CH_3CH$=CH | —$OCH_2$— | —$OCH_2$— | —$OCH_2$— | H | $OC_2H_5$ | |
| 334 | $CH_3CH$=CH | —$OCH_2$— | —$OCH_2$— | —$OCH_2$— | H | $C_2H_4CH$=$CH_2$ | |
| 335 | $C_5H_{11}$ | —$CH_2O$— | — | — | H | CH=$CH_2$ | |
| 336 | $CH_2$=CH | —$CH_2O$— | — | — | H | $C_5H_{11}$ | |
| 337 | $C_7H_{15}$ | —$CH_2O$— | — | — | H | $OC_2H_5$ | |
| 338 | $C_2H_5O$ | —$CH_2O$— | — | — | H | $C_7H_{15}$ | |
| 339 | $C_2H_5CH$=CH | —$CH_2O$— | — | — | H | $OC_4H_9$ | |
| 340 | $C_4H_9O$ | —$CH_2O$— | — | — | H | CH=$CHC_2H_5$ | |
| 341 | $CH_2$=CH | —$CH_2O$— | — | — | H | $CH_2CH$=$CHCH_3$ | |
| 342 | $CH_3CH$=$CHCH_2$ | —$CH_2O$— | — | — | H | CH=$CH_2$ | |
| 343 | $CH_3OC_2H_4$ | —$CH_2O$— | | | H | $OC_3H_7$ | |
| 344 | $C_3H_7O$ | —$CH_2O$— | — | — | H | $C_2H_4OCH_3$ | |
| 345 | $C_9H_{19}$ | — | —$CH_2O$— | — | H | CH=$CHC_2H_5$ | |
| 346 | $C_2H_4CH$=CH | — | —$CH_2O$— | — | H | $C_9H_{19}$ | |
| 347 | $C_7H_{15}$ | — | —$CH_2O$— | — | H | $OC_2H_5$ | |
| 348 | $C_2H_5O$ | — | —$CH_2O$— | — | H | $C_7H_{15}$ | |
| 349 | $C_2H_5CH$=CH | — | —$CH_2O$— | — | H | $OC_3H_7$ | |
| 350 | $C_3H_7O$ | — | —$CH_2O$— | — | H | CH=$CHC_2H_5$ | |
| 351 | $CH_3CH$=CH | — | —$CH_2O$— | — | H | $CH_2CH$=$CHC_2H_5$ | |
| 352 | $C_2H_5CH$=$CHCH_2$ | — | —$CH_2O$— | — | H | CH=$CHCH_3$ | |
| 353 | $C_2H_5OC_2H_4$ | — | —$CH_2O$— | — | H | $OC_6H_{13}$ | |
| 354 | $C_6H_{13}O$ | — | —$CH_2O$— | — | H | $C_2H_4OC_2H_5$ | |
| 355 | $C_7H_{15}$ | — | — | —$CH_2O$— | H | CH=$CHCH_3$ | |
| 356 | $CH_3CH$=CH | — | — | —$CH_2O$— | H | $C_5H_{11}$ | |
| 357 | $C_5H_{11}$ | — | — | —$CH_2O$— | H | $OCH_3$ | |
| 358 | $CH_3O$ | — | — | —$CH_2O$— | H | $C_5H_{11}$ | |
| 359 | $C_3H_7CH$=CH | — | — | —$CH_2O$— | H | $OC_4H_9$ | |
| 360 | $C_4H_9O$ | — | — | —$CH_2O$— | H | CH=$CHC_3H_7$ | |
| 361 | $CH_2$=CH | — | — | —$CH_2O$— | H | $C_2H_4CH$=$CH_2$ | |
| 362 | $C_2H_4CH$=CH | — | — | —$CH_2O$— | H | CH=$CH_2$ | |
| 363 | $C_2H_5OC_2H_4$ | — | — | —$CH_2O$— | H | $OCH_3$ | |
| 364 | $CH_3O$ | — | — | —$CH_2O$— | H | $C_2H_4OC_2H_5$ | |
| 365 | $C_5H_{11}$ | —$CH_2O$— | —$CH_2O$— | — | H | CH=$CH_2$ | |
| 366 | $CH_2$=CH | —$CH_2O$— | —$CH_2O$— | — | H | $C_5H_{11}$ | |
| 367 | $C_2H_5CH$=CH | —$CH_2O$— | —$CH_2O$— | — | H | $OC_4H_9$ | |
| 368 | $C_4H_9O$ | —$CH_2O$— | —$CH_2O$— | — | H | CH=$CHC_2H_5$ | |
| 369 | $C_2H_5CH$=$CHCH_2$ | —$CH_2O$— | —$CH_2O$— | — | H | CH=$CHCH_3$ | |
| 370 | $C_3H_7$ | — | —$CH_2O$— | —$CH_2O$— | H | CH=$CHC_3H_7$ | |
| 371 | $C_3H_7CH$=CH | — | —$CH_2O$— | —$CH_2O$— | H | $C_3H_7$ | |
| 372 | $C_2H_5O$ | — | —$CH_2O$— | —$CH_2O$— | H | CH=$CHCH_3$ | |
| 373 | $CH_3CH$=CH | — | —$CH_2O$— | —$CH_2O$— | H | $OC_2H_5$ | |
| 374 | $CH_3CH$=CH | — | —$CH_2O$— | —$CH_2O$— | H | $C_2H_4CH$=$CH_2$ | |
| 375 | $C_7H_{15}$ | —$CH_2O$— | — | —$CH_2O$— | H | CH=$CHCH_3$ | |
| 376 | $CH_3CH$=CH | —$CH_2O$— | — | —$CH_2O$— | H | $C_5H_{11}$ | |
| 377 | $C_6H_{13}O$ | —$CH_2O$— | — | —$CH_2O$— | H | $CH_2CH$=$CHC_2H_5$ | |
| 378 | $C_2H_5CH$=$CHCH_2$ | —$CH_2O$— | — | —$CH_2O$— | H | $OC_6H_{13}$ | |
| 379 | $CH_3CH$=CH | —$CH_2O$— | — | —$CH_2O$— | H | $CH_2CH$=$CHC_2H_5$ | |
| 380 | $C_9H_{19}$ | —$CH_2O$— | —$CH_2O$— | —$CH_2O$— | H | CH=$CHC_2H_5$ | |
| 381 | $C_2H_5CH$=CH | —$CH_2O$— | —$CH_2O$— | —$CH_2O$— | H | $C_9H_{19}$ | |
| 382 | $C_4H_9O$ | —$CH_2O$— | —$CH_2O$— | —$CH_2O$— | H | CH=$CH_2$ | |
| 383 | $CH_2$=CH | —$CH_2O$— | —$CH_2O$— | —$CH_2O$— | H | $OC_4H_9$ | |
| 384 | $C_3H_7CH$=CH | —$CH_2O$— | —$CH_2O$— | —$CH_2O$— | H | $CH_2CH$=$CHC_2H_5$ | |

-continued (a)

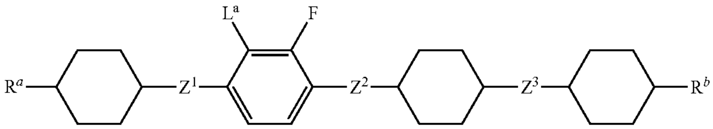

| No. | $R^a$ | $Z^1$ | $Z^2$ | $Z^3$ | $L^1$ | $R^b$ | Physical Properties |
|---|---|---|---|---|---|---|---|
| 385 | $CH_2{=}CH$ | $—CH_2CH_2—$ | $—OCH_2—$ | — | H | $C_5H_{11}$ | |
| 386 | $C_5H_{11}$ | $—CH_2CH_2—$ | $—OCH_2—$ | — | H | $CH{=}CH_2$ | |
| 387 | $C_7H_{15}$ | $—CH_2CH_2—$ | — | $—OCH_2—$ | H | $CH{=}CHC_2H_5$ | |
| 388 | $C_2H_5CH{=}CH$ | $—CH_2CH_2—$ | — | $—OCH_2—$ | H | $C_7H_{15}$ | |
| 389 | $C_9H_{19}$ | $—CH_2CH_2—$ | $—CH_2O—$ | — | H | $CH_2CH{=}CHC_2H_5$ | |
| 390 | $C_2H_5CH{=}CHCH_2$ | $—CH_2CH_2—$ | $—CH_2O—$ | — | H | $C_9H_{19}$ | |
| 391 | $C_4H_9$ | $—CH_2CH_2—$ | — | $—CH_2O—$ | H | $CH{=}CHCH_3$ | |
| 392 | $CH_3CH{=}CH$ | $—CH_2CH_2—$ | — | $—CH_2O—$ | H | $C_4H_9$ | |
| 393 | $C_7H_{15}$ | $—CH_2CH_2—$ | $—OCH_2—$ | $—OCH_2—$ | H | $CH{=}CHCH_3$ | |
| 394 | $CH_3CH{=}CH$ | $—CH_2CH_2—$ | $—OCH_2—$ | $—OCH_2—$ | H | $C_7H_{15}$ | |
| 395 | $C_3H_7$ | $—CH_2CH_2—$ | $—CH_2O—$ | $—OCH_2—$ | H | $C_2H_4CH{=}CH_2$ | |
| 396 | $CH_2{=}CHC_2H_4$ | $—CH_2CH_2—$ | $—CH_2O—$ | $—OCH_2—$ | H | $C_3H_7$ | |
| 397 | $CH_3$ | $—CH_2CH_2—$ | $—OCH_2—$ | $—CH_2CH_2—$ | H | $CH{=}CHC_3H_7$ | |
| 398 | $C_3H_7CH{=}CH$ | $—CH_2CH_2—$ | $—OCH_2—$ | $—CH_2CH_2—$ | H | $CH_3$ | |
| 399 | $CH_3CH{=}CH$ | $—CH_2CH_2—$ | $—CH_2CH_2—$ | $—OCH_2—$ | H | $CH{=}CHC_3H_7$ | |
| 400 | $C_3H_7CH{=}CH$ | $—CH_2CH_2—$ | $—CH_2CH_2—$ | $—OCH_2—$ | H | $CH{=}CHCH_3$ | |
| 401 | $C_9H_{19}$ | $—CH_2CH_2—$ | $—CH_2O—$ | $—CH_2CH_2—$ | H | $C_2H_4CH{=}CH_2$ | |
| 402 | $CH_2{=}CHC_2H_4$ | $—CH_2CH_2—$ | $—CH_2O—$ | $—CH_2CH_2—$ | H | $C_9H_{19}$ | |
| 403 | $C_3H_7$ | $—CH_2CH_2—$ | $—CH_2CH_2—$ | $—CH_2O—$ | H | $C_2H_4CH{=}CH_2$ | |
| 404 | $CH_2{=}CHC_2H_4$ | $—CH_2CH_2—$ | $—CH_2CH_2—$ | $—CH_2O—$ | H | $C_3H_7$ | |
| 405 | $CH_2{=}CH$ | $—OCH_2—$ | $—CH_2CH_2—$ | — | H | $C_5H_{11}$ | |
| 406 | $C_5H_{11}$ | $—OCH_2—$ | $—CH_2CH_2—$ | — | H | $CH{=}CH_2$ | |
| 407 | $C_7H_{15}$ | $—OCH_2—$ | — | $—CH_2CH_2—$ | H | $CH{=}CHC_2H_5$ | |
| 408 | $C_2H_5CH{=}CH$ | $—OCH_2—$ | — | $—CH_2CH_2—$ | H | $C_7H_{15}$ | |
| 409 | $C_9H_{19}$ | $—OCH_2—$ | $—CH_2O—$ | — | H | $CH_2CH{=}CHC_2H_5$ | |
| 410 | $C_2H_5CH{=}CHCH_2$ | $—OCH_2—$ | $—CH_2O—$ | — | H | $C_9H_{19}$ | |
| 411 | $C_4H_9$ | $—OCH_2—$ | — | $—CH_2O—$ | H | $CH{=}CHCH_3$ | |
| 412 | $CH_3CH{=}CH$ | $—OCH_2—$ | — | $—CH_2O—$ | H | $C_4H_9$ | |
| 413 | $C_7H_{15}$ | $—OCH_2—$ | $—CH_2CH_2—$ | $—OCH_2—$ | H | $CH{=}CHCH_3$ | |
| 414 | $CH_3CH{=}CH$ | $—OCH_2—$ | $—CH_2CH_2—$ | $—OCH_2—$ | H | $C_7H_{15}$ | |
| 415 | $C_3H_7$ | $—OCH_2—$ | $—OCH_2—$ | $—CH_2CH_2—$ | H | $C_2H_4CH{=}CH_2$ | |
| 416 | $CH_2{=}CHC_2H_4$ | $—OCH_2—$ | $—OCH_2—$ | $—CH_2CH_2—$ | H | $C_3H_7$ | |
| 417 | $CH_3$ | $—OCH_2—$ | $—CH_2O—$ | $—OCH_2—$ | H | $CH{=}CHC_3H_7$ | |
| 418 | $C_3H_7CH{=}CH$ | $—OCH_2—$ | $—CH_2O—$ | $—OCH_2—$ | H | $CH_3$ | |
| 419 | $CH_3CH{=}CH$ | $—OCH_2—$ | $—OCH_2—$ | $—CH_2O—$ | H | $CH{=}CHC_3H_7$ | |
| 420 | $C_3H_7CH{=}CH$ | $—OCH_2—$ | $—OCH_2—$ | $—CH_2O—$ | H | $CH{=}CHCH_3$ | |
| 421 | $C_9H_{19}$ | $—CH_2O—$ | $—CH_2CH_2—$ | — | H | $C_2H_4CH{=}CH_2$ | |
| 422 | $CH_2{=}CHC_2H_4$ | $—CH_2O—$ | $—CH_2CH_2—$ | — | H | $C_9H_{19}$ | |
| 423 | $C_3H_7$ | $—CH_2O—$ | — | $—CH_2CH_2—$ | H | $C_2H_4CH{=}CH_2$ | |
| 424 | $CH_2{=}CHC_2H_4$ | $—CH_2O—$ | — | $—CH_2CH_2—$ | H | $C_3H_7$ | |
| 425 | $CH_2{=}CH$ | $—CH_2O—$ | $—OCH_2—$ | — | H | $C_5H_{11}$ | |
| 426 | $C_5H_{11}$ | $—CH_2O—$ | $—OCH_2—$ | — | H | $CH{=}CH_2$ | |
| 427 | $C_7H_{15}$ | $—CH_2O—$ | — | $—OCH_2—$ | H | $CH{=}CHC_2H_5$ | |
| 428 | $C_2H_5CH{=}CH$ | $—CH_2O—$ | — | $—OCH_2—$ | H | $C_7H_{15}$ | |
| 429 | $C_9H_{19}$ | $—CH_2O—$ | $—CH_2CH_2—$ | $—CH_2O—$ | H | $CH_2CH{=}CHC_2H_5$ | |
| 430 | $C_2H_5CH{=}CHCH_2$ | $—CH_2O—$ | $—CH_2CH_2—$ | $—CH_2O—$ | H | $C_9H_{19}$ | |
| 431 | $C_4H_9$ | $—CH_2O—$ | $—CH_2O—$ | $—CH_2CH_2—$ | H | $CH{=}CHCH_3$ | |
| 432 | $CH_3CH{=}CH$ | $—CH_2O—$ | $—CH_2O—$ | $—CH_2CH_2—$ | H | $C_4H_9$ | |
| 433 | $C_7H_{15}$ | $—CH_2O—$ | $—OCH_2—$ | $—CH_2O—$ | H | $CH{=}CHCH_3$ | |
| 434 | $CH_3CH{=}CH$ | $—CH_2O—$ | $—OCH_2—$ | $—CH_2O—$ | H | $C_7H_{15}$ | |
| 435 | $C_3H_7$ | $—CH_2O—$ | $—CH_2O—$ | $—OCH_2—$ | H | $C_2H_4CH{=}CH_2$ | |
| 436 | $CH_2{=}CHC_2H_4$ | $—CH_2O—$ | $—CH_2O—$ | $—OCH_2—$ | H | $C_3H_7$ | |
| 437 | $C_5H_{11}$ | $—CH_2CH_2—$ | — | — | F | $CH{=}CH_2$ | |
| 438 | $C_7H_{15}$ | $—CH_2CH_2—$ | — | — | F | $OC_2H_5$ | |
| 439 | $C_2H_5CH{=}CH$ | $—CH_2CH_2—$ | — | — | F | $OC_4H_9$ | |
| 440 | $C_4H_9O$ | $—CH_2CH_2—$ | — | — | F | $CH{=}CHC_2H_5$ | |
| 441 | $CH_2{=}CH$ | $—CH_2CH_2—$ | — | — | F | $CH_2CH{=}CHCH_3$ | |
| 442 | $CH_3CH{=}CHCH_2$ | $—CH_2CH_2—$ | — | — | F | $CH{=}CH_2$ | |
| 443 | $CH_3OC_2H_4$ | $—CH_2CH_2—$ | — | — | F | $OC_3H_7$ | |
| 444 | $C_3H_7O$ | — | $—CH_2CH_2—$ | — | F | $C_2H_4OCH_3$ | |
| 445 | $C_9H_{19}$ | — | $—CH_2CH_2—$ | — | F | $CH{=}CHC_2H_5$ | |
| 446 | $C_7H_{15}$ | — | $—CH_2CH_2—$ | — | F | $OC_2H_5$ | |
| 447 | $C_2H_5CH{=}CH$ | — | $—CH_2CH_2—$ | — | F | $OC_3H_7$ | |
| 448 | $C_2H_5O$ | — | $—CH_2CH_2—$ | — | F | $CH{=}CHC_2H_5$ | |
| 449 | $CH_3CH{=}CH$ | — | $—CH_2CH_2—$ | — | F | $CH_2CH{=}CHC_2H_5$ | |
| 450 | $C_2H_5CH{=}CHCH_2$ | — | $—CH_2CH_2—$ | — | F | $CH{=}CHCH_3$ | |

-continued (a)

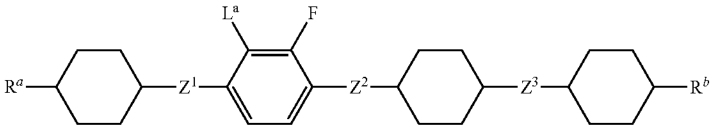

| No. | $R^a$ | $Z^1$ | $Z^2$ | $Z^3$ | $L^1$ | $R^b$ | Physical Properties |
|---|---|---|---|---|---|---|---|
| 451 | $C_2H_5OC_2H_4$ | — | $-CH_2CH_2-$ | — | F | $OC_6H_{13}$ | |
| 452 | $C_6H_{13}O$ | — | $-CH_2CH_2-$ | — | F | $C_2H_4OC_2H_5$ | |
| 453 | $C_7H_{15}$ | — | — | $-CH_2CH_2-$ | F | $CH=CHCH_3$ | |
| 454 | $C_5H_{11}$ | — | — | $-CH_2CH_2-$ | F | $OCH_3$ | |
| 455 | $C_3H_7CH=CH$ | — | — | $-CH_2CH_2-$ | F | $OC_4H_9$ | |
| 456 | $C_4H_9O$ | — | | $-CH_2CH_2-$ | F | $CH=CHC_3H_7$ | |
| 457 | $CH_2=CH$ | — | — | $-CH_2CH_2-$ | F | $C_2H_4CH=CH_2$ | |
| 458 | $CH_2=CHC_2H_4$ | — | — | $-CH_2CH_2-$ | F | $CH=CH_2$ | |
| 459 | $C_2H_5OC_2H_4$ | — | — | $-CH_2CH_2-$ | F | $OCH_3$ | |
| 460 | $CH_3O$ | — | — | $-CH_2CH_2-$ | F | $C_2H_4OC_2H_5$ | |
| 461 | $C_5H_{11}$ | $-CH_2CH_2-$ | $-CH_2CH_2-$ | — | F | $CH=CH_2$ | |
| 462 | $C_2H_5CH=CH$ | $-CH_2CH_2-$ | $-CH_2CH_2-$ | — | F | $OC_4H_9$ | |
| 463 | $C_4H_9O$ | $-CH_2CH_2-$ | $-CH_2CH_2-$ | — | F | $CH=CHC_2H_5$ | |
| 464 | $C_2H_5CH=CHCH_2$ | $-CH_2CH_2-$ | $-CH_2CH_2-$ | — | F | $CH=CHCH_3$ | |
| 465 | $C_3H_7$ | — | $-CH_2CH_2-$ | $-CH_2CH_2-$ | F | $CH=CHC_3H_7$ | |
| 466 | C2H5O | — | $-CH_2CH_2-$ | $-CH_2CH_2-$ | F | $CH=CHCH_3$ | |
| 467 | $CH_3CH=CH$ | — | $-CH_2CH_2-$ | $-CH_2CH_2-$ | F | $OC_2H_5$ | |
| 468 | $CH_3CH=CH$ | — | $-CH_2CH_2-$ | $-CH_2CH_2-$ | F | $C_2H_4CH=CH_2$ | |
| 469 | $C_7H_{15}$ | $-CH_2CH_2-$ | — | $-CH_2CH_2-$ | F | $CH=CHCH_3$ | |
| 470 | $C_6H_{13}O$ | $-CH_2CH_2-$ | — | $-CH_2CH_2-$ | F | $CH_2CH=CHC_2H_5$ | |
| 471 | $C_2H_5CH=CHCH_2$ | $-CH_2CH_2-$ | — | $-CH_2CH_2-$ | F | $OC_6H_{13}$ | |
| 472 | $CH_3CH=CH$ | $-CH_2CH_2-$ | — | $-CH_2CH_2-$ | F | $CH_2CH=CHC_2H_5$ | |
| 473 | $C_9H_{19}$ | $-CH_2CH_2-$ | $-CH_2CH_2-$ | $-CH_2CH_2-$ | F | $CH=CHC_2H_5$ | |
| 474 | $C_4H_9O$ | $-CH_2CH_2-$ | $-CH_2CH_2-$ | $-CH_2CH_2-$ | F | $CH=CH_2$ | |
| 475 | $CH_2=CH$ | $-CH_2CH_2-$ | $-CH_2CH_2-$ | $-CH_2CH_2-$ | F | $OC_4H_9$ | |
| 476 | $C_3H_7CH=CH$ | $-CH_2CH_2-$ | $-CH_2CH_2-$ | $-CH_2CH_2-$ | F | $CH_2CH=CHC_2H_5$ | |
| 477 | $C_7H_{15}$ | — | — | $-OCH_2-$ | F | $CH=CHCH_3$ | |
| 478 | $C_5H_{11}$ | — | — | $-OCH_2-$ | F | $OCH_3$ | |
| 479 | $C_3H_7CH=CH$ | — | — | $-OCH_2-$ | F | $OC_4H_9$ | |
| 480 | $C_4H_9O$ | — | — | $-OCH_2-$ | F | $CH=CHC_3H_7$ | |
| 481 | $CH_2=CH$ | — | — | $-OCH_2-$ | F | $C_2H_4CH=CH_2$ | |
| 482 | $CH_2=CHC_2H_4$ | — | — | $-OCH_2-$ | F | $CH=CH_2$ | |
| 483 | $C_2H_5OC_2H_4$ | — | — | $-OCH_2-$ | F | $OCH_3$ | |
| 484 | $CH_3O$ | — | — | $-OCH_2-$ | F | $C_2H_4OC_2H_5$ | |
| 485 | $C_5H_{11}$ | — | — | $-CH_2O-$ | F | $CH=CH_2$ | |
| 486 | $C_7H_{15}$ | — | — | $-CH_2O-$ | F | $OCH_3$ | |
| 487 | $C_3H_7CH=CH$ | — | — | $-CH_2O-$ | F | $OC_4H_9$ | |
| 488 | $C_4H_9O$ | — | — | $-CH_2O-$ | F | $CH=CHC_3H_7$ | |
| 489 | $CH_2=CH$ | — | — | $-CH_2O-$ | F | $C_2H_4CH=CH_2$ | |
| 490 | $CH_2=CHC_2H_4$ | — | — | $-CH_2O-$ | F | $CH=CH_2$ | |
| 491 | $C_2H_5OC_2H_4$ | — | — | $-CH_2O-$ | F | $OCH_3$ | |
| 492 | $CH_3O$ | — | — | $-CH_2O-$ | F | $C_2H_4OC_2H_5$ | |
| 493 | $C_7H_{15}$ | $-CH_2CH_2-$ | — | $-OCH_2-$ | F | $CH=CH_2$ | |
| 494 | $C_5H_{11}$ | $-CH_2CH_2-$ | $-CH_2CH_2-$ | $-OCH_2-$ | F | $CH=CHCH_3$ | |
| 495 | $C_9H_{19}$ | $-CH_2CH_2-$ | — | $-CH_2O-$ | F | $CH_2CH=CHC_2H_5$ | |
| 496 | $C_3H_7$ | $-CH_2CH_2-$ | $-CH_2CH_2-$ | $-CH_2O-$ | F | $CH=CHC_2H_5$ | |

[Examples of Liquid Crystal Compositions]

Hereinafter, the liquid crystal compositions obtained by means of the invention will be explained in detail on the basis of examples. Liquid crystal compounds used in the examples are expressed as symbols according to the notations in the Table below. In the Table, 1,4-cyclohexylene has a trans-configuration. The ratio (percentage) of each compound means a weight percentage (% by weight) based on the total weight of the composition, unless otherwise indicated. Characteristics of the composition obtained are shown in the last part of each example.

A number described next to the name of a liquid crystal compound in each example corresponds to that of the formula of the liquid crystal compound used for the first to third components of the invention described above. When only a "-" symbol is given instead of the number of a formula, it means another compound, which is different from that of the components.

The notations using symbols for compounds are shown below.

TABLE

Method of Description of Compound using Symbols
$R-(A_1)-Z_1- \ldots -Z_n-(A_n)-R'$

| 1) Left-terminal Group R— | Symbol |
|---|---|
| $C_nH_{2n+1}-$ | n— |
| $C_nH_{2n+1}O-$ | nO— |
| $C_mH_{2m+1}OC_nH_{2n}-$ | mOn— |
| $CH_2=CH-$ | V— |
| $C_nH_{2n+1}-CH=CH-$ | nV— |
| $CH_2=CH-C_nH_{2n}-$ | Vn— |
| $C_mH_{2m+1}-CH=CH-C_nH_{2n}-$ | mVn— |

TABLE-continued

| Method of Description of Compound using Symbols R—($A_1$)—$Z_1$— . . . —$Z_n$—($A_n$)—R' | |
|---|---|
| $CF_2$═CH— | VFF— |
| $CF_2$═CH—$C_nH_{2n}$— | VFFn— |
| 2) Right-terminal Group —R' | Symbol |
| —$C_nH_{2n+1}$ | —n |
| —$OC_nH_{2n+1}$ | —On |
| —OCH═$CH_2$ | —V |
| —OCH═CH—$C_2H_{2n+1}$ | —Vn |
| —$C_nH_{2n}$—CH═$CH_2$ | —nV |
| —$C_mH_{2m}$—CH═CH—$C_nH2_{n+1}$ | —mVn |
| —CH═$CF_2$ | —VFF |
| —$COOCH_3$ | —EMe |
| —F | —F |
| —Cl | —CL |
| —CN | —C |
| —$OCF_3$ | —OCF3 |
| 3) Bonding Group —$Z_n$— | Symbol |
| —$C_nH_{2n}$— | n |
| —COO— | E |
| —CH═CH— | V |
| —$CH_2O$— | 1O |
| —$OCH_2$— | O1 |
| —$CF_2O$— | X |
| —C≡C— | T |
| 4) Ring Structure —$A_n$— | Symbol |
|  | B |
| 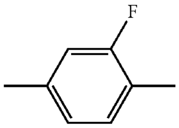 | B(F) |
| 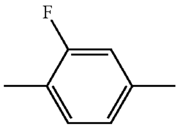 | B(2F) |
| 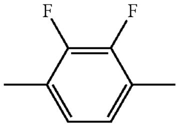 | B(2F,3F) |
| 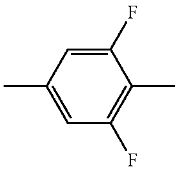 | B(F,F) |
| 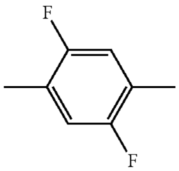 | B(2F,5F) |
| 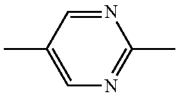 | Py |
| 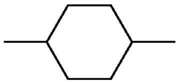 | H |
| 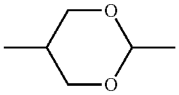 | G |

5) Example of Description

Example 1. 3-HB(F)HH—V

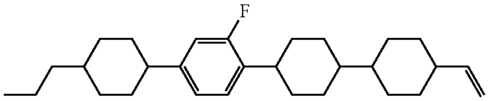

Example 2. V—HB(F)HH-2

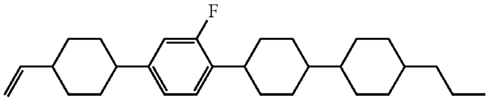

Example 3. 5-HBB(F)B-3

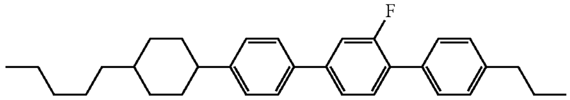

Example 4. 3-HH-4

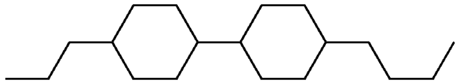

Characteristics were measured according to the following methods. Many of these measurement methods are those described in the Standard of Electronic Industries Association of Japan, EIAJ•ED-2521A, or those with some modifications.

(1) Maximum Temperature of a Nematic Phase (NI; ° C.)

A sample was put on a hot plate in a melting point apparatus equipped with a polarizing microscope, and heated at a rate of 1° C. per minute. A temperature was measured when part of the sample changed from a nematic phase to an isotropic liquid. Hereinafter, the maximum temperature of a nematic phase may be abbreviated to the "maximum temperature."

(2) Minimum Temperature of a Nematic Phase (TC; ° C.)

The same samples having a nematic phase were individually kept in freezers at 0° C., −10° C., −20° C., −30° C. and −40° C. for 10 days, and then the liquid crystal phase were observed. For example, when the sample still remained in the nematic phase at −20° C., and changed to crystals (or a smectic phase) at −30° C., TC was expressed as −20° C. Hereinafter, the minimum temperature of a nematic phase may be abbreviated to the "minimum temperature."

(3) Optical Anisotropy (Δn; measured at 25° C.)

The optical anisotropy was measured using an Abbe refractometer with a polarizing plate attached to the ocular, on irradiation with light at a wavelength of 589 nm. The surface of the main prism was rubbed in one direction, and then a sample was dropped onto the main prism. A refractive index (n∥) was measured when the direction of polarization was parallel to that of rubbing. A refractive index (n⊥) was measured when the direction of polarization was perpendicular to that of rubbing. The value (Δn) of the optical anisotropy was calculated from the equation of Δn=n∥−n⊥.

(4) Viscosity (η; measured at 20° C.; mPa·s)

An E-type viscometer was used for measurement.

(5) Dielectric Anisotropy (Δ∈; measured at 25° C.)

An ethanol (20 mL) solution of octadecyltriethoxysilane (0.16 mL) was applied to well-washed glass substrates. The glass substrates were rotated with a spinner, and then heated at 150° C. for 1 hour. A VA device in which the distance (cell gap) was 20 μm was assembled from the two glass substrates.

A polyimide alignment film was prepared on glass substrates in a similar manner. After a rubbing-treatment to the alignment film obtained on the glass substrates, a TN device in which the distance between the two glass substrates was 9 μm and the twist angle was 80 degrees was assembled.

A sample (a liquid crystal composition, or a mixture of a liquid crystal compound and mother liquid crystals) was put in the VA device obtained, a voltage of 0.5 V (1 kHz, sine waves) was applied to the sample, and then the dielectric constant (∈∥) in the major axis direction of the liquid crystal molecules was measured.

The sample (the liquid crystal composition, or the mixture of the liquid crystal compound and the mother liquid crystals) was put in the TN device obtained, a voltage of 0.5 V (1 kHz, sine waves) was applied to the sample, and then the dielectric constant (∈⊥) in the minor axis direction of the liquid crystal molecules was measured. The value of the dielectric anisotropy was calculated from the equation of Δ∈=∈∥−∈⊥. A composition in which this value is negative has negative dielectric anisotropy.

(6) Voltage Holding Ratio (VHR; measured at 25° C. and 100° C.; %)

A TN device was prepared by putting a sample in a cell that has a polyimide alignment film and the distance between two glass substrates (cell gap) being 6 μm. The TN device was charged at 25° C. by applying pulse voltage (60 microseconds at 5V). The waveforms of the voltage applied to the TN device were observed with a cathode ray oscilloscope and the area between the voltage curve and the axis of abscissa in a unit period (16.7 milliseconds) was measured. An area was similarly measured based on the waveform of the applied voltage after the TN device had been removed. The value of the voltage holding ratio (%) was calculated from the equation:

[voltage holding ratio]=[value of the area in the presence of a TN device]/[value of the area in the absence of a TN device]×100.

The voltage holding ratio thus obtained was referred to as "VHR-1." Then, the TN device was heated at 100° C. for 250 hours. After the TN device had been allowed to return to 25° C., the voltage holding ratio was measured by a method similar to that described above. The voltage holding ratio obtained after the heating test was referred to as "VHR-2." The heating test means an acceleration test and was used as a test corresponding to a long-term durability test for the TN device.

Comparative Example 1

4-Ethyl-4'-(2-fluoro-4-(4-pentylcyclohexyl)phenyl)bi(cyclohexane) (E), where both $R^a$ and $R^b$ were alkyl, was synthesized for comparison.

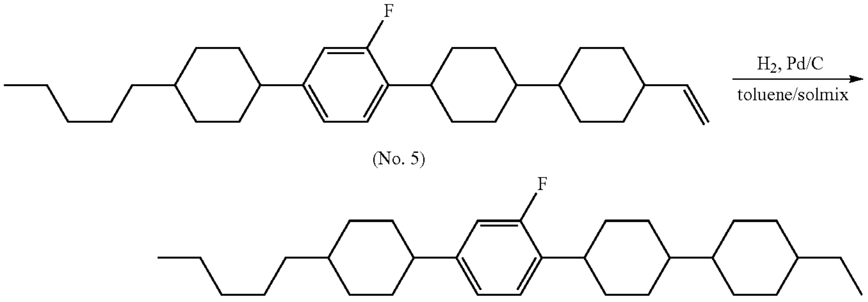

4-[2-Fluoro-4-(4-pentylcylohexyl)-phenyl]-4'-vinyl-bicyclohexyl (No. 5) (1.5 g) obtained in Example 1 was dissolved in a mixed solvent of toluene (15 ml) and Solmix (15 ml), and Pd/C (0.20 g) was added thereto. The mixture was stirred at room temperature under a hydrogen atmosphere until hydrogen absorption had ceased. After the reaction had been completed, Pd/C was removed and then the solvent was distilled off. The residue was purified with a fractional operation by means of column chromatography using heptane as an eluent and silica gel as a stationary phase powder, and further purified by means of recrystallization from heptane and dried, giving 0.78 g of 4-ethyl-4'-(2-fluoro-4-(4-pentylcyclohexyl) phenyl) bi (cyclohexane) (E). The yield based on the compound (No. 5) was 51.8%.

The chemical shift δ (ppm) in $^1$H-NMR analysis is described below, and the compound was identified as 4-ethyl-4'-(2-fluoro-4-(4-pentylcyclohexyl) phenyl) bi (cyclohexane) (E). The solvent for measurement was CDCl$_3$.

The transition temperature of the compound (E) was as follows.

Transition temperature: C 42.4 SB 206.2 N 273.8 I.

Chemical shift δ (ppm); 7.11 (dd, 1H), 6.91 (dd, 1H), 6.84 (dd, 1H), 2.75 (m, 1H), 2.41 (m, 1H), 1.89-1.73 (m, 12H), 1.46-0.95 (m, 24H) and 0.90-0.84 (m, 8H).

Physical Properties of the Comparative Compound (E)

The liquid crystal composition J consisting of 85% by weight of the mother liquid crystals A and 15% by weight the comparative compound 4-ethyl-4'-(2-fluoro-4-(4-pentylcyclohexyl)phenyl)bi(cyclohexane) (E) was prepared. The physical properties of the liquid crystal composition J were measured. The extrapolated values of physical properties of the comparative compound (E) were calculated by extrapolating the measured values. The values were as follows.

Maximum temperature ($T_{NI}$)=203.0° C.; dielectric anisotropy (Δ∈)=0.77; and refractive index anisotropy (Δn)=0.104.

| | | |
|---|---|---|
| 5-HB (F) HH-2 | (E) | 10% |
| 3-HHB (F, F)-F3-3 | (—) | 13% |
| 1-HHXB (F, F)-F | (3-100) | 8% |
| 3-HHXB (F, F)-F | (3-100) | 17% |
| V-HHB-1 | (12-1) | 5% |
| 2-HB-F | (2-2) | 3% |
| 2-HHB (F, F)-F | (3-3) | 4% |
| 3-HHB (F, F)-F | (3-3) | 4% |
| 3-HH-V | (11-1) | 26% |
| 3-BB (F, F) XB (F, F)-F | (3-97) | 10% |

NI = 94.3° C.;
Δn = 0.0912;
Δε = 6.5.

When 10% of the comparative compound (E) was contained, the maximum temperature of the nematic phase (NI) was 94.3° C. and the optical anisotropy (Δn) was 0.0912.

Example 9

Composition Example Containing the Compound (No. 5)

| | | |
|---|---|---|
| 5-HB (F) HH-V | (No. 5) | 10% |
| 3-HHB (F, F)-F | (3-3) | 13% |
| 1-HHXB (F, F)-F | (3-100) | 8% |
| 3-HHXB (F, F)-F | (3-100) | 17% |
| V-HHB-1 | (12-1) | 5% |
| 2-HB-F | (12-1) | 3% |
| 2-HHB (F, F)-F | (3-3) | 4% |
| 3-HHB (F, F)-F | (3-3) | 4% |
| 3-HH-V | (11-1) | 26% |
| 3-BB (F, F) XB (F, F)-F | (3-97) | 10% |

NI = 96.5° C.;
Δn = 0.0939;
Δε = 6.6.

When 10% of the compound (No. 5) was contained, the maximum temperature (NI) was 96.5° C. and the optical anisotropy (Δn) was 0.0939.

In Example 5, the comparative compound (E) contained in Comparative Example 1 was replaced by the compound (No. 5). Comparison of Comparative Example 1 with Example 5 revealed that the presence of the compound (No. 5) increased the maximum temperature of the nematic phase (NI) by 2.3% and the optical anisotropy (Δn) by 3.0%. Display in a wide temperature range was realized by an increase of NI and thus by an increase of the temperature range of the nematic phase. It was found that the compound was useful for a liquid crystal device that is used for a display for a high-speed response, because a method in which the cell thickness decreases with an increase of Δn, thus improving the response speed was established.

Example 10

| | | |
|---|---|---|
| 3-HB (F) HH-V | (No. 3) | 5% |
| 5-HB (F) HH-V | (No. 5) | 5% |
| 2-BEB (F)-C | (5-14) | 5% |
| 3-BEB (F)-C | (5-14) | 4% |
| 4-BEB (F)-C | (5-14) | 12% |
| 1V2-BEB (F, F)-C | (5-15) | 9% |
| 3-HB-O2 | (11-5) | 8% |
| 3-HH-4 | (11-1) | 5% |
| 3-HHB-F | (3-1) | 3% |
| 3-HHB-1 | (12-1) | 8% |
| 3-HHB-O1 | (12-1) | 4% |
| 3-HBEB-F | (3-37) | 4% |
| 3-HHEB-F | (3-10) | 6% |
| 5-HHEB-F | (3-10) | 5% |
| 3-H2BTB-2 | (12-16) | 4% |
| 3-H2BTB-3 | (12-16) | 4% |
| 3-H2BTB-4 | (12-16) | 4% |
| 3-HB (F) TB-2 | (12-17) | 5% |

NI = 104.3° C.;
Δn = 0.139;
Δε = 23.3;
Vth = 1.49 V;
η = 38.6 mPa · sec.

Example 11

| | | |
|---|---|---|
| 3-HB (F) HH-V | (No. 3) | 8% |
| 2-HB-C | (5-1) | 5% |
| 3-HB-C | (5-1) | 12% |
| 3-HB-O2 | (11-5) | 15% |
| 2-BTB-1 | (11-10) | 3% |
| 3-HHB-F | (3-1) | 4% |
| 3-HHB-1 | (12-1) | 8% |
| 3-HHB-O1 | (12-1) | 5% |
| 3-HHB-3 | (12-1) | 14% |
| 3-HHEB-F | (3-10) | 4% |
| 5-HHEB-F | (3-10) | 4% |
| 2-HHB (F)-F | (3-2) | 4% |
| 3-HHB (F)-F | (3-2) | 4% |
| 5-HHB (F)-F | (3-2) | 5% |
| 3-HHB (F, F)-F | (3-3) | 5% |

NI = 118.1° C.;
Δn = 0.110;
Δε = 4.8;
Vth = 2.84 V;
η = 22.6 mPa · sec.

Example 12

| | | |
|---|---|---|
| 5-HB (F) HH-V | (No. 5) | 5% |
| 5-HB (F) HH-V1 | (No. 12) | 5% |
| 3-BEB (F)-C | (5-14) | 8% |
| 5-BEB (F)-C | (5-14) | 8% |
| 3-HB-C | (5-1) | 3% |
| V-HB-C | (5-1) | 8% |
| 1V-HB-C | (5-1) | 8% |
| 3-HB-O2 | (11-5) | 3% |
| 3-HH-2V | (11-5) | 3% |
| 3-HH-2V1 | (11-5) | 7% |
| V2-HHB-1 | (12-1) | 16% |
| 3-HHB-1 | (12-1) | 5% |
| 3-HHEB-F | (3-10) | 4% |
| 3-H2BTB-2 | (12-16) | 6% |
| 3-H2BTB-3 | (12-16) | 6% |
| 3-H2BTB-4 | (12-16) | 5% |

NI = 105.4° C.;
Δn = 0.141;
Δε = 11.0;
Vth = 2.03 V;
η = 25.4 mPa · sec.

Pitch was 61.0 μm when 0.25 part of the optically active compound (Op-05) was added to 100 parts of the composition above.

Example 13

| | | |
|---|---|---|
| V-HB (F) HH-3 | (No. 26) | 3% |
| 5-HB (F) HH-V1 | (No. 12) | 3% |
| 5-BEB (F)-C | (5-14) | 5% |
| V-HB-C | (5-1) | 11% |
| 5-PyB-C | (5-9) | 6% |
| 4-BB-3 | (11-8) | 8% |
| 3-HH-2V | (11-1) | 10% |
| 5-HH-V | (11-1) | 11% |
| V-HHB-1 | (12-1) | 7% |
| V2-HHB-1 | (12-1) | 12% |
| 3-HHB-1 | (12-1) | 9% |
| 1V2-HBB-2 | (12-4) | 10% |
| 3-HHEBH-3 | (13-6) | 5% |

Example 14

| | | |
|---|---|---|
| 5-HB (F) HH-V | (No. 5) | 15% |
| 1V2-BEB (F, F)-C | (5-14) | 12% |
| 3-HB-C | (5-1) | 18% |
| 2-BTB-1 | (11-10) | 10% |
| 5-HH-VFF | (11-1) | 9% |
| 3-HHB-1 | (12-1) | 7% |
| VFF-HHB-1 | (12-1) | 8% |
| VFF2-HHB-1 | (12-1) | 11% |
| 3-H2BTB-2 | (12-16) | 3% |
| 3-H2BTB-3 | (12-16) | 3% |
| 3-H2BTB-4 | (12-16) | 4% |

NI = 104.5° C.;
Δn = 0.145;
Δϵ = 10.9;
Vth = 1.97 V;
η = 26.1 mPa · sec.

Example 15

| | | |
|---|---|---|
| 3-HB (2F, 3F) HH-V | (No. 141) | 7% |
| 5-HB-CL | (2-2) | 16% |
| 3-HH-4 | (11-1) | 12% |
| 3-HH-5 | (11-1) | 4% |
| 3-HHB-F | (3-1) | 4% |
| 3-HHB-CL | (3-1) | 3% |
| 4-HHB-CL | (3-1) | 4% |
| 3-HHB (F)-F | (3-2) | 8% |
| 4-HHB (F)-F | (3-2) | 7% |
| 5-HHB (F)-F | (3-2) | 7% |
| 7-HHB (F)-F | (3-2) | 7% |
| 5-HBB (F)-F | (3-23) | 4% |
| 1O1-HBBH-5 | (13-1) | 3% |
| 3-HHBB (F, F)-F | (4-6) | 2% |
| 4-HHBB (F, F)-F | (4-6) | 3% |
| 5-HHBB (F, F)-F | (4-6) | 3% |
| 3-HH2BB (F, F)-F | (4-15) | 3% |
| 4-HH2BB (F, F)-F | (4-15) | 3% |

NI = 119.9° C.;
Δn = 0.094;
Δϵ = 3.5;
Vth = 2.83 V;
η = 21.7 mPa · sec.

Example 16

| | | |
|---|---|---|
| 3-HB (F) HH-V | (No. 3) | 5% |
| 3-HB (F) HH-O1 | (No . 47) | 6% |
| 3-HHB (F, F)-F | (3-3) | 9% |
| 3-H2HB (F, F)-F | (3-15) | 8% |
| 4-H2HB (F, F)-F | (3-15) | 8% |
| 5-H2HB (F, F)-F | (3-15) | 8% |
| 3-HBB (F, F)-F | (3-24) | 20% |
| 5-HBB (F, F)-F | (3-24) | 15% |
| 3-H2BB (F, F)-F | (3-27) | 5% |
| 5-HHBB (F, F)-F | (4-6) | 3% |
| 5-HHEBB-F | (4-17) | 3% |
| 3-HH2BB (F, F)-F | (4-15) | 2% |
| 1O1-HBBH-4 | (13-1) | 4% |
| 1O1-HBBH-5 | (13-1) | 4% |

Example 17

| | | |
|---|---|---|
| 3-H2B (F) HH-V | (No. 254) | 10% |
| 5-HB-F | (2-2) | 12% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB (F, F)-OCF2H | (3-3) | 4% |
| 3-HHB (F, F)-OCF3 | (3-3) | 5% |
| 3-HH2B (F)-F | (3-5) | 3% |
| 3-HBB (F)-F | (3-23) | 5% |
| 5-HBB (F)-F | (3-23) | 5% |
| 5-HBBH-3 | (13-1) | 3% |
| 3-HB (F) BH-3 | (13-2) | 3% |

Example 18

| | | |
|---|---|---|
| 3-HB (F) 2HH-V | (No. 264) | 12% |
| 5-HB-CL | (2-2) | 11% |
| 3-HH-4 | (11-1) | 8% |
| 3-HHB-1 | (12-1) | 5% |
| 3-HHB (F, F)-F | (3-3) | 8% |
| 3-HBB (F, F)-F | (3-24) | 13% |
| 5-HBB (F, F)-F | (3-24) | 10% |
| 3-HHEB (F, F)-F | (3-12) | 10% |
| 4-HHEB (F, F)-F | (3-12) | 3% |
| 5-HHEB (F, F)-F | (3-12) | 3% |
| 2-HBEB (F, F)-F | (3-39) | 3% |
| 3-HBEB (F, F)-F | (3-39) | 5% |
| 5-HBEB (F, F)-F | (3-39) | 3% |
| 3-HHBB (F, F)-F | (4-3) | 6% |

Example 19

| | | |
|---|---|---|
| 5-HB (F) HH-V | (No. 5) | 4% |
| 2O-HB (2F, 3F) 2HH-V2 | (No. 448) | 4% |
| 3-HB-CL | (2-2) | 6% |
| 5-HB-CL | (2-2) | 4% |

-continued

| | | |
|---|---|---|
| 3-HHB-OCF3 | (3-1) | 5% |
| 3-H2HB-OCF3 | (3-13) | 5% |
| 5-H4HB-OCF3 | (3-19) | 14% |
| V-HHB (F)-F | (3-2) | 5% |
| 3-HHB (F)-F | (3-2) | 5% |
| 5-HHB (F)-F | (3-2) | 5% |
| 3-H4HB (F, F)-CF3 | (3-21) | 8% |
| 5-H4HB (F, F)-CF3 | (3-21) | 10% |
| 5-H2HB (F, F)-F | (3-15) | 5% |
| 5-H4HB (F, F)-F | (3-21) | 7% |
| 2-H2BB (F)-F | (3-26) | 3% |
| 3-H2BB (F)-F | (3-26) | 5% |
| 3-HBEB (F, F)-F | (3-39) | 5% |

Example 20

| | | |
|---|---|---|
| 3-HB (F) HH-V | (No. 3) | 5% |
| 5-HB (F) HH-V1 | (No. 12) | 4% |
| 5-HB-CL | (2-2) | 17% |
| 7-HB (F, F)-F | (2-4) | 3% |
| 3-HH-4 | (11-1) | 10% |
| 3-HH-5 | (11-1) | 5% |
| 3-HB-O2 | (11-5) | 10% |
| 3-HHB-1 | (12-1) | 8% |
| 3-HHB-O1 | (12-1) | 5% |
| 2-HHB (F)-F | (3-2) | 5% |
| 3-HHB (F)-F | (3-2) | 7% |
| 5-HHB (F)-F | (3-2) | 5% |
| 3-HHB (F, F)-F | (3-3) | 6% |
| 3-H2HB (F, F)-F | (3-15) | 5% |
| 4-H2HB (F, F)-F | (3-15) | 5% |

NI = 84.8° C.;
Δn = 0.078;
Δε = 2.6;
Vth = 2.37 V;
η = 18.7 mPa · sec.

Example 21

| | | |
|---|---|---|
| 5-HB (F) HH-V | (No. 5) | 8% |
| 5-HB-CL | (2-2) | 3% |
| 7-HB (F)-F | (2-3) | 7% |
| 3-HH-4 | (11-1) | 9% |
| 3-HH-EMe | (11-2) | 15% |
| 3-HHEB-F | (3-10) | 8% |
| 5-HHEB-F | (3-10) | 8% |
| 3-HHEB (F, F)-F | (3-12) | 10% |
| 4-HHEB (F, F)-F | (3-12) | 5% |
| 4-HGB (F, F)-F | (3-103) | 5% |
| 5-HGB (F, F)-F | (3-103) | 6% |
| 2-H2GB (F, F)-F | (3-106) | 4% |
| 3-H2GB (F, F)-F | (3-106) | 5% |
| 5-GHB (F, F)-F | (3-109) | 7% |

NI = 91.2° C.;
Δn = 0.069;
Δε = 5.8;
Vth = 2.10 V;
η = 23.6 mPa · sec.

Example 22

| | | |
|---|---|---|
| 3-HB (F) HH-V | (No. 3) | 5% |
| V-HB (F) HH-3 | (No. 26) | 5% |
| 3-HH-4 | (11-1) | 8% |

-continued

| | | |
|---|---|---|
| 3-HHB-1 | (12-1) | 6% |
| 3-HHB (F, F)-F | (3-3) | 10% |
| 3-H2HB (F, F)-F | (3-15) | 9% |
| 3-HBB (F, F)-F | (3-24) | 15% |
| 3-BB (F, F) XB (F, F)-F | (3-97) | 25% |
| 1O1-HBBH-5 | (13-1) | 7% |
| 2-HHBB (F, F)-F | (4-6) | 3% |
| 3-HHBB (F, F)-F | (4-6) | 3% |
| 3-HH2BB (F, F)-F | (4-15) | 4% |

Example 23

| | | |
|---|---|---|
| 3-HB (F) HH-V | (No. 3) | 3% |
| V-HB (F) HH-3 | (No. 26) | 5% |
| 3-HB-CL | (2-2) | 13% |
| 3-HB-O2 | (11-5) | 10% |
| 3-PyB (F)-F | (12-15) | 10% |
| 5-PyB (F)-F | (12-15) | 10% |
| 3-HBB (F, F)-F | (3-24) | 7% |
| 3-PyBB-F | (3-80) | 8% |
| 4-PyBB-F | (3-80) | 7% |
| 5-PyBB-F | (3-80) | 7% |
| 5-HBB (F) B-2 | (13-5) | 10% |
| 5-HBB (F) B-3 | (13-5) | 10% |

Example 24

| | | |
|---|---|---|
| 3-HB (F) HH-V | (No. 3) | 11% |
| 3-HH-V | (11-1) | 22% |
| 3-BB (F, F) XB (F, F)-F | (3-97) | 18% |
| 3-HHB-1 | (12-1) | 3% |
| 2-HBB-F | (3-22) | 3% |
| 3-HBB-F | (3-22) | 3% |
| 3-HHB-CL | (3-1) | 4% |
| 1-BB (F) B-2V | (12-6) | 6% |
| 2-BB (F) B-2V | (12-6) | 6% |
| 3-BB (F) B-2V | (12-6) | 3% |
| 2-HHB (F, F)-F | (3-3) | 4% |
| 3-HHB (F, F)-F | (3-3) | 5% |
| 4-BB (F) B (F, F) XB (F, F)-F | (4-47) | 12% |

NI = 104.3° C.;
Δn = 0.143;
Δε = 8.6;
Vth = 2.06 V;
η = 27.9 mPa · sec.

Example 25

| | | |
|---|---|---|
| 2O-HB (F) HH-V | (No. 109) | 4% |
| 5-HB (2F, 3F) HH-O1 | (No. 163) | 4% |
| 2-HB-C | (5-1) | 5% |
| 3-HB-C | (5-1) | 12% |
| 3-HB-O2 | (11-5) | 15% |
| 2-BTB-1 | (11-10) | 3% |
| 3-HHB-F | (3-1) | 4% |
| 3-HHB-O1 | (12-1) | 5% |
| 3-HHB-3 | (12-1) | 14% |
| 3-HHEB-F | (3-10) | 4% |
| 5-HHEB-F | (3-10) | 4% |
| 2-HHB (F)-F | (3-2) | 7% |

-continued

| | | |
|---|---|---|
| 3-HHB (F)-F | (3-2) | 7% |
| 5-HHB (F)-F | (3-2) | 7% |
| 3-HHB (F, F)-F | (3-3) | 5% |

NI = 116.4° C.;
Δn = 0.109;
Δε = 4.6;
Vth = 2.87 V;
η = 23.0 mPa · sec.

Example 26

| | | |
|---|---|---|
| 5-HB (F) HH-O3 | (No. 54) | 7% |
| 5-HB (2F, 3F) HH-O2 | (No. 168) | 3% |
| 2-BEB (F)-C | (5-14) | 5% |
| 3-BEB (F)-C | (5-14) | 4% |
| 4-BEB (F)-C | (5-14) | 12% |
| 1V2-BEB (F, F)-C | (5-15) | 9% |
| 3-HB-O2 | (11-5) | 8% |
| 3-HH-4 | (11-1) | 5% |
| 3-HHB-F | (3-1) | 3% |
| 3-HHB-1 | (12-1) | 8% |
| 3-HHB-O1 | (12-1) | 4% |
| 3-HBEB-F | (3-37) | 4% |
| 3-HHEB-F | (3-10) | 6% |
| 5-HHEB-F | (3-10) | 5% |
| 3-H2BTB-2 | (12-16) | 4% |
| 3-H2BTB-3 | (12-16) | 4% |
| 3-H2BTB-4 | (12-16) | 4% |
| 3-HB (F) TB-2 | (12-17) | 5% |

NI = 102.6° C.;
Δn = 0.138;
Δε = 23.1;
Vth = 1.44 V;
η = 38.7 mPa · sec.

INDUSTRIAL APPLICABILITY

The compound of the invention has general physical properties suitable for the compound, stability to heat, light and so forth, a wide temperature range of a liquid crystal phase, a small viscosity, an excellent compatibility with other compounds, a suitable dielectric anisotropy and a suitable refractive index anisotropy. The liquid crystal composition of the invention comprises at least one of these compounds, and has a high maximum temperature of the nematic phase and a low minimum temperature of the nematic phase, a small viscosity and an excellent compatibility even in a low temperature range. The liquid crystal display device of the invention comprises this composition, and has a wide temperature range in which the device can be used, a short response time, a low electric power consumption, a large contrast ratio and a low driving voltage, thus can be widely used for displays of a watch, a calculator, a word processor and so forth.

What is claimed is:

1. A compound represented by formula (a):

(a)

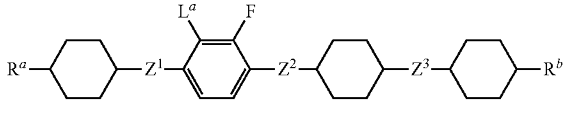

wherein $R^a$ and $R^b$ are each independently alkyl having 1 to 10 carbons, alkenyl having 2 to 10 carbons or alkoxy having 1 to 10 carbons, and at least one of $R^a$ and $R^b$ is alkenyl or alkoxy;

$L^a$ is hydrogen;

$Z^1$, $Z^2$ and $Z^3$ are each independently a single bond, $—(CH_2)_2—$, $—CH_2O—$ or $—OCH_2$.

2. The compound according to claim 1, wherein, in formula (a), $R^a$ is alkenyl having 2 to 10 carbons, $R^b$ is alkyl having 1 to 10 carbons.

3. The compound according to claim 1, wherein, in formula (a), $R^a$ is alkyl having 1 to 10 carbons, $R^b$ is alkenyl having 2 to 10 carbons.

4. The compound according to claim 1, wherein, in formula (a), $R^a$ and $R^b$ are each independently alkenyl having 2 to 10 carbons.

5. The compound according to claim 1, wherein, in formula (a), $R^a$ is alkoxy having 1 to 10 carbons, $R^b$ is alkenyl having 2 to 10 carbons.

6. The compound according to claim 1, wherein, in formula (a), $R^a$ is alkenyl having 2 to 10 carbons, $R^b$ is alkoxy having 1 to 10 carbons.

7. The compound according to claim 1, which is represented by any one of formulas (a-5) to (a-12):

(a-5)

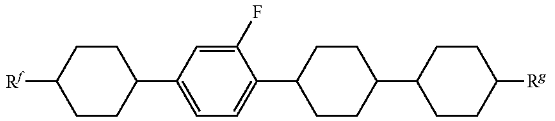

(a-6)

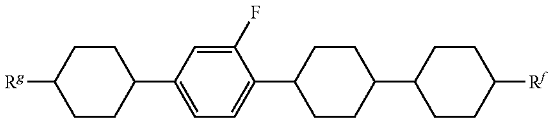

(a-7)

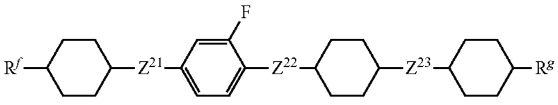

(a-8)

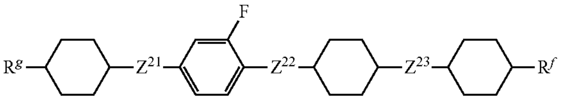

(a-9)

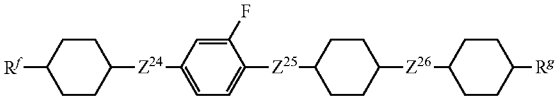

(a-10)

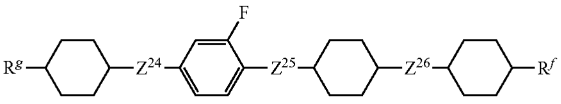

(a-11)

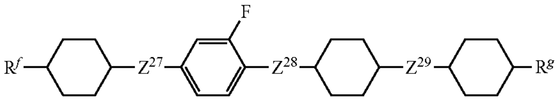

-continued (a-12)

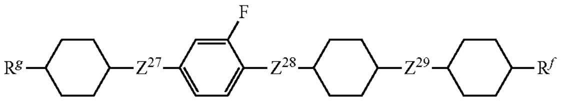

wherein $R^f$ is alkyl having 1 to 10 carbons and $R^g$ is alkenyl having 2 to 10 carbons;

$Z^{21}$, $Z^{22}$ and $Z^{23}$ are each independently a single bond or $-(CH_2)_2-$, and in these groups, at least any one of $Z^{21}$, $Z^{22}$ and $Z^{23}$ is $-(CH_2)_2-$;

$Z^{24}$, $Z^{25}$ and $Z^{26}$ are each independently a single bond or $-CH_2O-$, and, in these groups, at least any one of $Z^{24}$, $Z^{25}$ and $Z^{26}$ is $-CH_2O-$; and $Z^{27}$, $Z^{28}$ and $Z^{29}$ are each independently a single bond or $-OCH_2-$, and in these groups, at least any one of $Z^{27}$, $Z^{28}$ and $Z^{29}$ is $-OCH_2-$.

8. The compound according to claim 1, which is represented by any one of formulas (a-13) to (a-20):

(a-13)

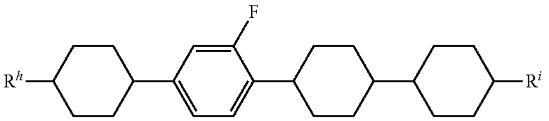

(a-14)

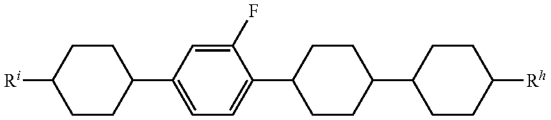

(a-15)

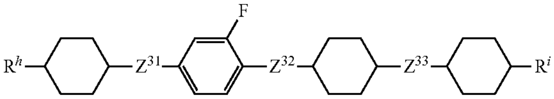

(a-16)

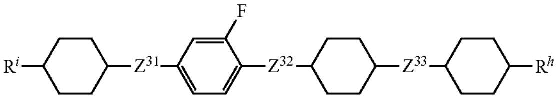

(a-17)

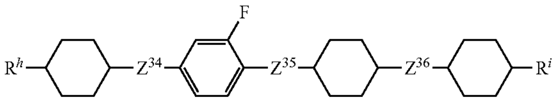

(a-18)

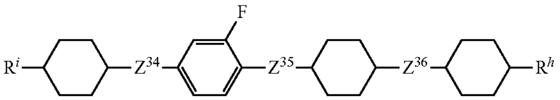

(a-19)

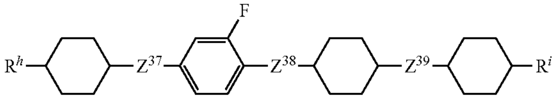

-continued (a-20)

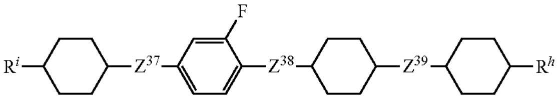

wherein $R^h$ is alkenyl having 2 to 10 carbons and $R^i$ is alkoxy having 1 to 10 carbons;

$Z^{31}$, $Z^{32}$ and $Z^{33}$ are each independently a single bond or $-(CH_2)_2-$, and in these groups, at least any one of $Z^{31}$, $Z^{32}$ and $Z^{33}$ is $-(CH_2)_2-$;

$Z^{34}$, $Z^{35}$ and $Z^{36}$ are each independently a single bond or $-CH_2O-$, and in these groups, at least any one of $Z^{34}$, $Z^{35}$ and $Z^{36}$ is $-CH_2O-$; and $Z^{37}$, $Z^{38}$ and $Z^{39}$ are each independently a single bond or $-OCH_2-$, and in these groups, at least any one of $Z^{37}$, $Z^{38}$ and $Z^{39}$ is $-OCH_2-$.

9. The compound according to claim 1, which is represented by any one of formulas (a-21) to (a-24):

(a-21)

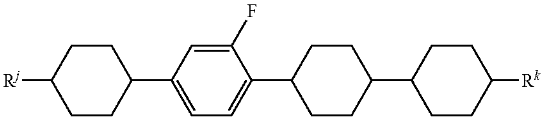

(a-22)

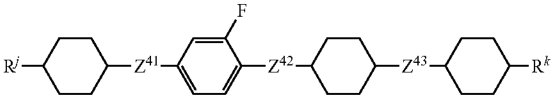

(a-23)

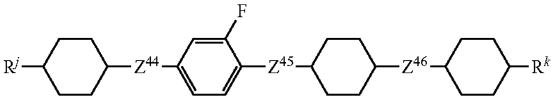

(a-24)

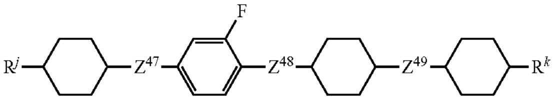

wherein $R^j$ is alkenyl having 2 to 10 carbons and $R^k$ is alkenyl having 2 to 10 carbons;

$Z^{41}$, $Z^{42}$ and $Z^{43}$ are each independently a single bond or $-(CH_2)_2-$, and in these groups, at least any one of $Z^{41}$, $Z^{42}$ and $Z^{43}$ is $-(CH_2)_2-$;

$Z^{44}$, $Z^{45}$ and $Z^{46}$ are each independently a single bond or $-CH_2O-$, and in these groups, at least any one of $Z^{44}$, $Z^{45}$ and $Z^{46}$ is $-CH_2O-$; and $Z^{47}$, $Z^{48}$ and $Z^{49}$ are each independently a single bond or $-OCH_2-$, and in these groups, at least any one of $Z^{47}$, $Z^{48}$ and $Z^{49}$ is $-OCH_2-$.

10. A liquid crystal composition consisting of two or more components and comprising at least one compound according to claim 1 as one component.

11. The liquid crystal composition according to claim 10, comprising at least one compound selected from the group of compounds represented by each of formulas (2), (3) and (4) as one component:

(2)

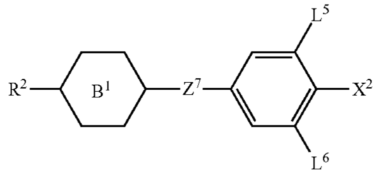

(3)

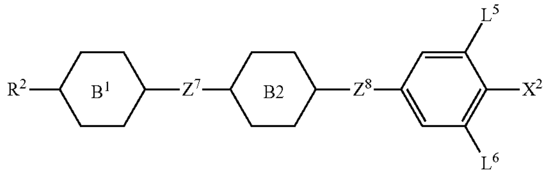

(4)

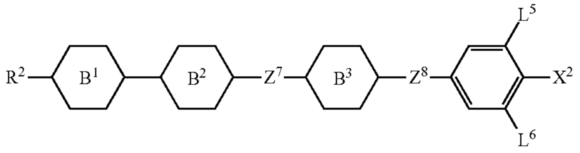

wherein $R^2$ is alkyl having 1 to 10 carbons or alkenyl having 2 to 10 carbons, and in the alkyl and alkenyl, arbitrary hydrogen may be replaced by fluorine and arbitrary $—CH_2—$ may be replaced by $—O—$;

$X^2$ is fluorine, chlorine, $—OCF_3$, $—OCHF_2$, $—CF_3$, $—CHF_2$, $—CH_2F$, $—OCF_2CHF_2$ or $—OCF_2CHFCF_3$;

ring $B^1$, ring $B^2$ and ring $B^3$ are each independently 1,4-cyclohexylene, 1,3-dioxane-2,5-diyl, pyrimidine-2,5-diyl, tetrahydropyran-2,5-diyl, 1,4-phenylene, or 1,4-phenylene in which arbitrary hydrogen is replaced by fluorine;

$Z^7$ and $Z^8$ are each independently $—(CH_2)_2—$, $—(CH_2)_4—$, $—COO—$, $—CF_2O—$, $—OCF_2—$, $—CH{=}CH—$, $—C{\equiv}C—$, $—CH_2O—$ or a single bond; and $L^5$ and $L^6$ are each independently hydrogen or fluorine.

12. The liquid crystal composition according to claim 10 comprising at least one compound selected from the group of compounds represented by formula (5) as one component:

(5)

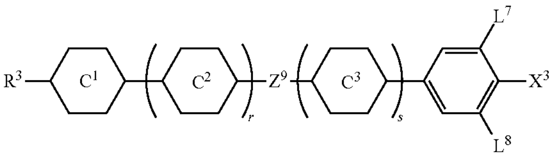

wherein $R^3$ is alkyl having 1 to 10 carbons or alkenyl having 2 to 10 carbons, and in the alkyl and alkenyl, arbitrary hydrogen may be replaced by fluorine and arbitrary $—CH_2—$ may be replaced by $—O—$;

$X^3$ is $—C{\equiv}N$ or $—C{\equiv}C—C{\equiv}N$;

ring $C^1$, ring $C^2$ and ring $C^3$ are each independently 1,4-cyclohexylene, 1,4-phenylene, 1,4-phenylene in which arbitrary hydrogen is replaced by fluorine, 1,3-dioxane-2,5-diyl, tetrahydropyran-2,5-diyl or pyrimidine-2,5-diyl;

$Z^9$ is $—(CH_2)_2—$, $—COO—$, $—CF_2O—$, $—OCF_2—$, $—C{\equiv}C—$, $—CH_2O—$ or a single bond;

$L^7$ and $L^8$ are each independently hydrogen or fluorine; and r is 0 or 1, s is 0 or 1, and r+s is 0, 1 or 2.

13. The liquid crystal composition according to claim 10 comprising at least one compound selected from the group of compounds represented by each of formulas (6), (7), (8), (9) and (10) as one component:

(6)

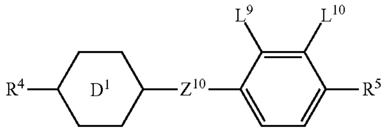

(7)

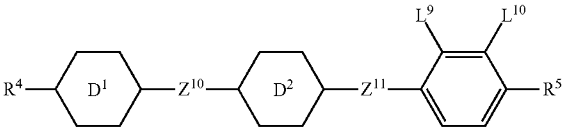

(8)

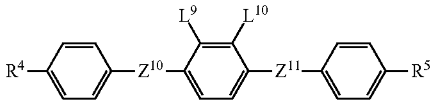

(9)

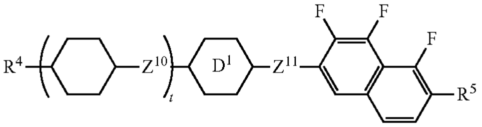

(10)

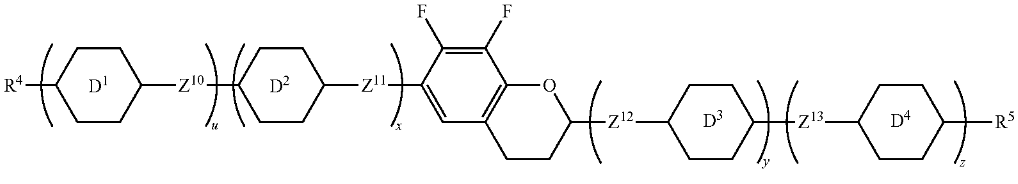

wherein $R^4$ and $R^5$ are each independently alkyl having 1 to 10 carbons or alkenyl having 2 to 10 carbons, and in the alkyl and alkenyl, arbitrary hydrogen may be replaced by fluorine and arbitrary $—CH_2—$ may be replaced by $—O—$;

ring $D^1$, ring $D^2$, ring $D^3$ and ring $D^4$ are each independently 1,4-cyclohexylene, 1,4-cyclohexenylene, 1,4-phenylene, 1,4-phenylene in which arbitrary hydrogen is replaced by fluorine, tetrahydropyran-2,5-diyl or decahydronaphthalene-2,6-diyl;

$Z^{10}$, $Z^{11}$, $Z^{12}$ and $Z^{13}$ are each independently —$(CH_2)_2$—, —COO—, —$CH_2O$—, —$OCF_2$—, —$OCF_2(CH_2)_2$— or a single bond;

$L^9$ and $L^{10}$ are each independently fluorine or chlorine; and t, u, x, y and z are each independently 0 or 1, and u+x+y+Z is 1 or 2.

14. The liquid crystal composition according to claim 10 comprising at least one compound selected from the group of compounds represented by each of formulas (11), (12) and (13) as one component:

(11)

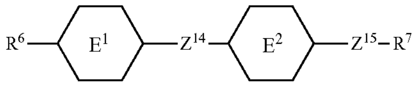

(12)

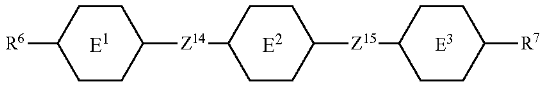

(13)

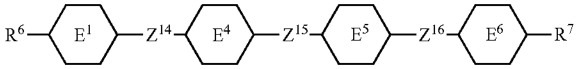

wherein $R^6$ and $R^7$ are each independently alkyl having 1 to 10 carbons or alkenyl having 2 to 10 carbons, and in the alkyl and alkenyl, arbitrary hydrogen may be replaced by fluorine and arbitrary —$CH_2$— may be replaced by —O—;

ring $E^1$, ring $E^2$, ring $E^3$ and ring $E^6$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

ring $E^4$ and ring $E^5$ are each independently 1,4-cyclohexylene, pyrimidine-2,5-diyl or 1,4-phenylene; and $Z^{14}$, $Z^{15}$ and $Z^{16}$ are each independently —C≡C—, —COO—, —$(CH_2)_2$—, —CH═CH— or a single bond.

15. The liquid crystal composition according to claim 10, further comprising at least one optically active compound.

16. The liquid crystal composition according to claim 10, further including at least one antioxidant and/or ultraviolet absorber.

17. A liquid crystal display device comprising the liquid crystal composition according to claim 10.

* * * * *